US011662162B2

(12) United States Patent
Al-Mutairi et al.

(10) Patent No.: US 11,662,162 B2
(45) Date of Patent: May 30, 2023

(54) METHOD AND SYSTEM FOR RETROFITTING HEAT EXCHANGER NETWORKS

(71) Applicant: King Fahd University of Petroleum and Minerals, Dhahran (SA)

(72) Inventors: Eid M. Al-Mutairi, Dhahran (SA); Amir A. Merghani, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 610 days.

(21) Appl. No.: 16/001,371

(22) Filed: Jun. 6, 2018

(65) Prior Publication Data
US 2019/0376753 A1 Dec. 12, 2019

(51) Int. Cl.
*F28F 27/00* (2006.01)
*G06F 30/20* (2020.01)
*G06F 111/10* (2020.01)

(52) U.S. Cl.
CPC .............. *F28F 27/00* (2013.01); *G06F 30/20* (2020.01); *F28F 2200/00* (2013.01); *G06F 2111/10* (2020.01)

(58) Field of Classification Search
CPC ....... F28F 27/00; F28F 2200/00; G06F 30/20; G06F 2111/10
See application file for complete search history.

(56) References Cited

U.S. PATENT DOCUMENTS

| | | | | |
|---|---|---|---|---|
| 10,494,576 B2* | 12/2019 | Noureldin | ................ | C10G 7/00 |
| 2011/0046997 A1* | 2/2011 | Noureldin | .............. | G05B 15/02 |
| | | | | 705/7.12 |
| 2011/0046998 A1* | 2/2011 | Noureldin | ................ | F01K 13/02 |
| | | | | 705/7.37 |
| 2011/0054715 A1* | 3/2011 | Noureldin | .............. | G05B 15/02 |
| | | | | 700/300 |
| 2011/0106504 A1* | 5/2011 | Noureldin | ................ | G06F 30/20 |
| | | | | 703/1 |
| 2011/0178834 A1* | 7/2011 | Noureldin | ................ | G06F 17/10 |
| | | | | 705/7.22 |
| 2013/0282184 A1* | 10/2013 | Noureldin | ................ | G06F 30/20 |
| | | | | 700/276 |
| 2013/0325200 A1* | 12/2013 | Noureldin | ................ | G06F 30/20 |
| | | | | 700/299 |

(Continued)

FOREIGN PATENT DOCUMENTS

CN 102947831 B * 11/2016 ............. F01K 13/02
CN 103914605 B 5/2017

(Continued)

OTHER PUBLICATIONS

G.Athier et. al. "A Mixed Method For Retrofiting Heat-Exchanger Networks", Computers chem. Engng vol. 22 (Year: 1998).*

(Continued)

*Primary Examiner* — Rehana Perveen
*Assistant Examiner* — Nupur Debnath
(74) *Attorney, Agent, or Firm* — Oblon, McClelland, Maier & Neustadt, L.L.P.

(57) ABSTRACT

A heat exchanger network retrofit method including analysis, targeting and retrofitting an existing heat exchange network (HEN) to lower the annual operating cost. The revamped/retrofit design is based on one of two mathematical techniques: Simulated Annealing (SA) and Fixed Structure.

11 Claims, 57 Drawing Sheets

(56) References Cited

U.S. PATENT DOCUMENTS

2015/0073188 A1* 3/2015 Floudas ............... C10G 11/05
422/187

FOREIGN PATENT DOCUMENTS

| WO | WO-2011044436 A2 * | 4/2011 | ........... G06F 17/509 |
| WO | WO-2014168867 A1 * | 10/2014 | ......... G06F 17/5009 |
| WO | WO-2015200642 A1 * | 12/2015 | ............. B01D 3/007 |

OTHER PUBLICATIONS

Yufei Wang, "Heat exchanger network retrofit through heat transfer enhancement" (Year: 2012).*

Viviani C. Onishi et.al "Retrofit of heat exchanger networks with pressure recovery of process streams at sub-ambient conditions", Elsevier in Energy conversion and Management (Year: 2015).*

Bhargava Krishna Sreepathi and G. P. Rangaiah, "Review of Heat Exchanger Network Retrofitting Methodologies and Their Applications", American chemical society (Year: 2014).*

Ashwin Agarwal et al.; "Sustainable Process Design Approach for On-Purpose Propylene Production and Intensification"; ACS Sustainable Chem. Eng. 2018, 6, 2407-2421 (Year: 2017).*

Lluvia M. Ochoa-Estopier et al.; Optimization of Heat-Integrated Crude Oil Distillation Systems. Part II: Heat Exchanger Network Retrofit Model; Ind. Eng. Chem. Res. 2015, 54, 5001-5017 (Year: 2015).*

K. Huang et al.; "Efficient algorithm for simultaneous synthesis of heat exchanger networks"; Chemical Engineering Science 105 (2014) 53-68 (Year: 2014).*

Fuyu Peng et al.; "Efficient simultaneous synthesis for heat exchanger network with simulated annealing algorithm"; Applied Thermal Engineering 78 (2015) 136-149 (Year: 2015).*

Wang, Yufei ; Heat exchanger network retrofit through heat transfer enhancement ; 2012 ; School of Chemical Engineering and Analytical Science Thesis ; 212 Pages ; https://www.research.manchester.ac.uk/portal/files/54522460/FULL_TEXT.PDF.

Smith, Robin, et al. ; Recent Development in the Retrofit of Heat Exchanger Networks ; Nov. 2010 ; Applied Thermal Engineering (2010) ; 33 pages ; https://hal.archives-ouvertes.fr/hal-00675409/document.

Dolan, W. B., et al. ; Process Optimization via Simulated Annealing: application to Network Design ; May 1989 ; AIChE Journal, vol. 35, No. 5 ; 12 Pages ; http://huggins.vuse.vanderbilt.edu/groupweb/research/pdfs/paper047-dolan-aichej-35-89-725.pdf.

Aatola, Juha ; Simultaneous Synthesis of Flexible Heat Exchanger Networks ; Feb. 28, 2003 ; Energy Engineering and Environmental Protection Publications ; 112 Pages ; http://citeseerx.ist.psu.edu/viewdoc/download?doi=10.1.1.117.5910&rep=rep1&type=pdf.

* cited by examiner

FIG. 2

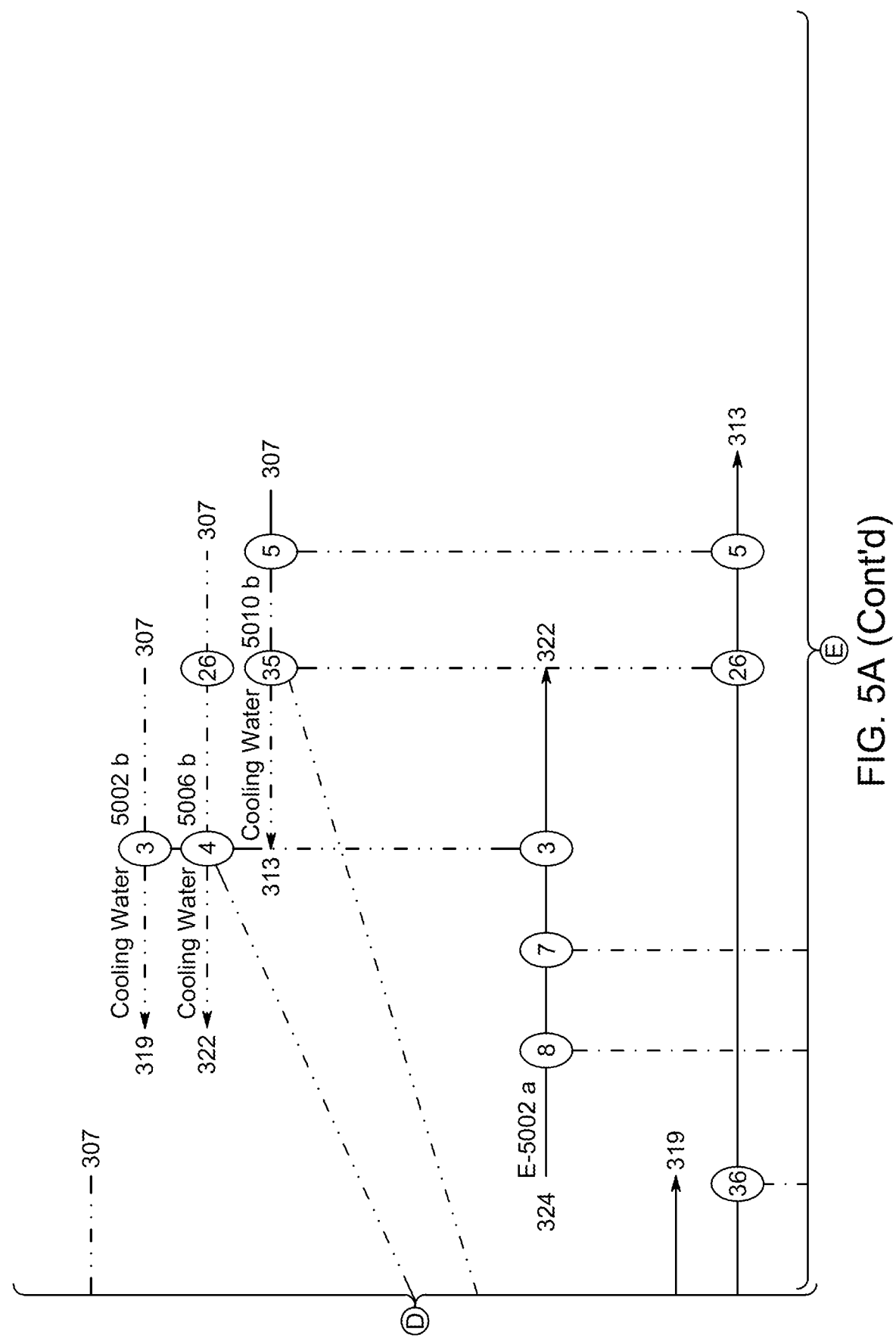

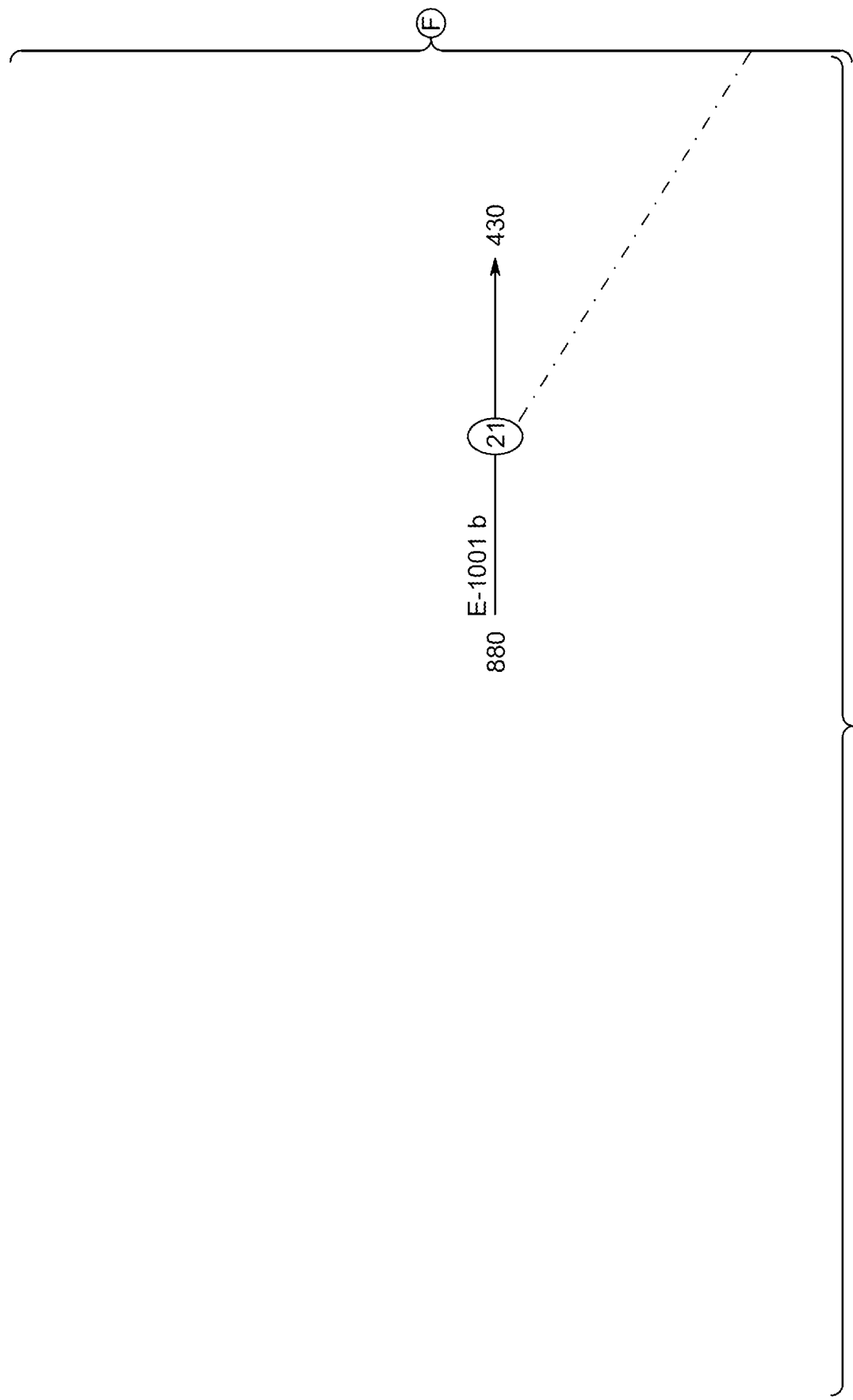

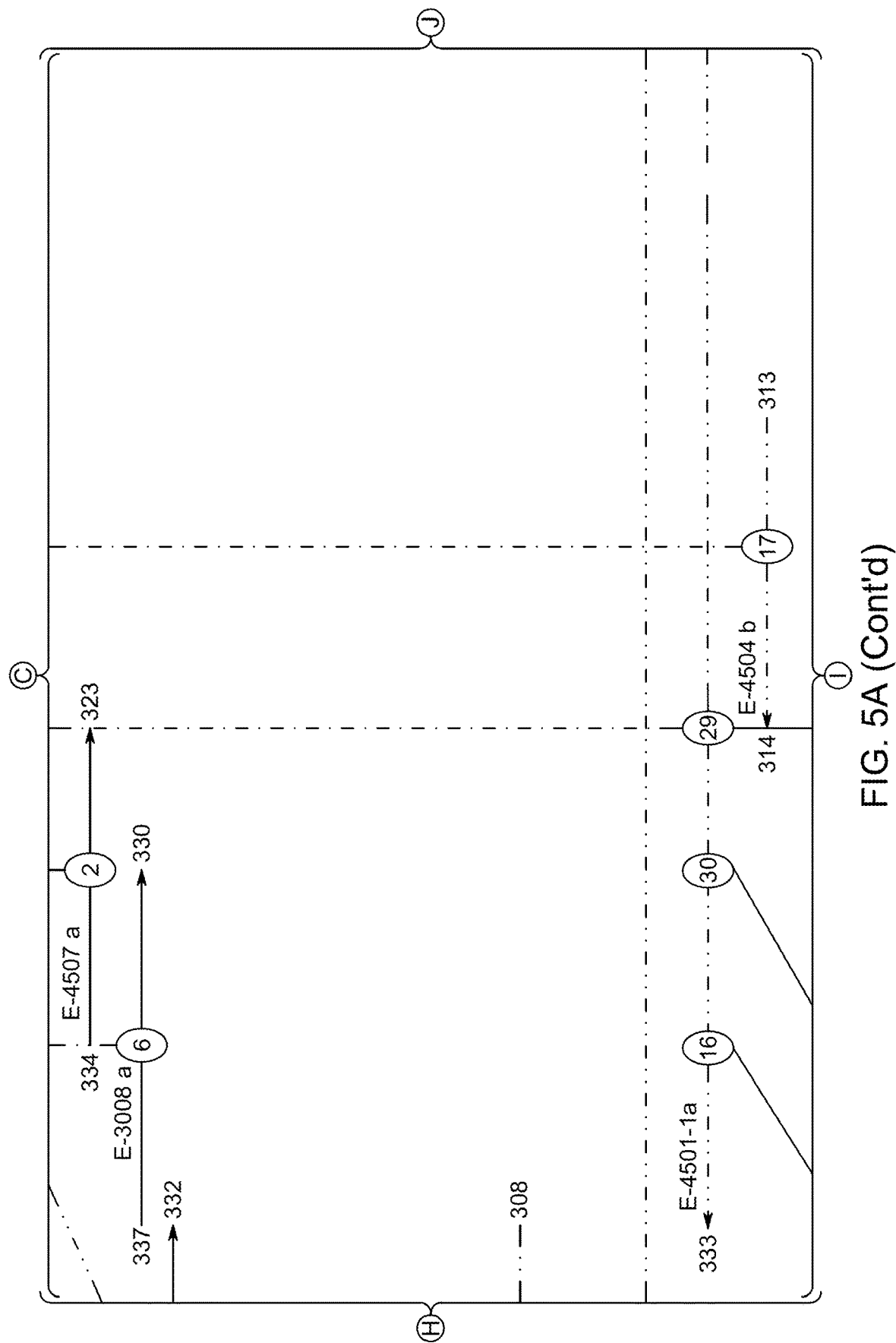

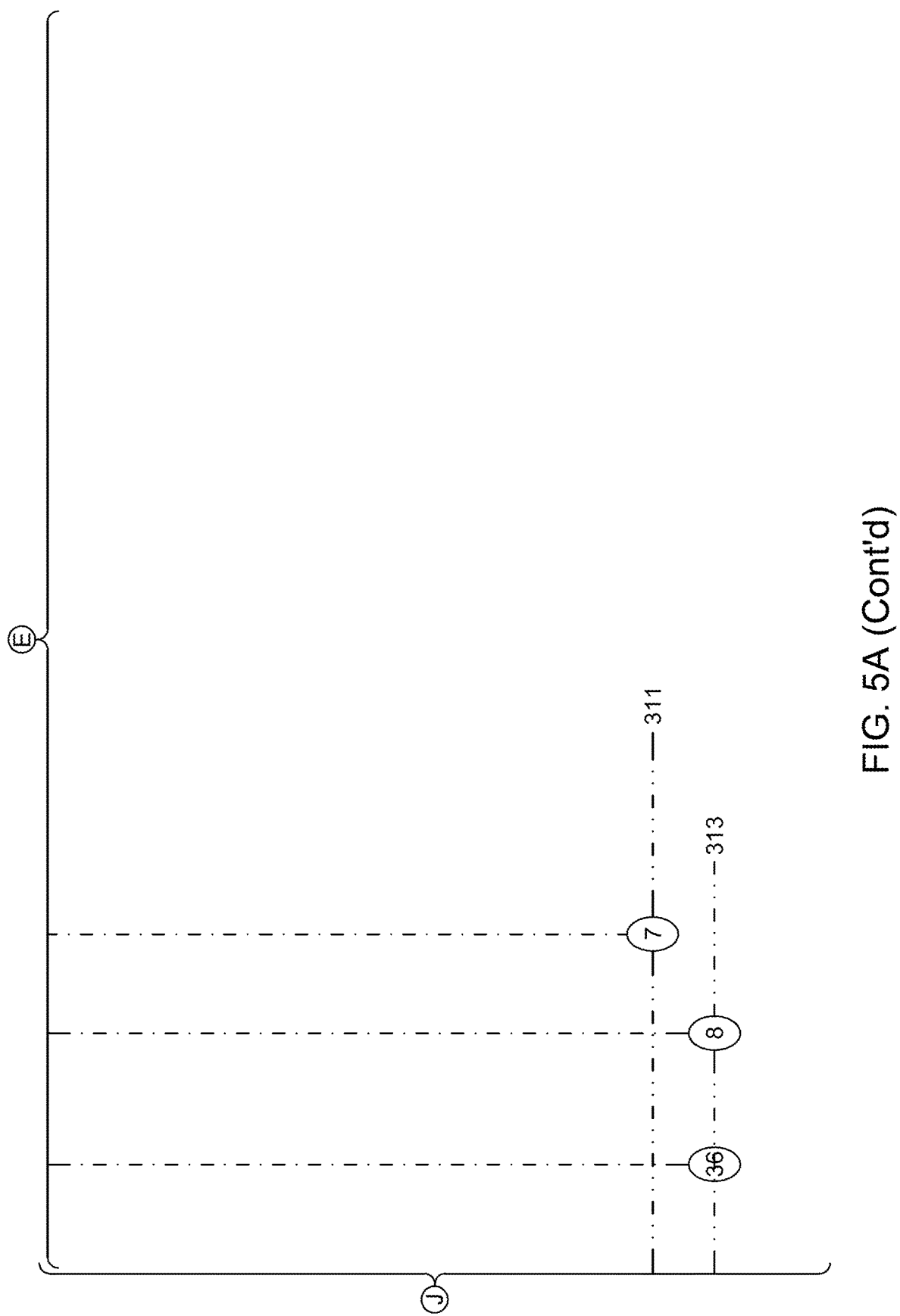

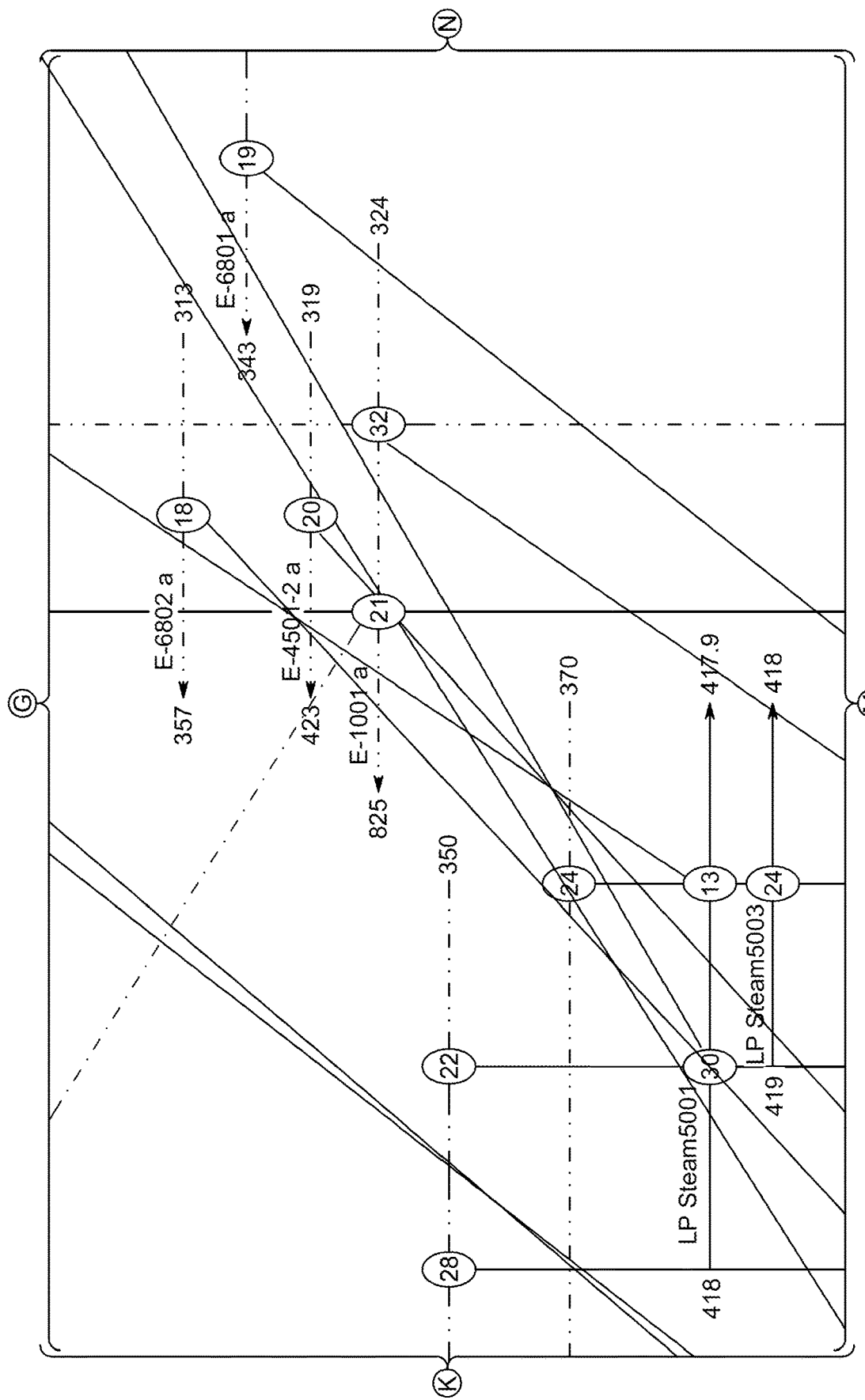

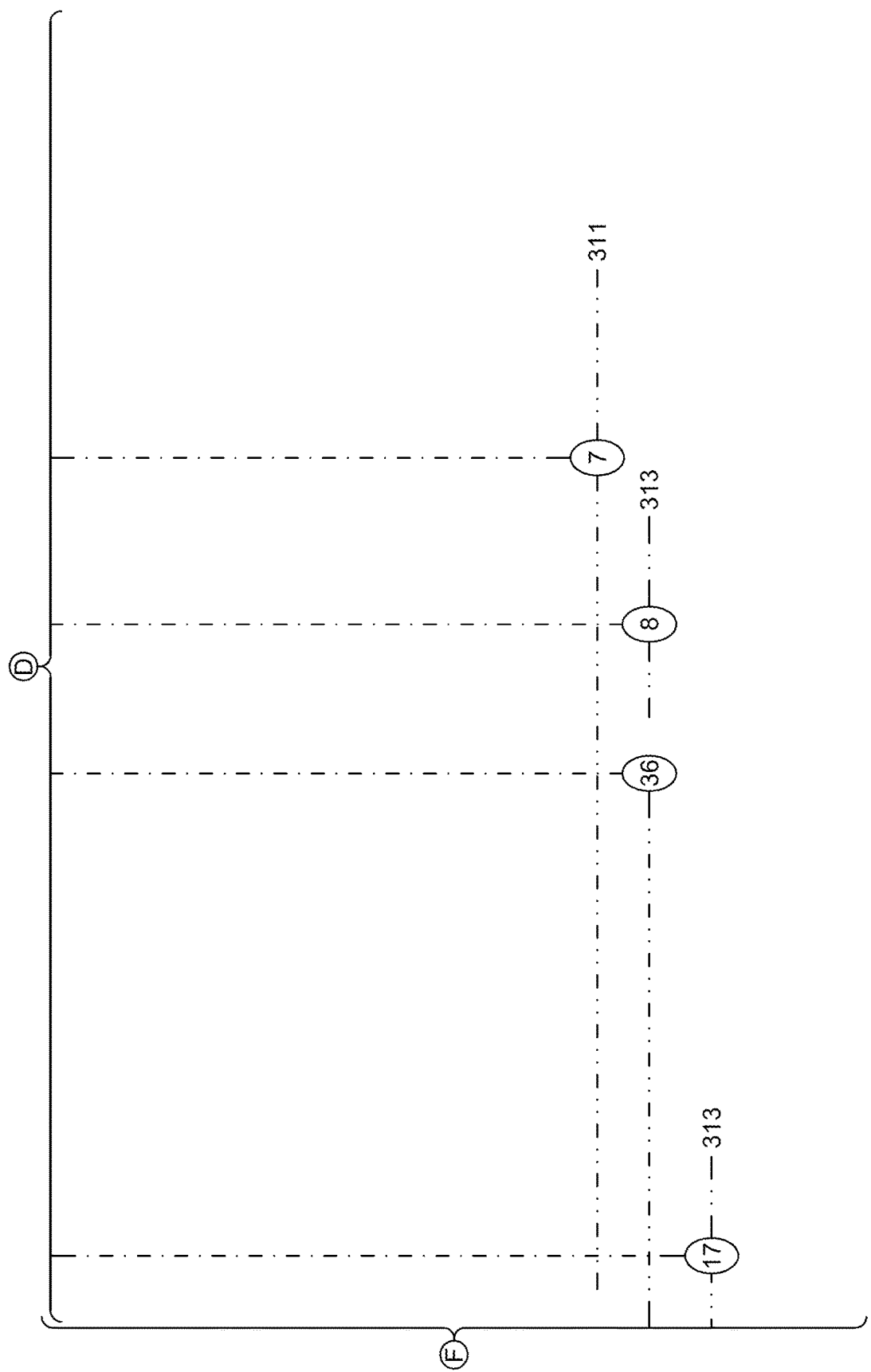

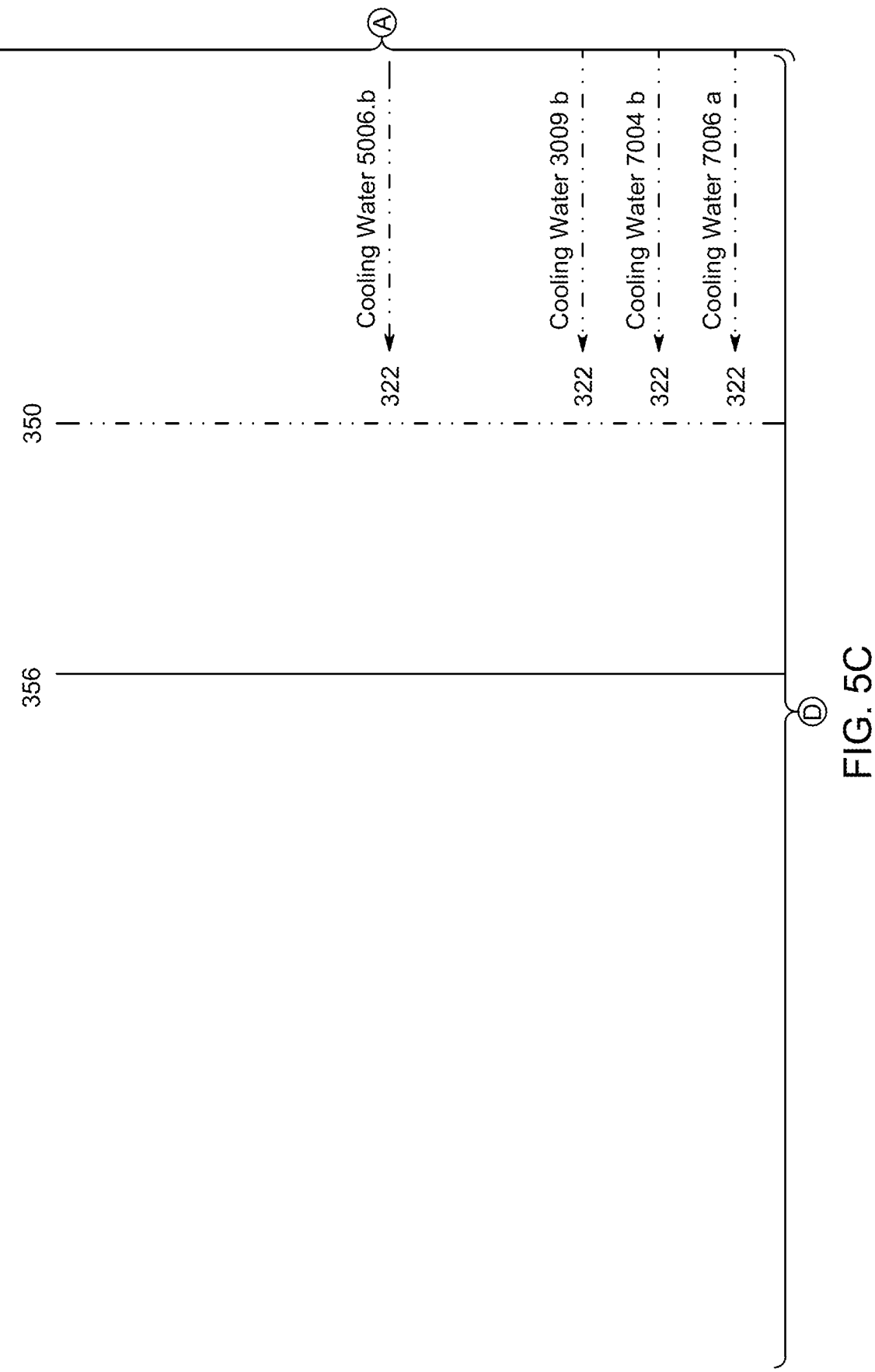

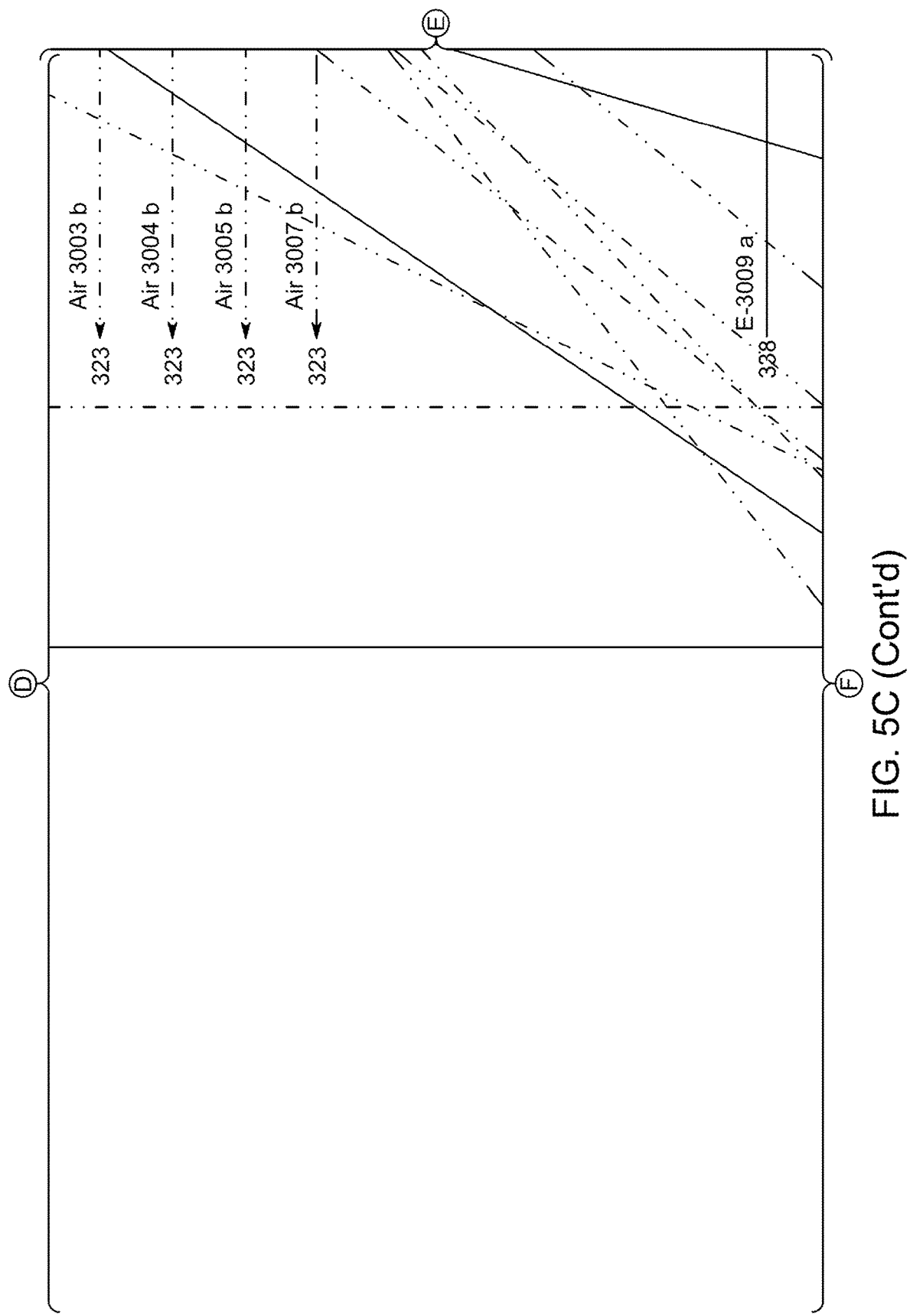

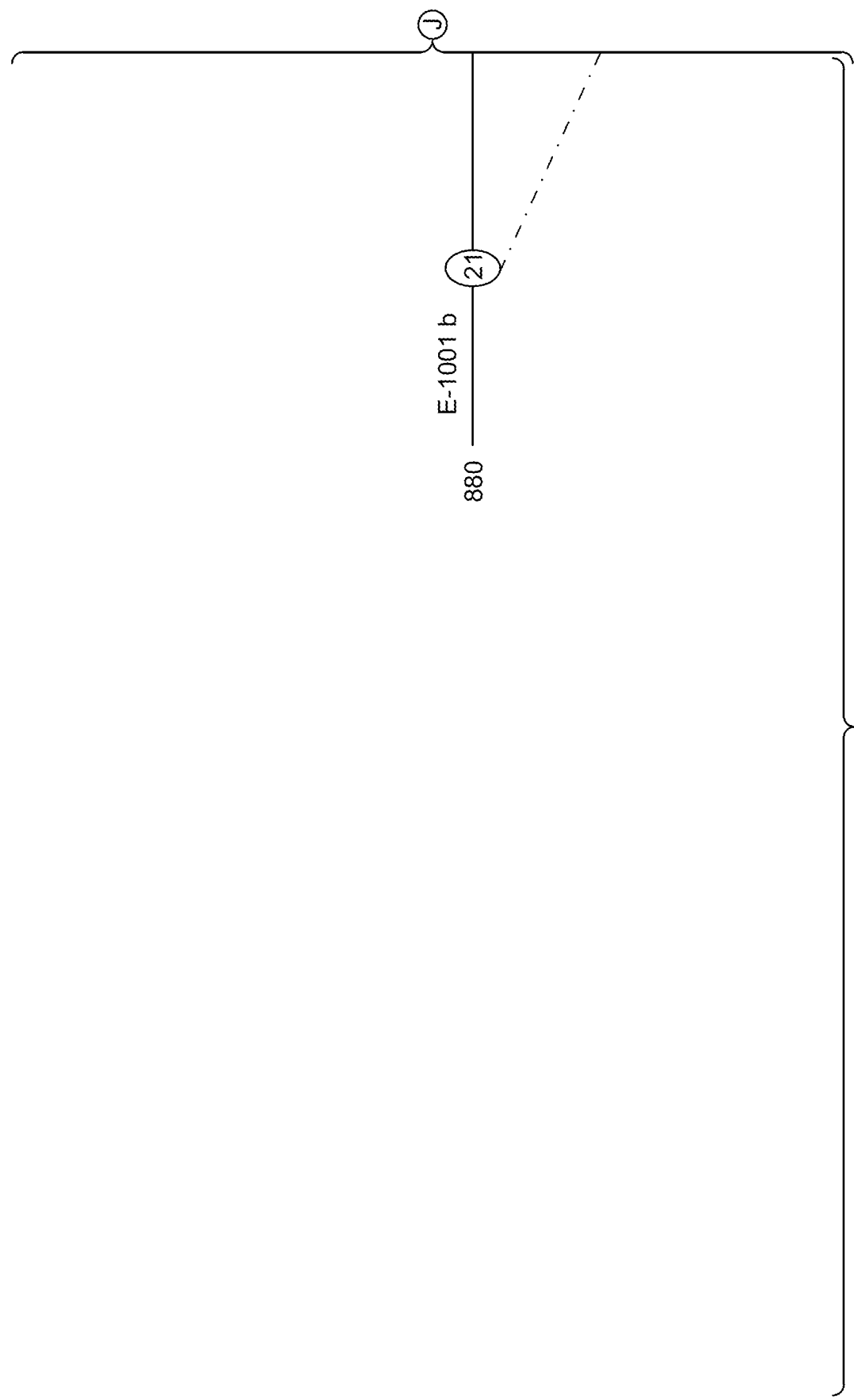

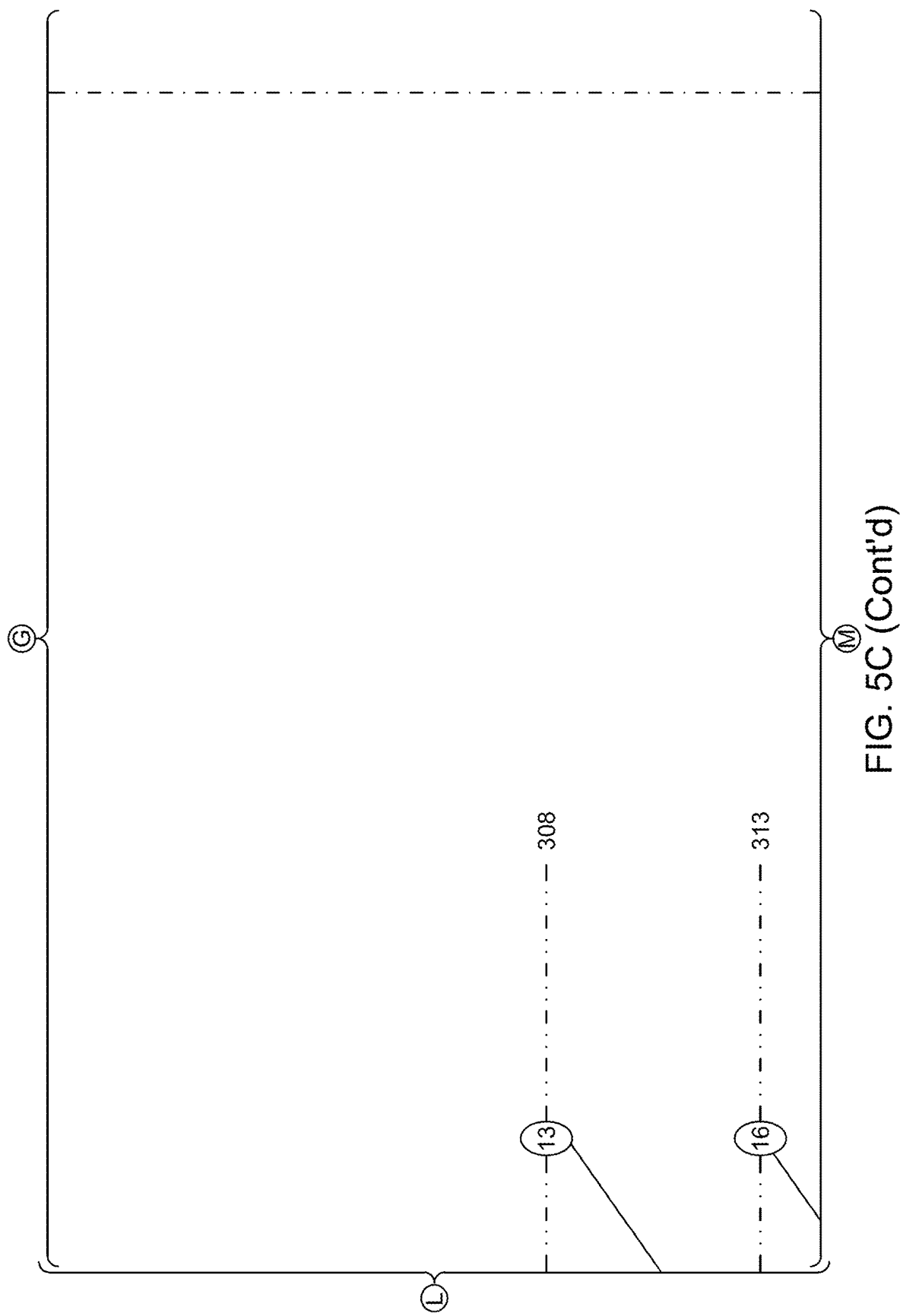

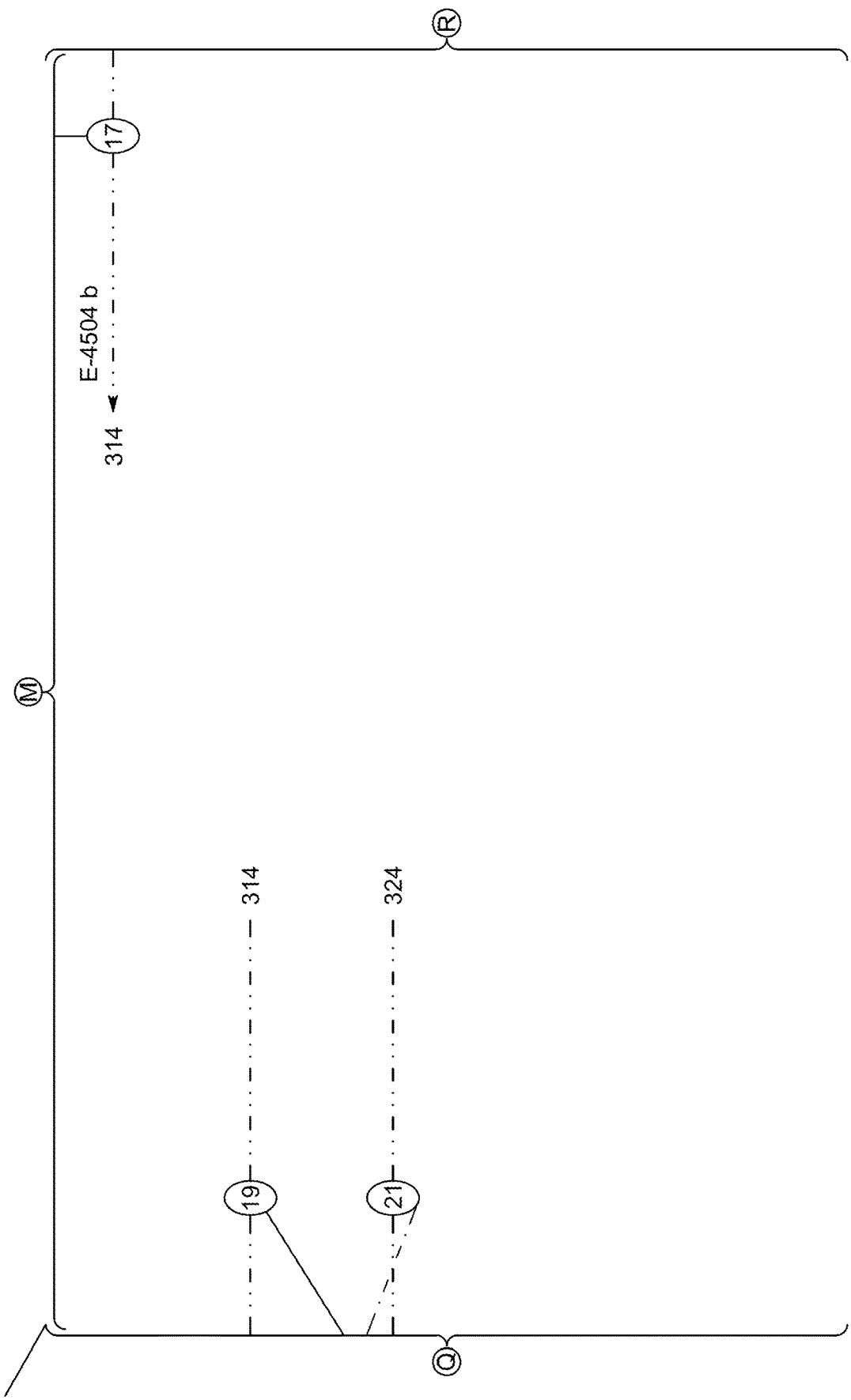

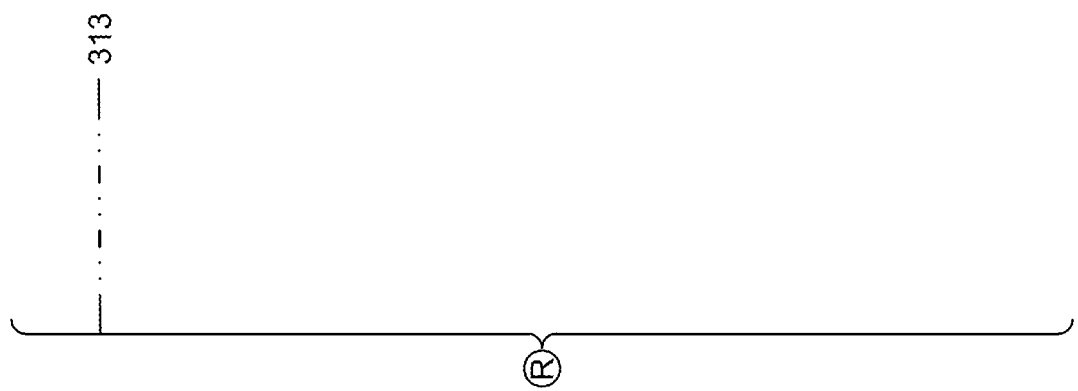

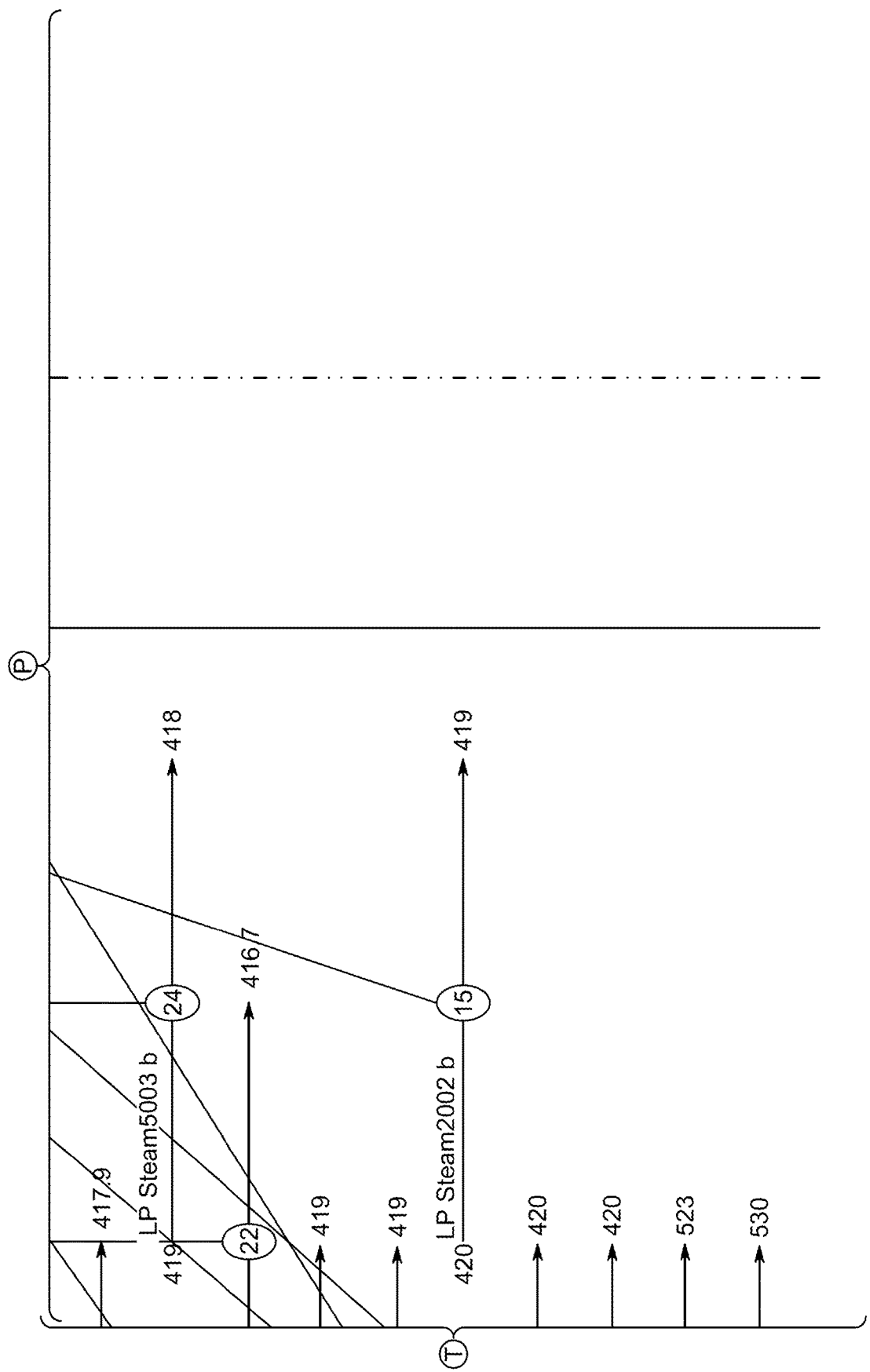

METHOD AND SYSTEM FOR RETROFITTING HEAT EXCHANGER NETWORKS

STATEMENT OF ACKNOWLEDGEMENT

This project was prepared with financial support from King Abdulaziz City for Science and Technology (KACST) through the Science & Technology Unit at King Fand University of Petroleum & Minerals (KFUPM): as part of the National Science, Technology and Innovation Plan.

BACKGROUND OF THE INVENTION

Technical Field

The present invention relates to a method and system for retrofitting and enhancing heat exchanger networks.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Over the last decades, many advances have been in the area of heat integration of chemical processes. With the occurrence of the energy crises in the 1970s, the wide attention of engineers, both in academia and in the industry, have been drawn to the economic utilization of energy in the chemical process industry. This situation, coupled with growing concern about the environment preservation, has resulted in greater efforts in energy optimization and process integration. Petrochemical industries are a major part of the economy in both the developed and developing countries. In these industries, attempts are continually made in order to maximize heat recovery, save energy, and minimize the impact of their activity on the environment. Heat exchanger networks (HEN) can recover heat from hot process streams and re-use or transfer the heat for use in cold process streams. Design optimization of a HEN with various parameters is thus needed. Many techniques for optimization in the past have used pinch analysis to study chemical processes, including those related to the petrochemical industry. Some attempts considered the pinch analysis with constant parameters. Some other attempts included flexible parameters to account for complex network configurations. However, these modifications still required structural adaptations with more practical approaches. Nowadays, there is an increasing attention toward the application of pinch concepts in the formulation of mathematical models in order to reduce the total annual operating cost (TAC). However, pinch analyses that decompose the HEN problem into separate targeted processes (i.e., utility, energy, and area) do not guarantee that the total costs are minimized.

Both the global energy supply and the environmental situation require an improved management in the utilization of energy resources. For instance, petrochemical plant efficiency (i.e., optimum production at minimum energy consumption) improvements are also capable of reducing carbon dioxide emissions associated with fossil-fuel combustion. Thus, there is a need to determine the appropriate methodology for HEN retrofitting by considering current networks, their constraints, and limitations.

BRIEF SUMMARY OF THE INVENTION

The invention overcomes the problems and disadvantages of the prior art as described in the various embodiments below.

In one embodiment, an improved HEN for optimum performance of the Propane Dehydrogenation (PDH) process at a minimum total annual cost is described. Two techniques are used to retrofit the HEN, (1) the Simulated Annealing (SA) and (2) Fixed Structure technique using Mixed Integer Nonlinear Programming (MINLP) formulation. In the SA technique, the HEN is flexible and new heat exchanger (HE) can be added or removed. In the Fixed Structure technique, the system allows a very limited space for a change of the number of heat exchangers (HEs) in the network. The results can be applied to the PDH process by selecting the feasible revamp scheme. Improved HENs are compared to those of existing HENs.

Effective energy savings of the entire plant (i.e., processed-bottlenecking, investment cost reduction, process modification and total site planning) are also considered. In addition, information and relevant data on the thermodynamic indices for evaluating the performance of the investigated petrochemical units are provided including schemes and methods to reduce energy consumption and $CO_2$ emissions.

Here, the design and operating data, which are acquired from an existing process, are used to develop the steady state simulation of the process. Heat and mass balances data generated during the above phase are then used in order to retrofit and improve the efficiency of the PDH plant.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
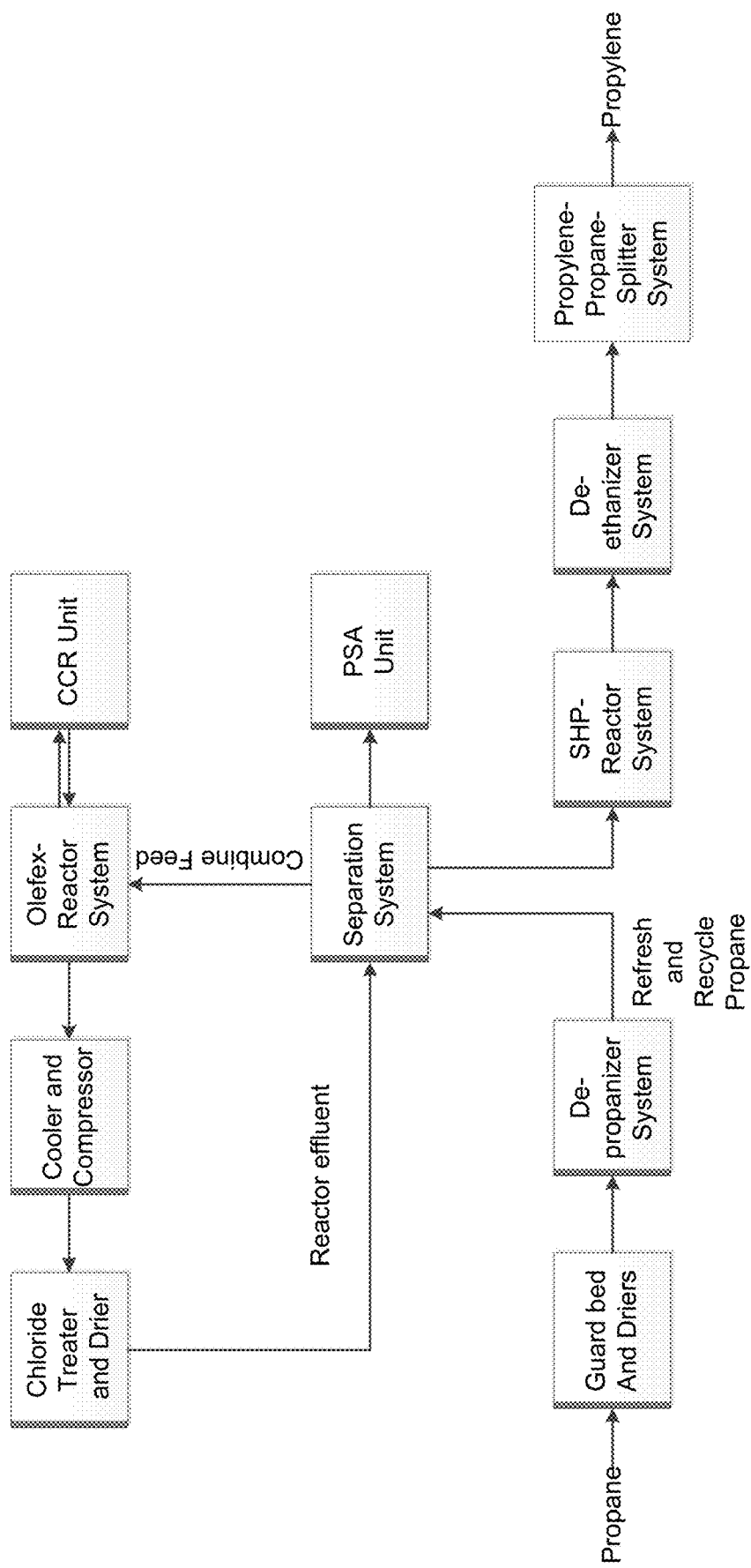
FIG. 1 shows a process block diagram of the PDH unit described according to one embodiment.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

The terms "technique," "method", and "model" as used herein, and unless otherwise specified, refers to the mathematical model for solving optimization problems associated with HEN operations.

In one embodiment, a method and/or system are adopted that involves simulation and application of mathematical models to solve problems in petrochemical operations; specifically, solutions to HEN operations. Two techniques are implemented to achieve the desired goals.

First, a Simulated Annealing technique is applied to a flexible HEN in order to minimize the TAC. Minimization of the TAC is the objective of the mathematical model which contains hot utility cost, cold utility cost, exchanger fixed duty and area cost as defined as follows. This model is different from past models in that it accounts for at least a few additional parameters, including, the number of heat exchangers, the amount of re-piping of the HEN, the amount of re-sequencing of the HEN, and the amount of splitting of the HEN.

$$MinTAC = C_{CU} \sum_{i=1}^{N_{hot}} \sum_{k=1}^{N_{HX}} U_{i,CU,k} A_k LMTD_{i,CU,k} \psi_{i,CU,k} + \tag{1}$$

$$C_{HU} \sum_{j=1}^{N_{cold}} \sum_{k=1}^{N_{HX}} U_{HU,j,k} A_k LMTD_{HU,j,k} \psi_{HU,j,k} +$$

$$AF \left[ \sum_{i=1}^{N_{hot}} \sum_{j=1}^{N_{cold}} \sum_{k=1}^{N_{Hx}} a_{ijk} + b_{ijk}(A_{ijk})^{C_k} \psi_{ijk} + \right.$$

$$\sum_{i=1}^{N_{hot}} \sum_{k=1}^{N_{Hx}} a_{i,CU,k} + b_{i,CU,k}(A_{i,CU,k})^{C_k} \psi_{i,CU,k} +$$

$$\left. \sum_{j=1}^{N_{cold}} \sum_{k=1}^{N_{Hx}} a_{HU,j,k} + b_{HU,j,k}(A_{HU,j,k})^{C_k} \psi_{HU,j,k} \right]$$

$$Q_{CU} = \sum_{i=1}^{N_{hot}} \sum_{k=1}^{N_{HX}} U_{i,CU,k} A_k LMTD_{i,CU,k} \psi_{i,CU,k} \tag{2}$$

$$Q_{HU} = \sum_{j=1}^{N_{cold}} \sum_{k=1}^{N_{HX}} U_{HU,j,k} A_k LMTD_{HU,j,k} \psi_{HU,j,k} \tag{3}$$

The Energy balance:

$$(T_i^S - T_i^T)MCp_i = Q_{Process} + \sum_{i=1}^{N_{hot}} \sum_{k=1}^{N_{HX}} U_{i,CU,k} A_k LMTD_{i,CU,k} \psi_{i,CU,k} \quad i \in H \tag{4}$$

$$(T_j^S - T_j^T)MCp_j = \tag{5}$$

$$Q_{Process} + \sum_{j=1}^{N_{cold}} \sum_{k=1}^{N_{HX}} U_{HU,j,k} A_k LMTD_{HU,j,k} \psi_{HU,j,k} \quad j \in C$$

In this step, the following constraints can be specified:
limited number of new heat exchangers
limited number of re-sequencing
limited number of re-piping
limited number of splitters $$Q_{Process} = \sum_{i=1}^{N_{hot}} \sum_{j=1}^{N_{cold}} \sum_{k=1}^{N_{Hx}} U_{ijk} A_k \Delta T_{LMTD_{ijk}} \psi_{ijk} \tag{6}$$

$$\sum_{i=1}^{N_{hot}} \sum_{j=1}^{N_{cold}} \psi_{ijk} = 1 \tag{7}$$

$$\psi_{ijk} = \begin{cases} 1 & i \cup j \text{ in } k_{Hx} \\ 0 & \text{otherwise} \end{cases}$$

$$\Delta T_{LMTD_{ijk}} = \frac{\Delta T_1 - \Delta T_2}{Ln\left(\frac{\Delta T_1}{\Delta T_2}\right)}; m_i Cp_i \Delta T_i = m_j Cp_j \Delta T_j$$

$$\sum_{\substack{x=0 \\ x \neq k}}^{N_{Hx}} P_{xk} = 1; \sum_{\substack{m=0 \\ m \neq k}}^{N_{Hx}} L_{mk} = 1$$

$$P_{xy} = \begin{cases} 0, & \text{No piping from } x \to k \\ 1, & \text{Have piping from } m \to k \end{cases};$$

$$L_{mk} = \begin{cases} 0, & \text{No piping from } m \to k \\ 1, & \text{Have piping from } m \to k \end{cases}$$

Where P=Piping for hot stream; i=hot stream
L=Piping for cold stream; j=cold stream
$N_{HX}$ =Number of heat exchangers; $k_{Hx}$=index of heat exchanger
A=Area of heat exchanger; a & b=process stream and utility stream in HENs
$T^T$=Outlet temperature of stream (K); $T^S$=Inlet temperature of stream (K)
CP=Heat capacity flow rate (MW/K); Cp=Specific heat capacity (Kj/(Kg·K))
$C_{CU}$ =Cost per unit of cold utility; $C_{HU}$ =Cost per unit of hot utility
$C_k$ =Exponent for area cost; Q=Duty; U=Heat transfer coefficient (MW/(m²·K))
$\Psi_{ijk}$=indicates the existence of a match ij at heat exchanger, k, in an optimal HEN;

$\Psi_{i,CU}$=indicates the existence of a match between hot stream i and cold utility If $P_{xk}=1$; $L_{mk}=1$; x=m=k=heat exchanger index The logarithmic mean temperature difference [$\Delta T_{LMTD}$] in different matched (ijk; HU,j; i,CU) superstructures for shell and tube exchangers for counter-current and concurrent flow is given by:

$$\Delta T_{LMTD \atop i,j,k} = \sum_{\substack{x=0 \\ x \neq k}}^{N_{Hx}} \sum_{\substack{m=0 \\ m \neq k}}^{N_{Hx}} \frac{(T_{i,x} - T_{j,k}) - (T_{i,k} - T_{j,m})}{\text{Ln}\left(\frac{(T_{i,x} - T_{j,k})}{(T_{i,k} - T_{j,m})}\right)} P_{x,k} L_{mk}, \tag{8}$$

$$i \in H, j \in C, k \in K$$

$$\Delta T_{LMTD \atop i,CU,K} = \sum_{\substack{x=0 \\ x \neq k}}^{N_{Hx}} \sum_{\substack{m=0 \\ m \neq k}}^{N_{Hx}} \frac{(T_{i,x} - T_{CU,k}) - (T_{i,k} - T_{CU,m})}{\text{Ln}\left(\frac{(T_{i,x} - T_{CU,k})}{(T_{i,k} - T_{CU,m})}\right)} P_{x,k} L_{mk}, i \in H \tag{9}$$

$$\Delta T_{LMTD \atop HU,j,k} = \sum_{\substack{x=0 \\ x \neq k}}^{N_{Hx}} \sum_{\substack{m=0 \\ m \neq k}}^{N_{Hx}} \frac{(T_{HU,x} - T_{j,k}) - (T_{HU,k} - T_{j,m})}{\text{Ln}\left(\frac{(T_{HU,x} - T_{j,k})}{(T_{HU,k} - T_{j,m})}\right)} P_{x,k} L_{mk}, j \in C \tag{10}$$

The area of a heat exchanger in different matched (ijk; HU, j; i, CU) superstructures is given by:

$$A_{i,j,k} = \frac{q_{ijk}}{\Delta T_{LMTD \atop i,j,k} U_{i,j}} i \in H, j \in C, k \in K \tag{11}$$

$$A_{i,CU} = \frac{q_{i,CU}}{\Delta T_{LMTD \atop i,CU} U_{i,CU}} i \in H \tag{12}$$

$$A_{HU,j} = \frac{q_{HU,j}}{\Delta T_{LMTD \atop HU,j} U_{HU,j}} j \in C \tag{13}$$

When selected the overall heat transfer coefficient U will be calculated from the value specified in the heat exchanger match given by:

$$U_{i,j} = \left[\frac{1}{h_i} + \frac{1}{h_j}\right]^{-1} \tag{14}$$

$$U_{i,CU} = \left[\frac{1}{h_i} + \frac{1}{h_{CU}}\right]^{-1} \tag{15}$$

$$U_{HU,j} = \left[\frac{1}{h_{HU}} + \frac{1}{h_j}\right]^{-1} \tag{16}$$

Second, a Fixed Structure method is applied to get the minimum TAC based on
1. minimal changes to the structure of HEN,
2. changing process stream rates, and
3. varying process stream heat exchanger duties and heat exchanger areas.

Finally, the two techniques are compared and based on the lowest Total Annual Cost criteria, one of the two solutions presented by the techniques is selected.

Existing HEN

In one embodiment, the original PDH produces a polymer grade propylene product from a propane feed stream. FIG. 1 shows a process block diagram of one embodiment of the PDH unit according to one embodiment that includes various systems including a separation system, an olefex-reactor system, a cooler and compressor, a chloride treater and drier, a CCR unit, and a PSA unit. The PDH unit's initial yield is 50 metric tons per hour (t/h). Only 47.5 t/h are produced by the unit at end of run conditions. Propylene production is further increased with the extra processing of 1.5 t/h of recovered material from the downstream polypropylene production unit.

The propylene product from the PDH plant is later processed in the downstream process unit for the production of polypropylene. The entire PDH-unit consists of the process sections and the supporting systems (i.e., cooling and heating systems . . . ).

Figure 2:
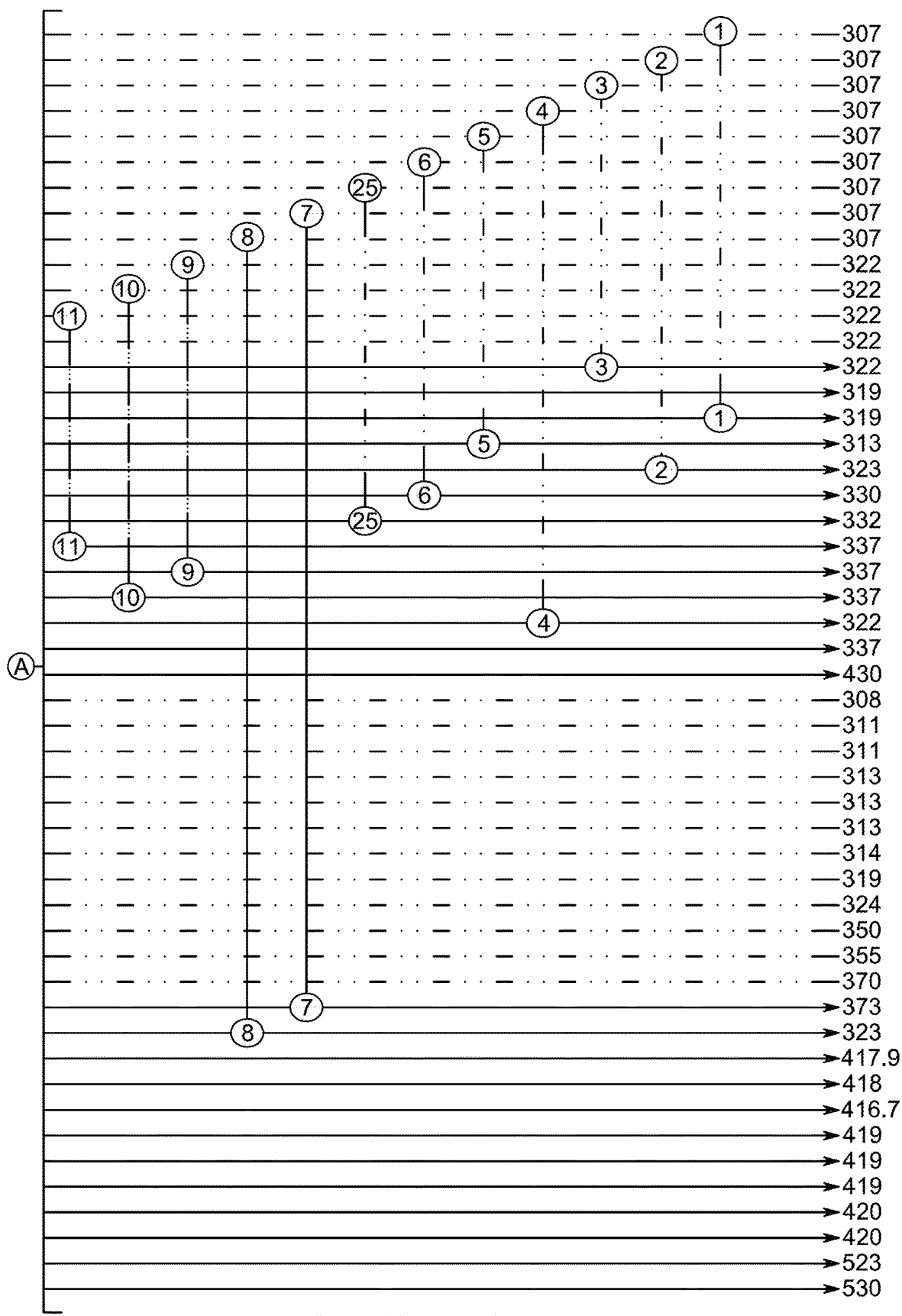
FIG. 2 shows a grid diagram of an existing HEN of the PDH unit according to one embodiment.

In this embodiment, the process consists of 25 heat exchangers. There are a total of 50 streams. 12 cold process streams and 13 hot process streams as well as 12 hot and 13 cold utilities streams. The hot exchanger's utility uses HP, LP steam or hot water while the cold utility heat exchangers use either cooling water or an air supply. The details of all the streams and utilities are listed in Tables 1 and 2 below, respectively. The grid diagram of existing HEN of PDH is shown in FIG. 2 according to one embodiment.

TABLE 1

The hot and cold stream for existing design

| No. | Stream | Flow rate [kg/h] | $T^S$ [K] | $T^T$ [K] | MCp [kW/K] | DH [kW] | FR [(m²·K)/kW] | Inlet Pressure [bar] | Cp [kJ/(kg·K)] |
|---|---|---|---|---|---|---|---|---|---|
| 1 | E-4501-1a | 166321 | 313 | 333 | 125.00 | 2500 | 0.00026 | 37 | 2.71 |
| 2 | E-4504 a | 660913 | 328 | 319 | 6262.22 | 56360 | 0.0001 | 18.5 | 34.11 |
| 3 | E-4504 b | 2207244 | 313 | 314 | 56360.00 | 56360 | 0.0001 | 13.2 | 91.92 |
| 4 | E-4505 a | 189761 | 328 | 319 | 1797.78 | 16180 | 0.00026 | 18.2 | 34.11 |
| 5 | E-4507 a | 303802 | 334 | 323 | 1618.18 | 17800 | 0.00026 | 29.3 | 19.18 |
| 6 | E-5001 a | 6414 | 308 | 327 | 31.58 | 600 | 0.00026 | 1.01325 | 17.72 |
| 7 | E-5002 a | 343793 | 324 | 322 | 13815.00 | 27630 | 0.00026 | 16.9 | 144.66 |
| 8 | E-5003 a | 1954991 | 370 | 372 | 14600.00 | 29200 | 0.00035 | 17.8 | 26.89 |
| 9 | E-5004 a | 201 | 355 | 477 | 0.41 | 50 | 0.00026 | 4 | 7.34 |
| 10 | E-5006 a | 6414 | 505 | 322 | 6.99 | 1280 | 0.00026 | 17.4 | 3.93 |
| 11 | E-5010 a | 64142 | 330 | 313 | 58.24 | 990 | 0.00026 | 24.1 | 3.27 |
| 12 | E-1001 a | 174999 | 324 | 825 | 149.16 | 74730 | 0.00035 | 3 | 3.07 |
| 13 | E-1001 b | 175623 | 880 | 430 | 166.07 | 74730 | 0.00035 | 0.38 | 3.40 |
| 14 | E-3008 a | 176442 | 337 | 330 | 110.00 | 770 | 0.00018 | 13.3 | 2.24 |
| 15 | E-3009 a | 11840 | 338 | 332 | 42.50 | 255 | 0.00018 | 3.49 | 12.92 |
| 16 | E-2001 a | 429 | 311 | 394 | 1.69 | 140 | 0.00018 | 4.1 | 14.15 |
| 17 | E-2002 a | 967 | 311 | 394 | 2.29 | 190 | 0.00018 | 4.3 | 8.52 |
| 18 | E-3003 a | 175912 | 431 | 337 | 121.60 | 11430 | 0.0007 | 0.22 | 2.49 |

TABLE 1-continued

The hot and cold stream for existing design

| No. | Stream | Flow rate [kg/h] | $T^S$ [K] | $T^T$ [K] | MCp [kW/K] | DH [kW] | FR [(m²·K)/kW] | Inlet Pressure [bar] | Cp [kJ/(kg·K)] |
|---|---|---|---|---|---|---|---|---|---|
| 19 | E-3004 a | 176442 | 438 | 337 | 124.26 | 12550 | 0.00027 | 4.17 | 2.54 |
| 20 | E-3005 a | 176442 | 410 | 337 | 123.84 | 9040 | 0.00036 | 13.5 | 2.53 |
| 21 | E-3007 a | 11840 | 505 | 337 | 14.46 | 2430 | 0.0007 | 3.67 | 4.40 |
| 22 | E-4502 a | 614811 | 350 | 351 | 24210.00 | 24210 | 0.00035 | 30.3 | 141.76 |
| 23 | E-4501-2 a | 250 | 319 | 423 | 1.06 | 110 | 0.00026 | 2.1 | 15.23 |
| 24 | E-6801 a | 25560 | 314 | 343 | 24.14 | 700 | 0.0002 | 6.8 | 3.40 |
| 25 | E-6802 a | 6000 | 313 | 357 | 6.17 | 271.3 | 0.0002 | 6 | 3.70 |

TABLE 2

The hot and cold utilities for existing design

| No. | Utility | $T^S$ [K] | $T^T$ [K] | FR [(m²·K)/kW] | Flow Rate [kg/h] | Cp [kJ/(kg·K)] | Inlet Pressure [bar] |
|---|---|---|---|---|---|---|---|
| 1 | LP Steam 4501-1b | 420 | 419 | 9.00E-05 | 4229 | 2.32 | 3.2 |
| 2 | Cooling Water 4505 b | 307 | 319 | 0.00018 | 1742562 | 4.18 | 4.5 |
| 3 | Cooling Water 4507 b | 307 | 322 | 0.00018 | 1022789 | 4.18 | 4.5 |
| 4 | LP Steam 5001 b | 418 | 417.9 | 9.00E-05 | 1015 | 2.32 | 2.32 |
| 5 | Cooling Water 5002 b | 307 | 319 | 0.00018 | 1984240 | 4.18 | 4.5 |
| 6 | LP Steam 5003 b | 419 | 418 | 0.00018 | 49338 | 2.32 | 3.2 |
| 7 | HP Steam 5004 b | 673 | 530 | 9.00E-05 | 71 | 3.73 | 43.5 |
| 8 | Cooling Water 5006 b | 307 | 322 | 0.00018 | 73550 | 4.18 | 4.5 |
| 9 | Cooling Water 5010 b | 307 | 313 | 0.00018 | 64142 | 4.18 | 4.5 |
| 10 | Cooling Water3008 b | 307 | 322 | 0.00018 | 43962 | 4.18 | 4.5 |
| 11 | Cooling Water 3009 b | 307 | 322 | 0.00018 | 14673 | 4.18 | 4.51 |
| 12 | LP Steam 2001 b | 420 | 419 | 0.0001 | 242 | 2.32 | 3.2 |
| 13 | LP Steam 2002 b | 420 | 419 | 0.0001 | 317 | 2.32 | 3.2 |
| 14 | Air 3003 b | 322 | 323 | 0.00035 | 47162185 | 1 | 1.01 |
| 15 | Air 3004 b | 322 | 323 | 0.00035 | 45180000 | 1 | 1.01 |
| 16 | Air 3005 b | 322 | 323 | 0.00035 | 38086334 | 1 | 1.01 |
| 17 | Air 3007 b | 322 | 323 | 0.00035 | 9464843 | 1 | 1.01 |
| 18 | LP Steam 4502 b | 419 | 416.7 | 9.00E-05 | 40874 | 2.19 | 3.2 |
| 19 | HP Steam 4501-2 b | 623 | 523 | 9.00E-05 | 270 | 3.7 | 41 |
| 20 | LP Steam 6801 b | 433 | 420 | 0.0001 | 1180 | 2.32 | 3.5 |
| 21 | LP Steam 6802 b | 433 | 420 | 0.0001 | 460 | 2.32 | 3.5 |
| 22 | Hot Water 7004 A | 375 | 373 | 0.0001 | 9787 | 4.18 | 0.1 |
| 23 | Cooling Water 7004 b | 307 | 322 | 0.00018 | 354595 | 4.18 | 4 |
| 24 | Hot Water 7006 a | 377.4 | 323 | 0.0001 | 6300 | 4.18 | 0.2 |
| 25 | Cooling Water 7006 b | 307 | 322 | 0.00018 | 391630 | 4.18 | 4 |

In order to make a decision about the economic feasibility of a plant, an economical evaluation must be performed. The typical operating time is 8600 hours, while the plant is assumed to have a lifetime of 5 years. With regards to cost, the annual interest rate is assigned to be roughly 6%. The mathematical formula, used to determine the annualization factor, is given by:

$$\text{Annualization factor} = R(1+R)^n/(1+R)^n - 1$$

The operation costs are mainly related to the consumption of fuel for heat generation. This heat is necessary for steam generation in order to supply the hot streams. Moreover, the cost associated with cold utilities is also included, but is lower in comparison with that required for the hot utilities. Table 3 below lists an exemplary instance of the cost data for hot and cold utilities.

TABLE 3

The fuel price of the hot and cold utilities

| | Fuel price |
|---|---|
| Hot Utility | |
| HP steam | $7.2 (USD)/ton |
| LP steam | $6.2 (USD)/ton |
| Hot water | $2 (USD)/ton |
| Cold Utility | |
| Cooling water | $0.2 (USD)/ton |
| Air cooling | $0.2 (USD)/KWh |

Heat exchanger (HE) and utility cost are given by the following equations:

$$HE\text{ cost} = A_1 + B_1(\text{area})^{C_1}$$

$$\text{Capital cost (Utility)} = A_2 + B_2(\text{Duty})^{C_2}$$

Annualized Total Cost (TAC)=Annualized Energy cost+Annualized Capital Cost where $A$ represents the fixed cost.

Here, $A_1$ and $A_2$ are taken as 0 since only revamping of an existing design is considered. $A_1$ and $A_2$ will be nonzero in the case where a new heat exchanger is added after retrofitting.

$B_1$, the heat exchanger cost per unit, depends on the type of the material as indicated in Table 4 below.

TABLE 4

The price of heat exchanger's material

| Material | Density [kg/m³] | Material price $/t | Thermal conductivity [W/(m · k)] |
|---|---|---|---|
| CS | 7850 | 530 | 46.7 |
| SS | 7930 | 550 | 19 |

Pinch Analysis

Figure 3:
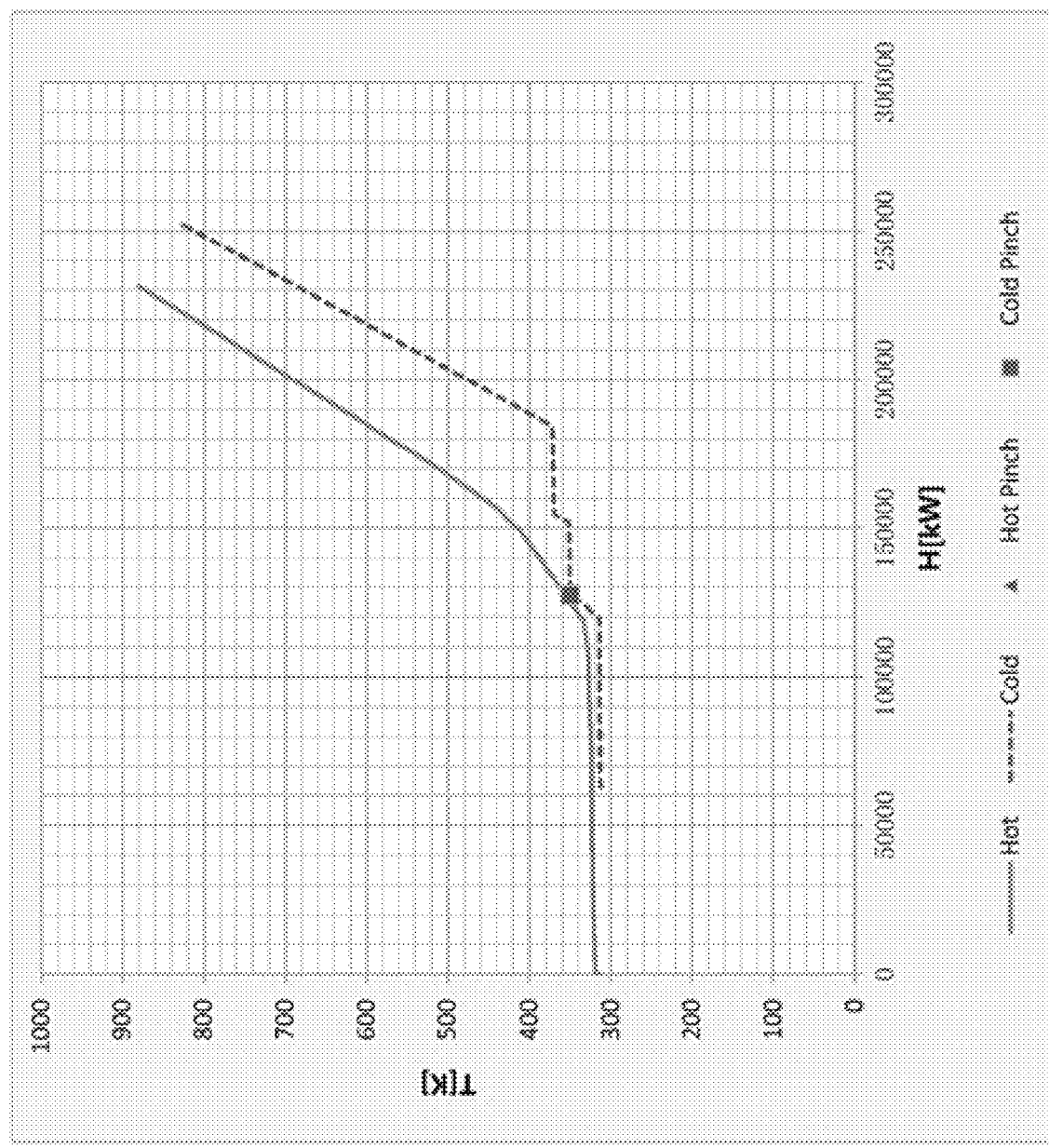
FIG. 3 shows composite curves for the existing HEN of the PDH unit according to one embodiment.
Figure 4:
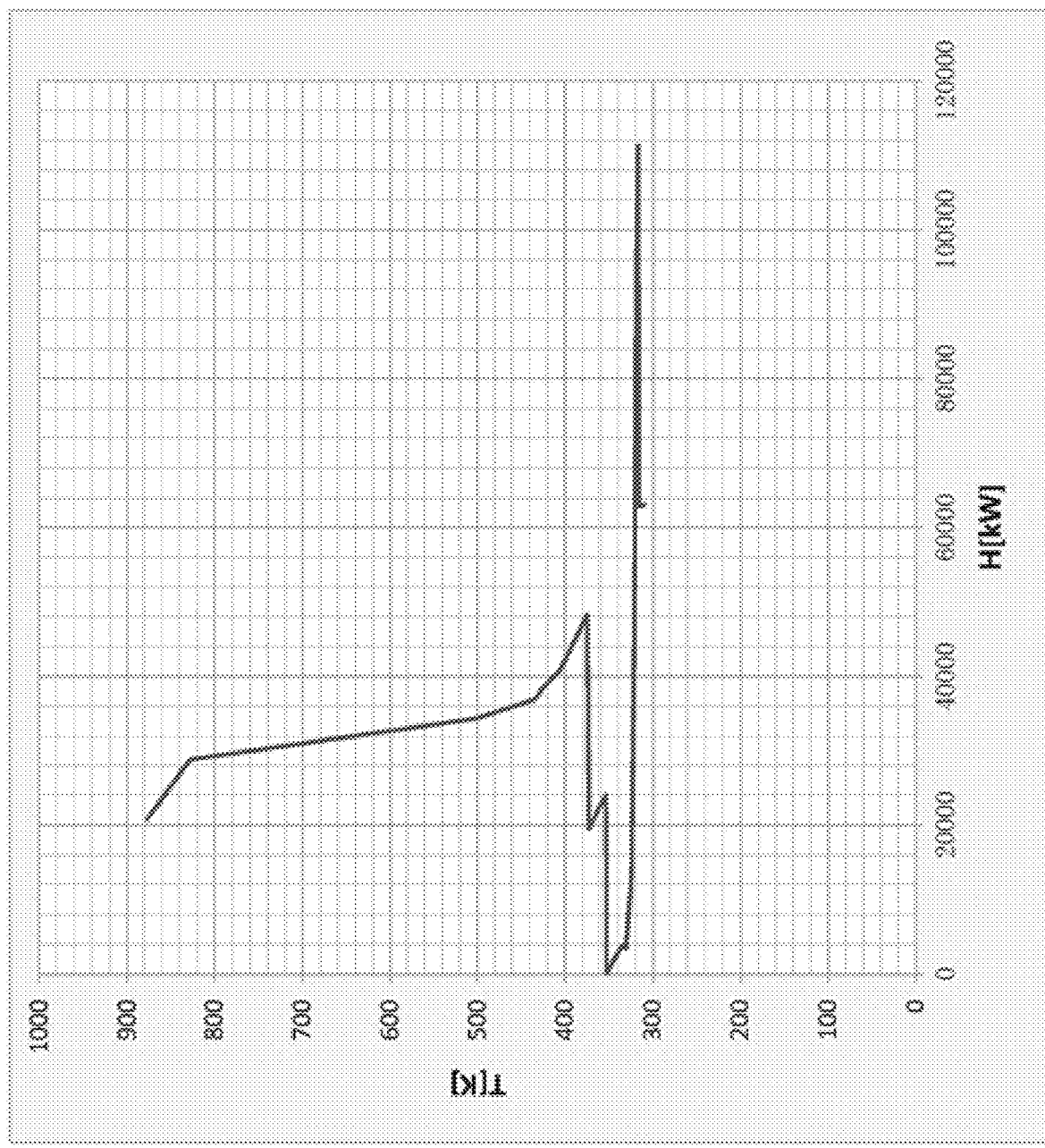
FIG. 4 shows a grand composite curve of the existing HEN of the PDH unit according to one embodiment.

Pinch Analysis is used to carry on the optimization of the process. It is found that the hot and cold utility demands of the existing network are 72.54 MW and 128.53 MW, respectively as shown in the composite curve in FIG. 3 according to one embodiment. In addition, the grand composite curve (GCC) is presented in FIG. 4 showing the variation of utilities selected according to one embodiment.

Figure 5A:
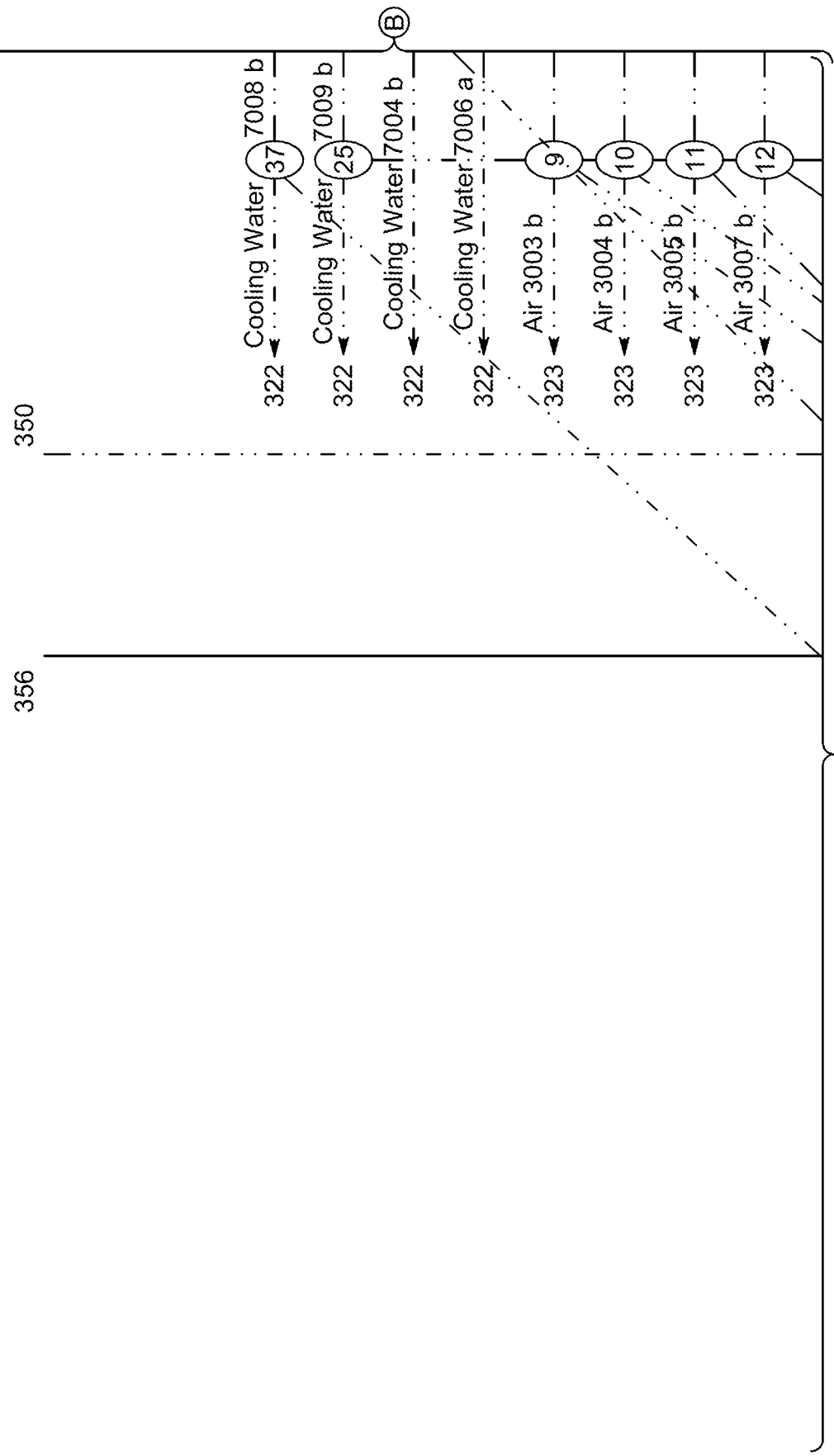
FIG. 5A shows a pinch configuration of the existing HEN of the PDH unit according to one embodiment.
Figure 5A:
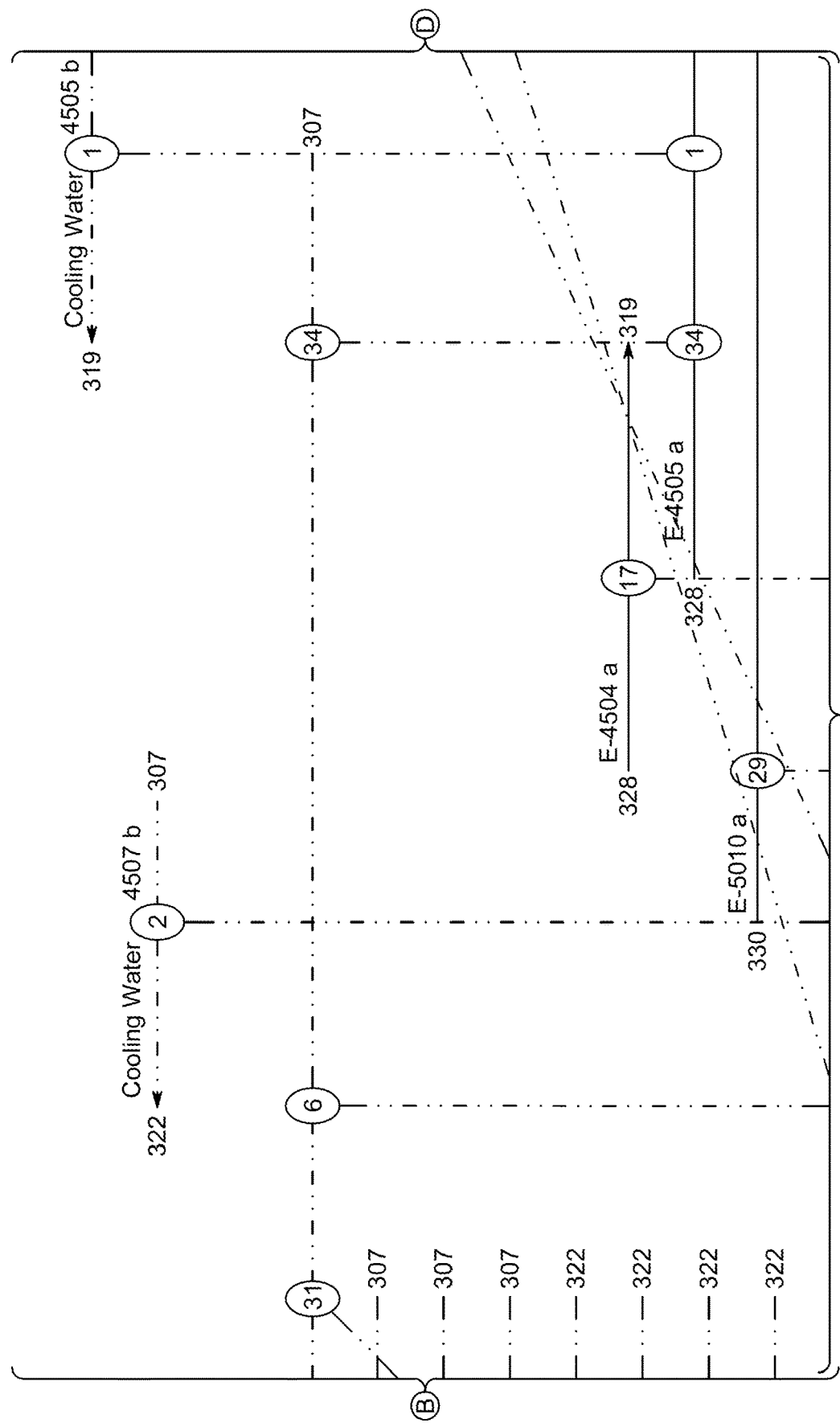
Figure 5A:
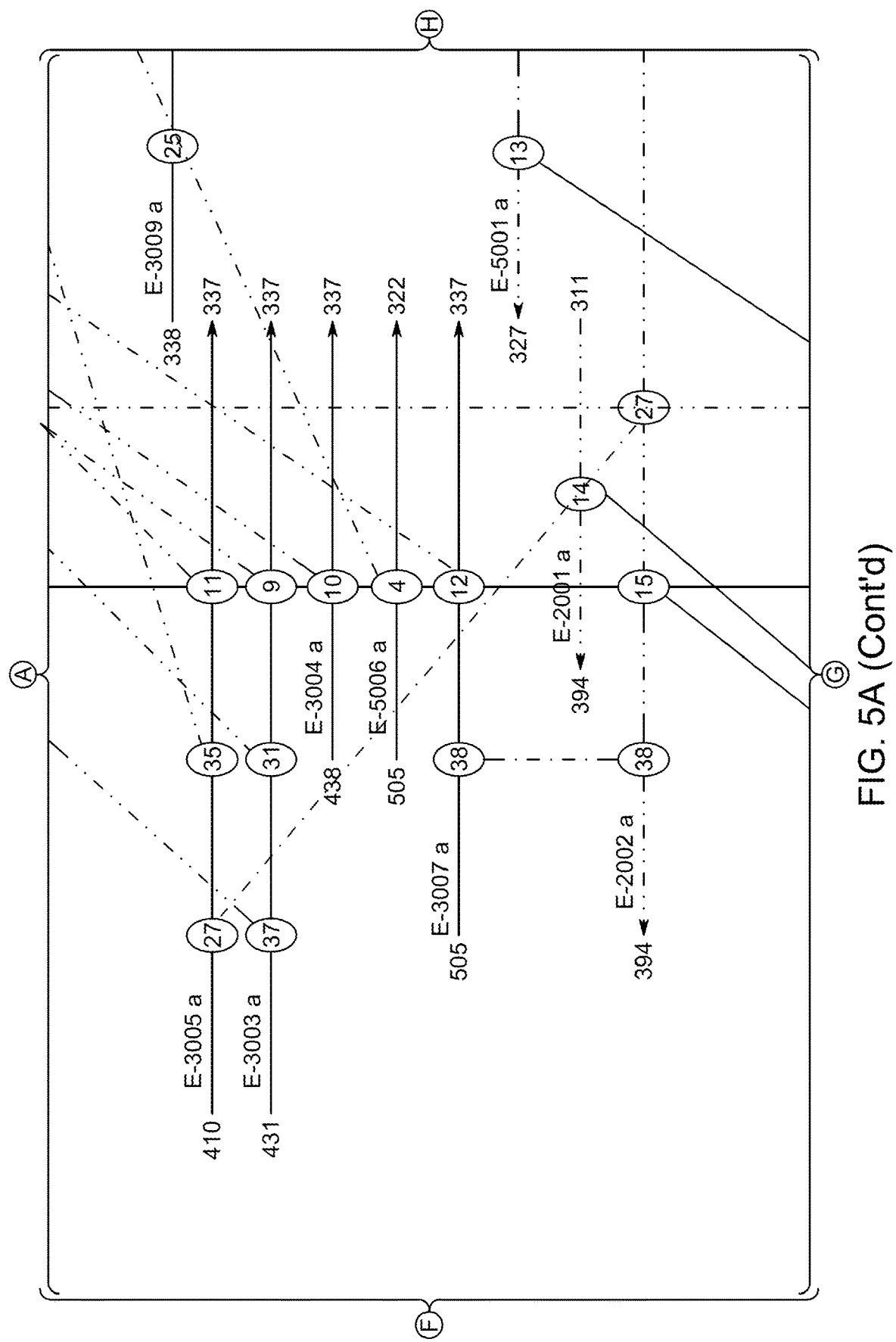
Figure 5A:
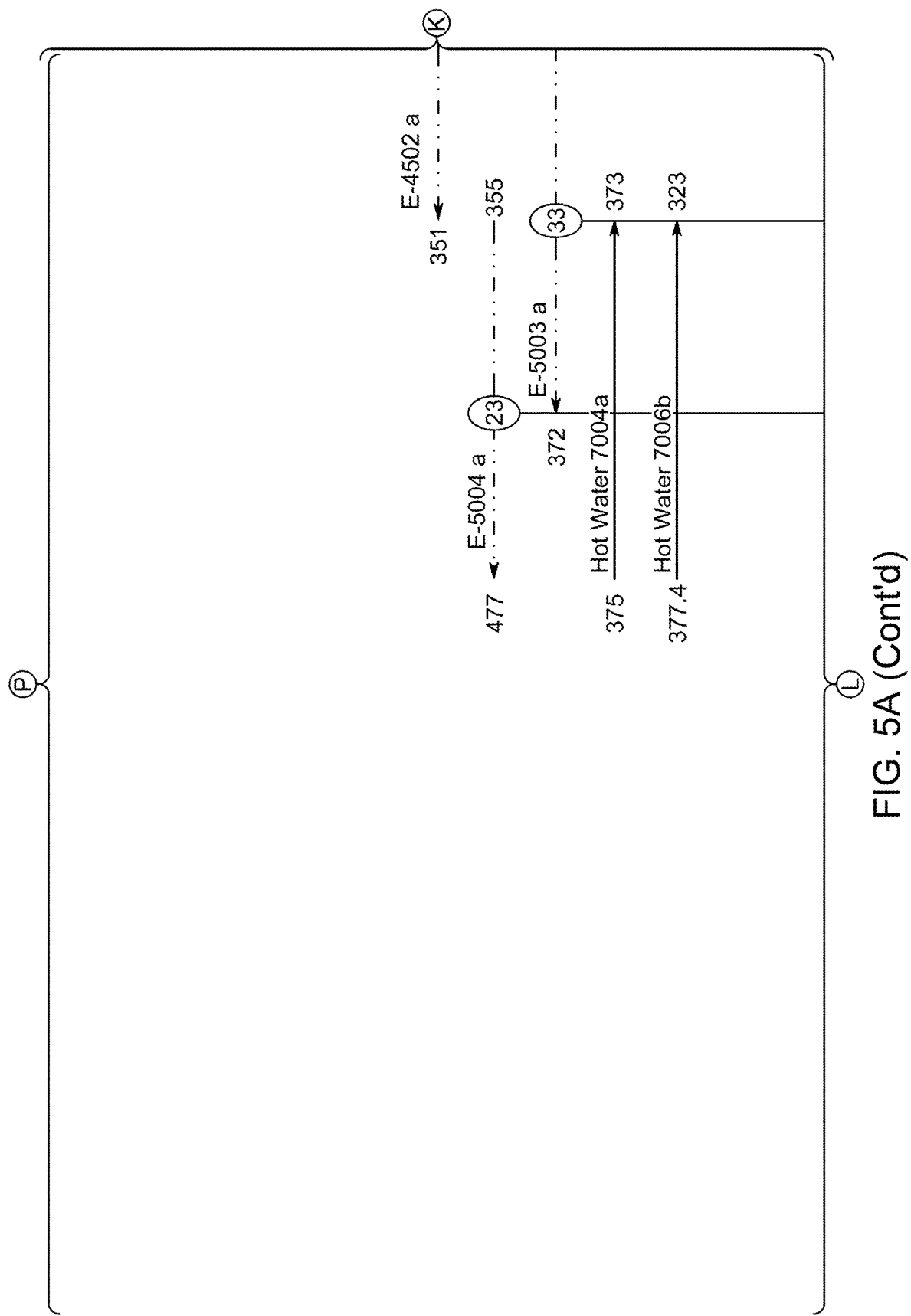
Figure 5A:
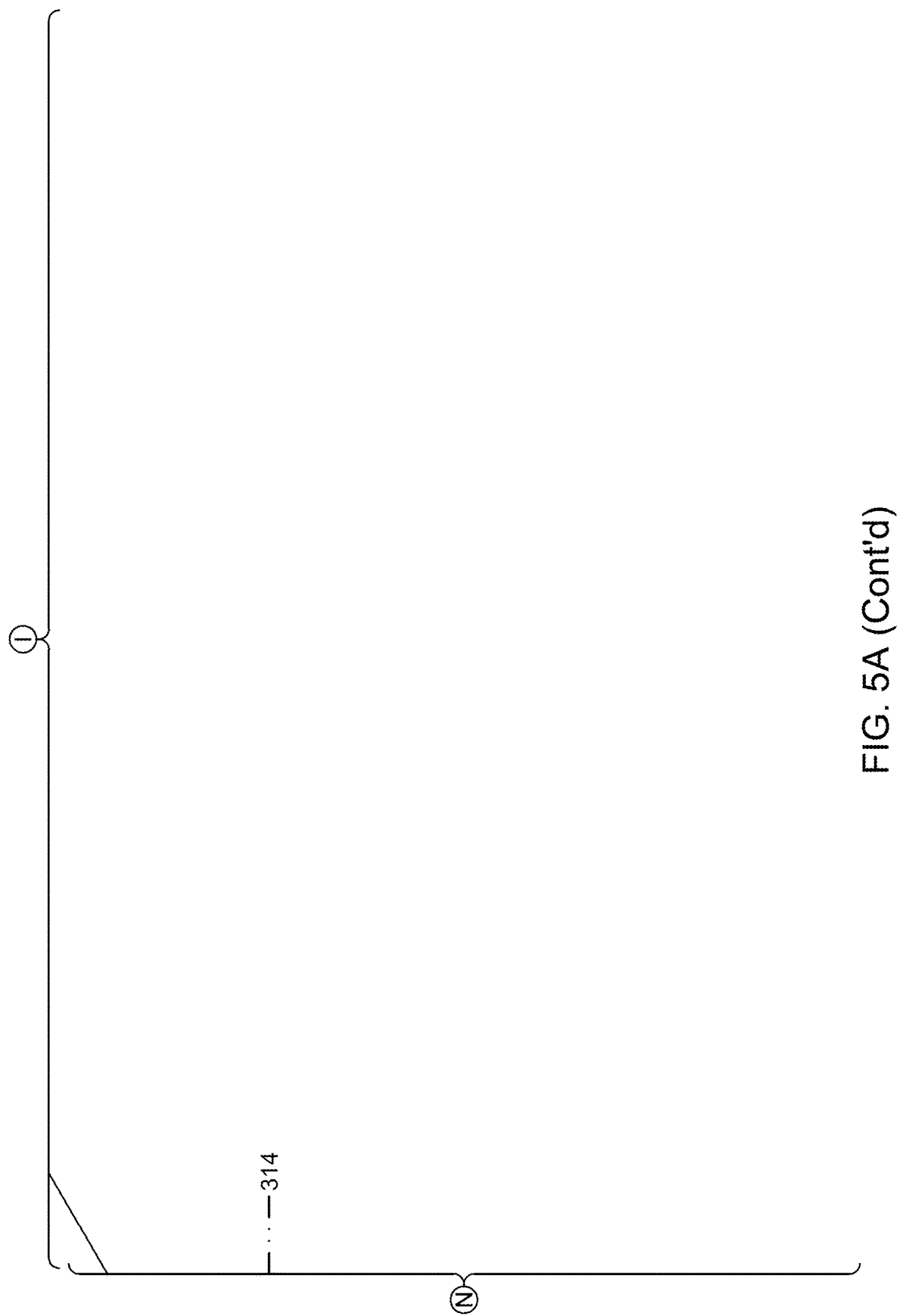
Figure 5A:
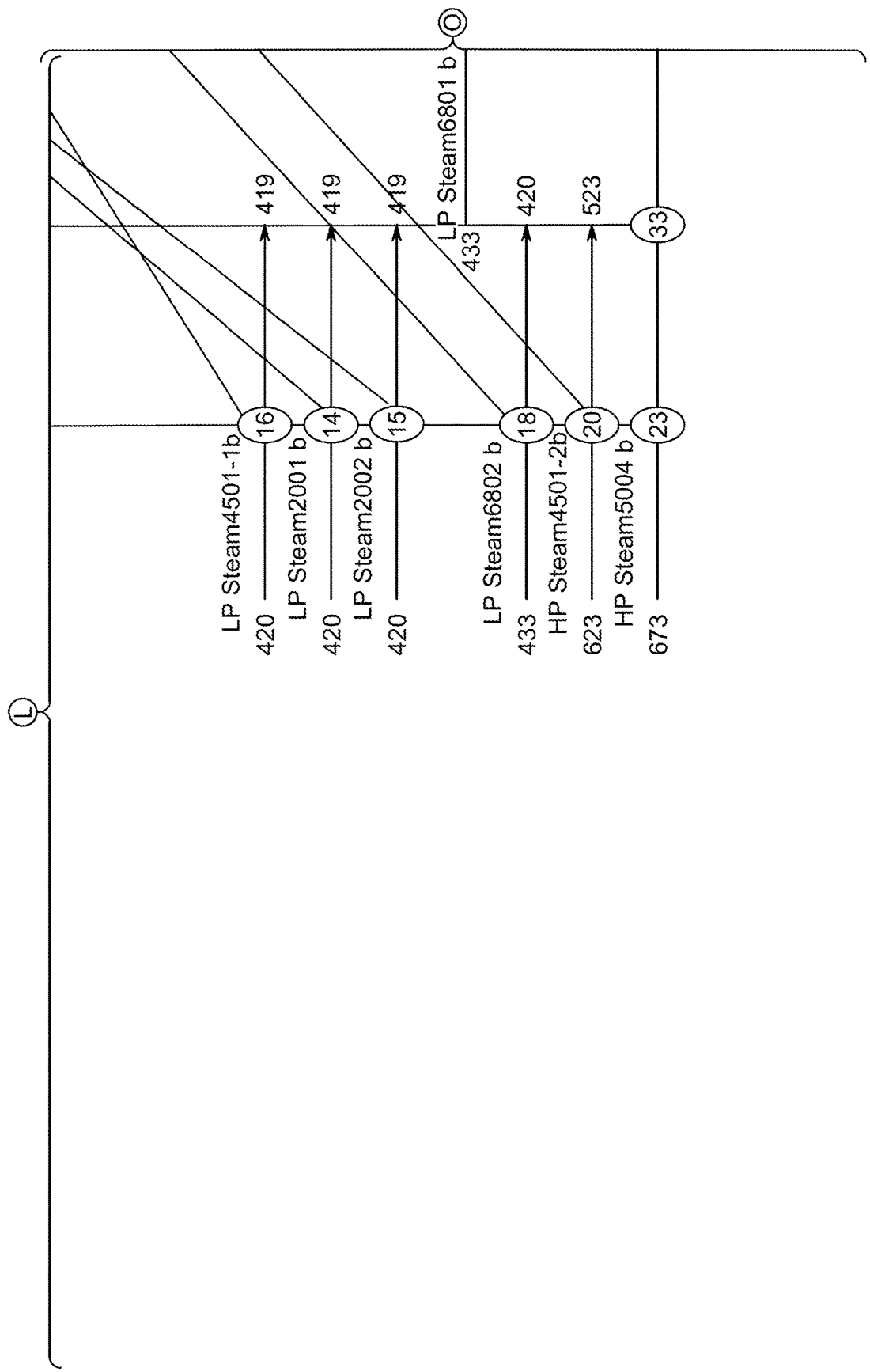
Figure 5A:
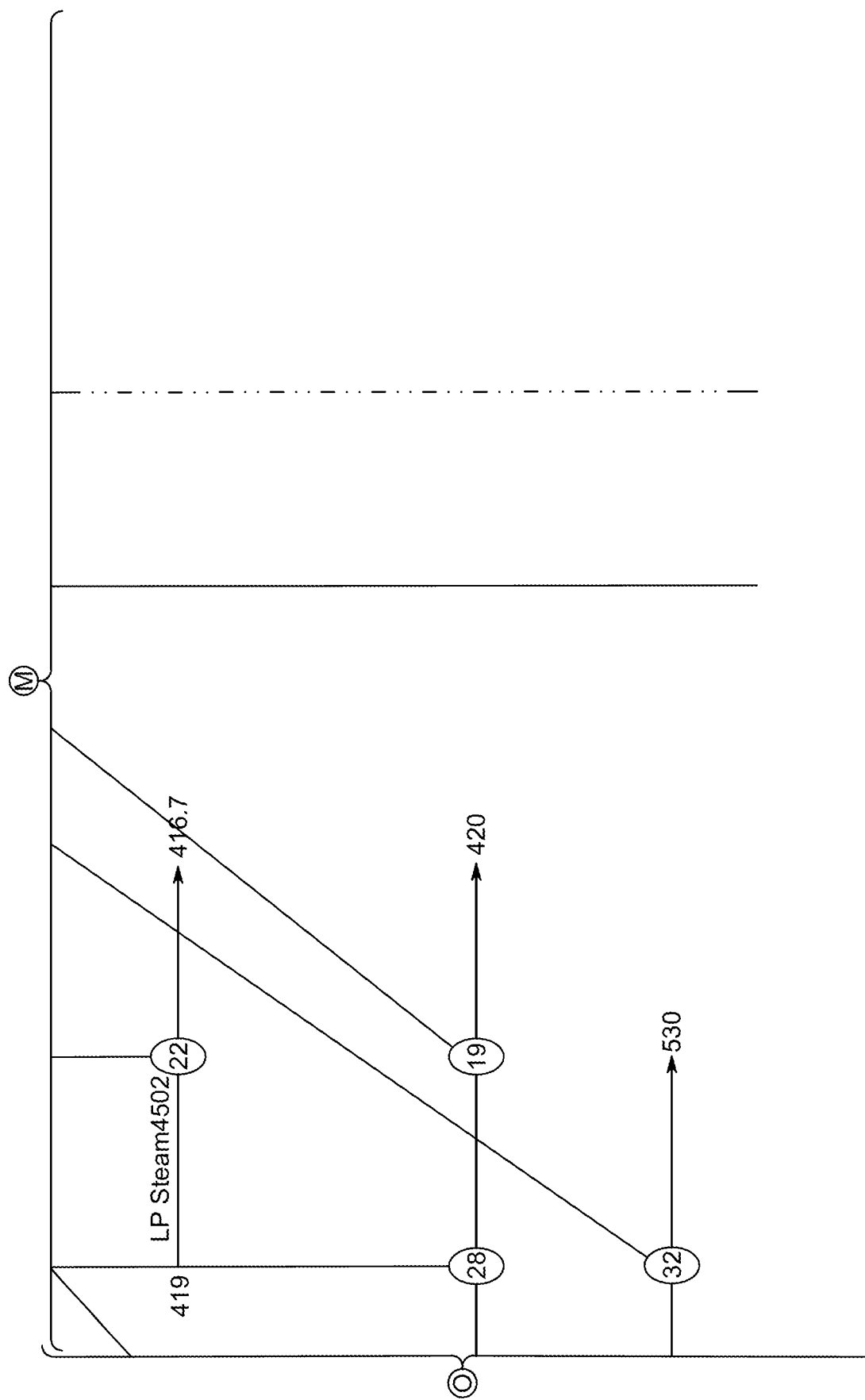
Figure 5A:
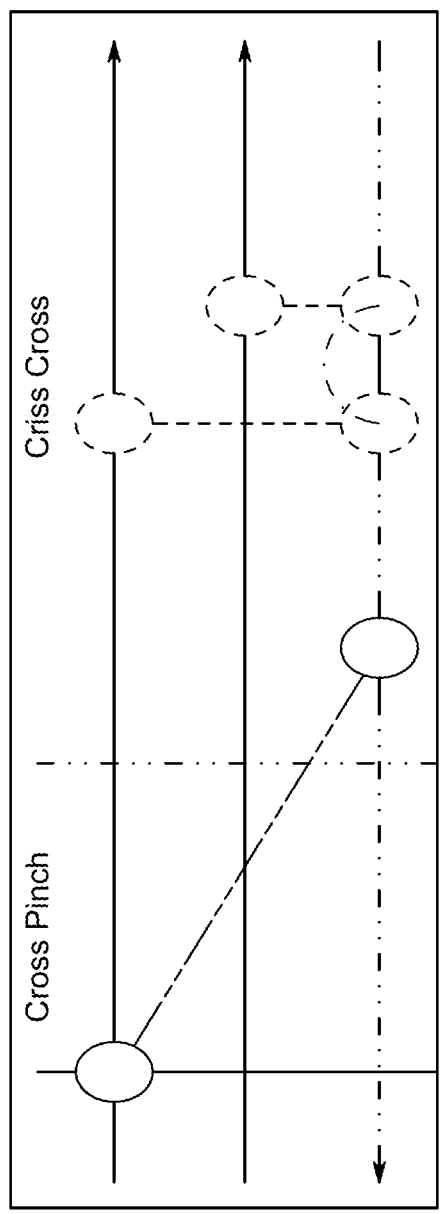

When pinch analysis is applied to the current heat exchangers network, 15 heat exchangers out of the 25 (EX1074, EX1073, EX1072, EX1071, EX1069, EX1068, EX1067, EX1066, EX1065, EX1064, EX1063, EX1062, EX1061, EX1060, EX1057) crossed the pinch temperature as shown in Table 5 below and FIG. 5A according to one embodiment.

The search is based on two methods:

1. Simulated Annealing and
2. Fixed Structure.

Figure 6:
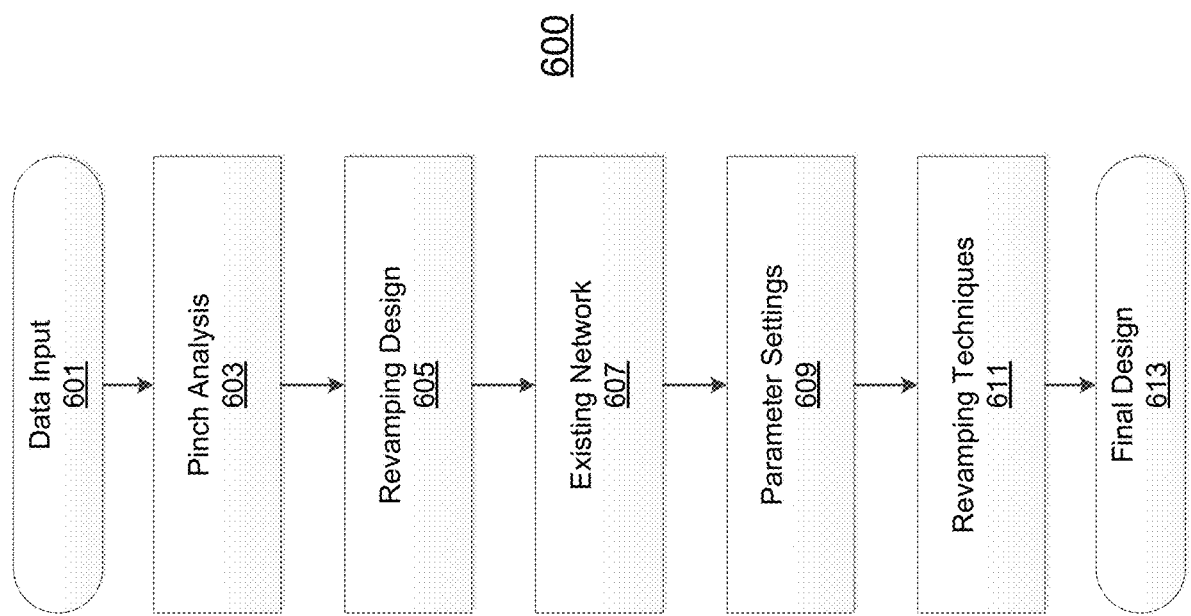
FIG. 6 shows a flow diagram of the method for retrofitting the existing HEN of the PDH unit through the optimization and enhancement process described according to one embodiment.

FIG. 6 shows the detailed flow diagram 600 of the retrofitting procedure according to one embodiment. In one embodiment, the data input 601 includes flow rate data, heat exchanger utility data, and cost data. The heat exchanger utility data may include, inlet temperature, outlet temperature, exchanger duty, or exchanger specific heat capacity. The Existing HEN then undergoes pinch analysis 603 to identify bottlenecks in the HEN. Once bottlenecks, which may include heat exchangers which cross the pinch, are identified, a revamped designing 605 may begin. The existing network 607 is considered and parameters are set 609. The parameters may be for HEN objectives, HEN variables, or HEN constraints. The HEN processor may then be used to revamp the HEN (611). The revamped HEN 611 is based on two retrofit techniques including a simulated annealing retrofit and a fixed structure retrofit. Based on the results each technique establishes a final resulting retrofit 613 for the existing HEN.

Simulated Annealing (SA) Technique

Stochastic analysis provides that the structure is randomly moved from one state to another state by series of defined moves. The flow diagram 700 showing the steps of the

TABLE 5

Heat exchangers that across the pinch and cross pinch duty for existing network

Hot side (Pinch Temperature:356)

| No. | Name | Duty [kW] | Cross pinch duty [kW] | Stream Name | MCp [kW/K] | Inlet Temp [K] | Outlet Temp [K] |
|---|---|---|---|---|---|---|---|
| 21 | EX1074 | 79936.1 | 3878.2 | E-1001 b | 166.067 | 880 | 398.651 |
| 20 | EX1073 | 112.014 | 32.7885 | HP Steam 4501-2 b | 1.12014 | 623 | 523 |
| 19 | EX1072 | 1226.97 | 868.966 | LP Steam 6801 b | 94.3825 | 433 | 420 |
| 18 | EX1071 | 276.205 | 228.139 | LP Steam 6802 b | 21.2465 | 433 | 420 |
| 16 | EX1069 | 2551.95 | 2551.95 | LP Steam 4501-1b | 2551.95 | 420 | 419 |
| 15 | EX1068 | 235.285 | 89.2771 | LP Steam 2002 b | 235.285 | 420 | 419 |
| 14 | EX1067 | 140 | 65.7831 | LP Steam 2001 b | 140 | 420 | 419 |
| 13 | EX1066 | 600 | 600 | LP Steam 5001 b | 6000 | 418 | 417.9 |
| 12 | EX1065 | 2629.12 | 2155.18 | E-3007 a | 14.4643 | 505 | 323.233 |
| 11 | EX1064 | 10579.5 | 6687.12 | E-3005 a | 123.836 | 410 | 324.568 |
| 10 | EX1063 | 12550 | 10189.1 | E-3004 a | 124.257 | 438 | 337 |
| 9 | EX1062 | 13100.6 | 9119.68 | E-3003 a | 121.596 | 431 | 323.261 |
| 8 | EX1061 | 7068.44 | 2780.6 | Hot Water 7006 b | 129.935 | 377.4 | 323 |
| 7 | EX1060 | 6171 | 6171 | Hot Water 7004 a | 3085.5 | 375 | 373 |
| 4 | EX1057 | 1376.58 | 1042.19 | E-5006 a | 6.99454 | 505 | 308.192 |

Figure 7:
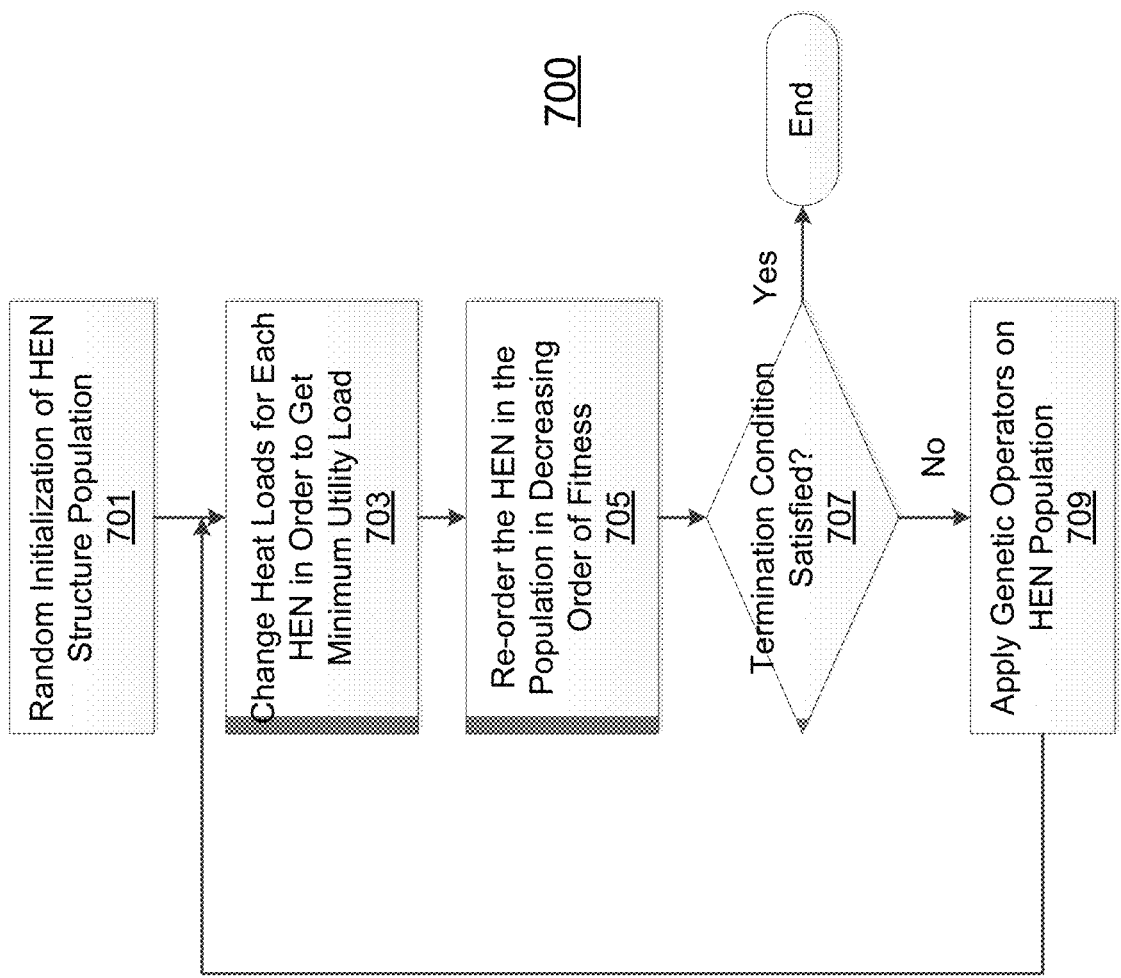
FIG. 7 shows a flow diagram of the method for a general framework and minimum utility load optimal synthesis of the existing HEN using a SA technique according to one embodiment.

After identifying the bottleneck from the pinch configuration, the networks are revamped using the available techniques. The solution is obtained by adding new areas, finding new matches, re-allocating existing matches within the various constrains such as maximum added area and space limits. We will search for a cost effective, as well as practical, revamping solution.

generalized method for HEN synthesis, using stochastic analysis is depicted in FIG. 7 according to one embodiment.

Figure 8A:
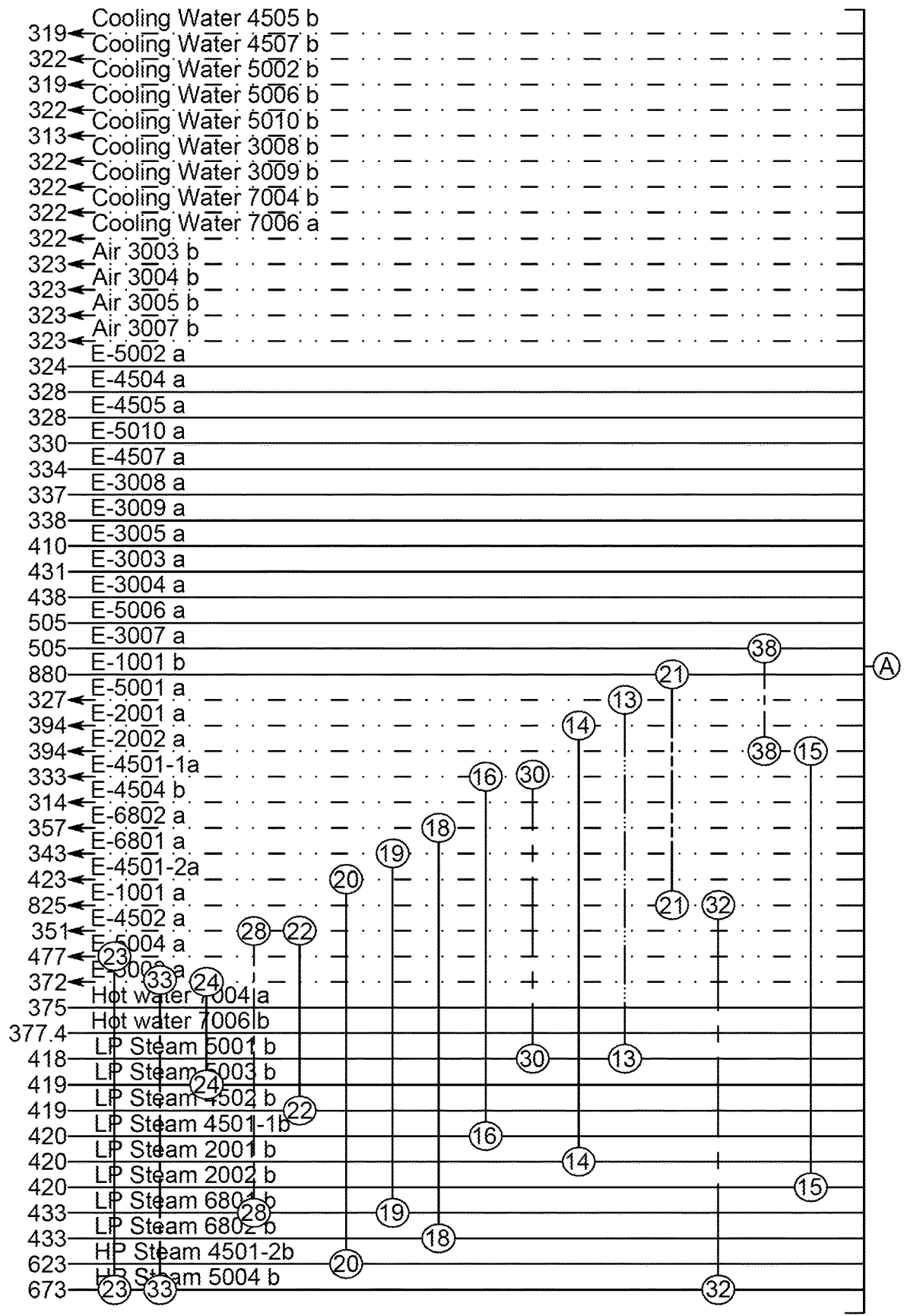
FIG. 8A shows a superstructure diagram comparing the existing HEN with a retrofitted version of the existing HEN using a Simulated Annealing technique according to one embodiment.
Figure 8A:
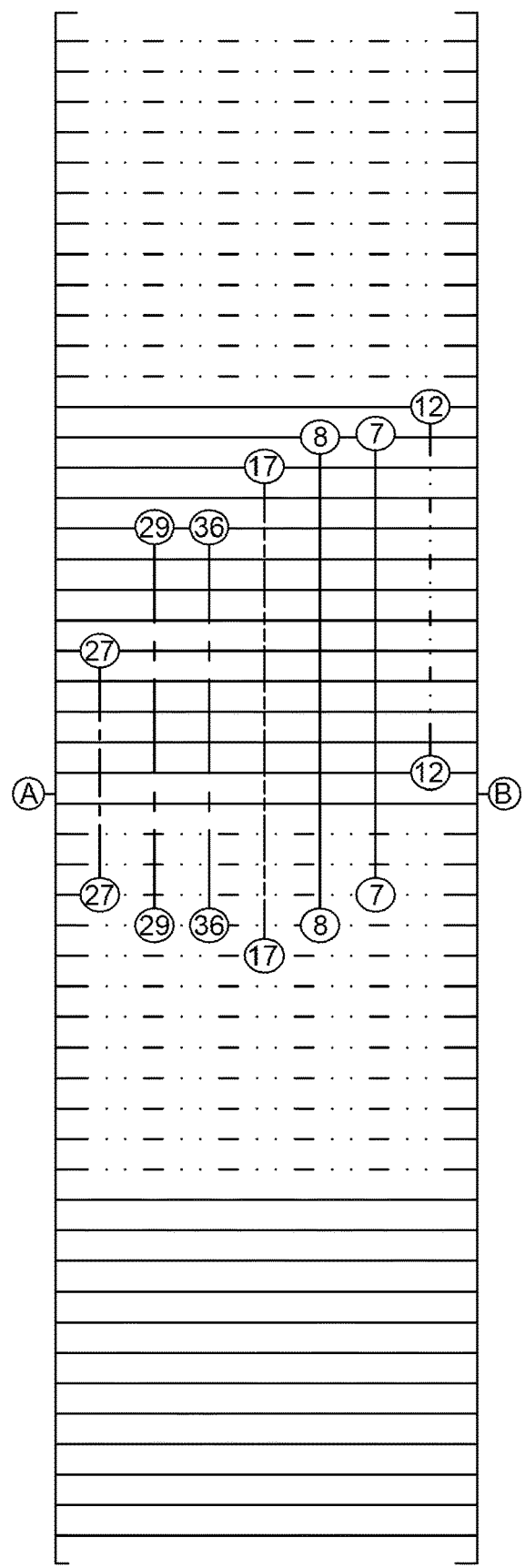
Figure 8A:
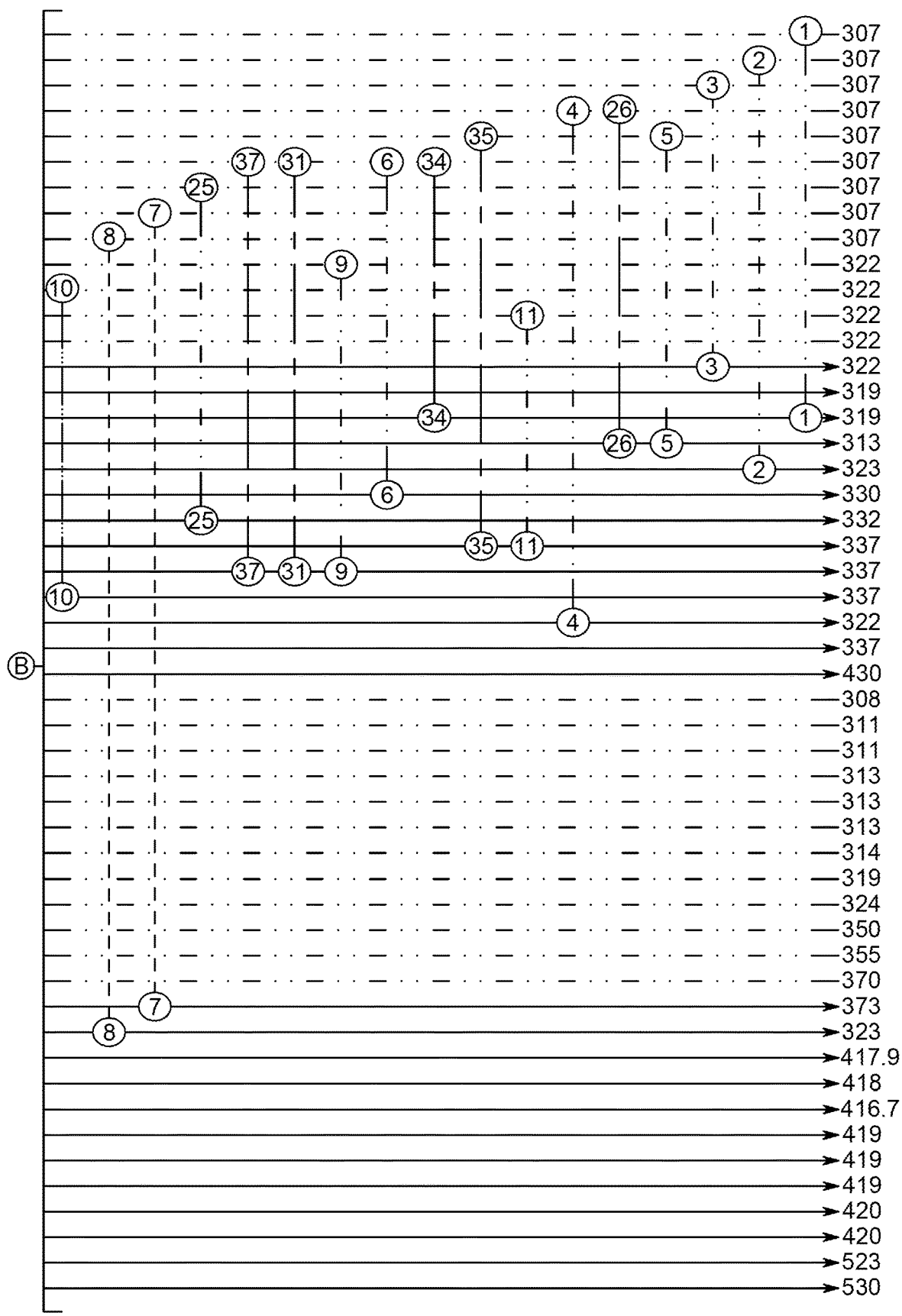
Figure 8A:
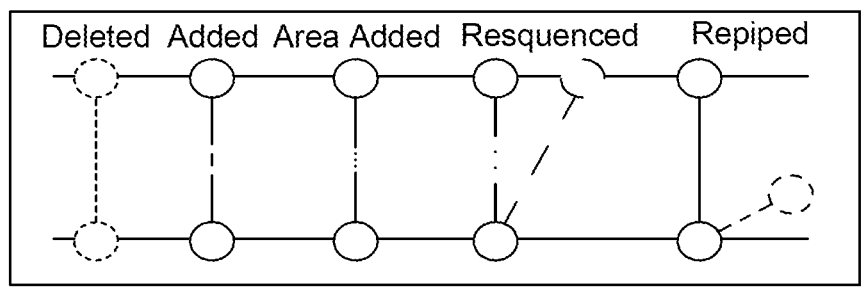

FIG. 7 describes an initial step of randomized initialization of HEN structure population 701. Based on the HEN structure, heat loads for the HEN are changed in order to get a minimum utility load 703. The HEN is then re-ordered by decreasing level of fitness 705, and termination conditions are considered 707. If the termination conditions are not matched, then further genetic operators are applied to the HEN population 709 and method of HEN synthesis is returned back to the In order to carry out the revamp of the HEN, some modifications according to the constraints by the pinch configuration were included. Thirteen heat exchangers were added namely 26, 27, 28, 29, 30, 31, 32, 33, 34, 35, 36, 37, and 38. Thus, the total number of heat exchangers in the retrofit design becomes 38. Also, the areas of HE-10 (E-3004) and HE-13 (5004) are increased. Finally, ten heat exchangers are re-sequenced namely [1-2-3-4-5-6-9-11-25] and two heat exchangers are re-piped namely [7-8]. The details of the re-piped streams are listed in Table 6 below. The comparison of the existing and retrofit HEN is shown schematically in FIG. 8A according to one embodiment.

TABLE 6

The re-piped HEs

| Name of re-piped HEs | Existing (before revamping) the connection between: | After revamping the connection between: |
|---|---|---|
| HE 7 | Stream E-7004 b (cold water) and stream E-7004 a (hot water) | Stream E-5002 a and stream E-2002 a |
| HE 8 | Stream E-7006 a (cold water) and stream E-7006 b (hot water) | Stream E-5002 a and stream 4501-1a |

Figure 5B:
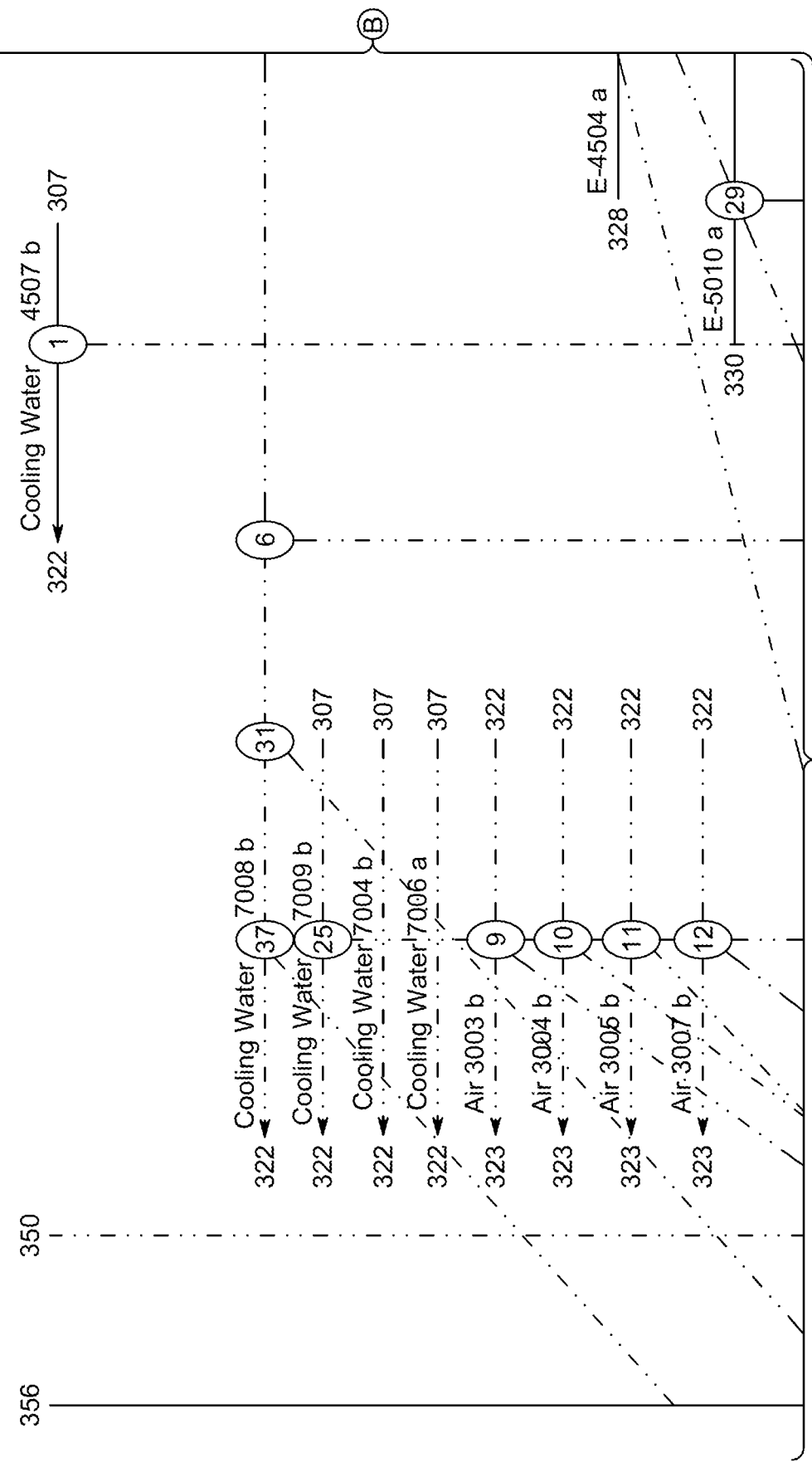
FIG. 5B shows a pinch configuration of the existing HEN after application of a Simulated Annealing technique according to one embodiment.
Figure 5B:
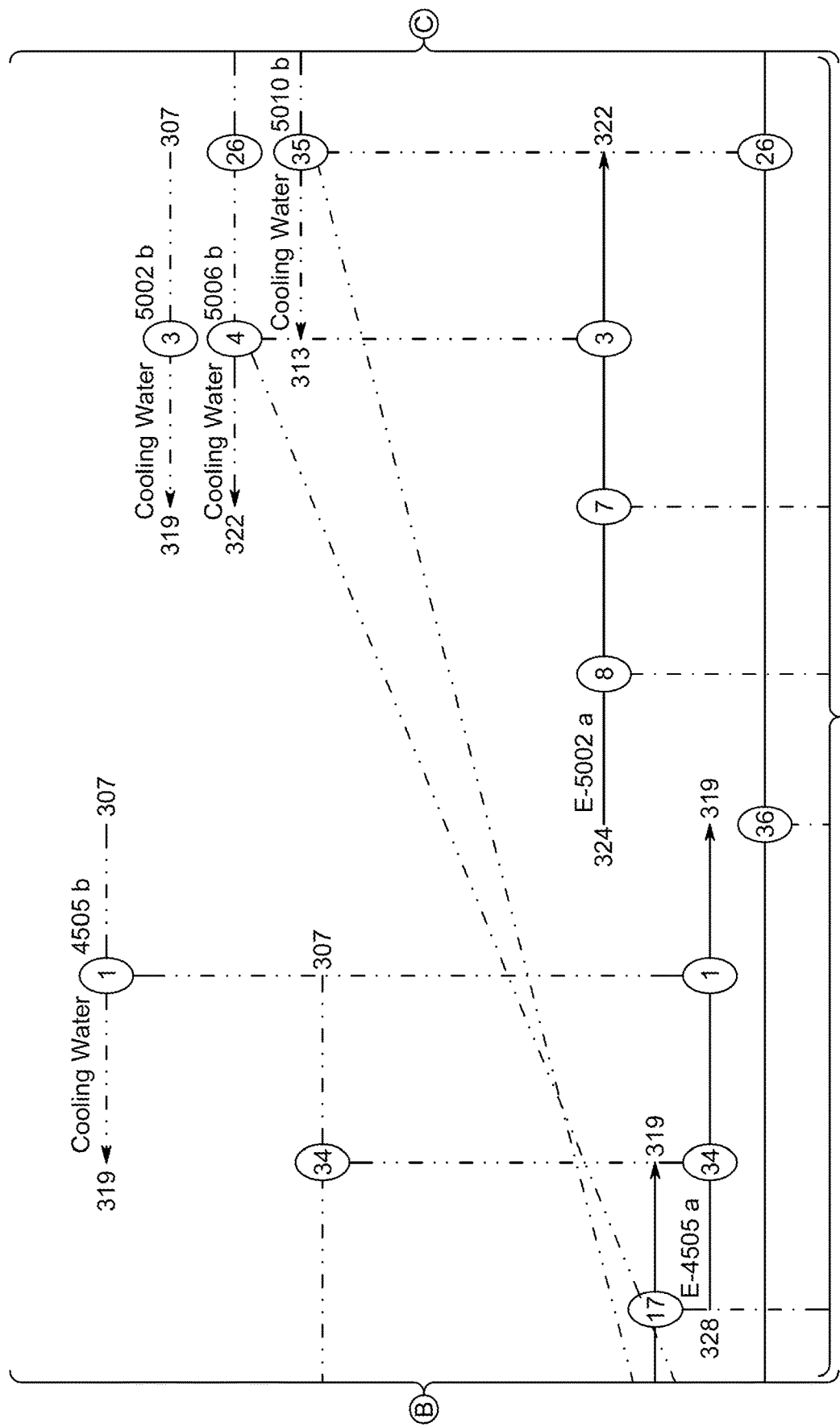
Figure 5B:
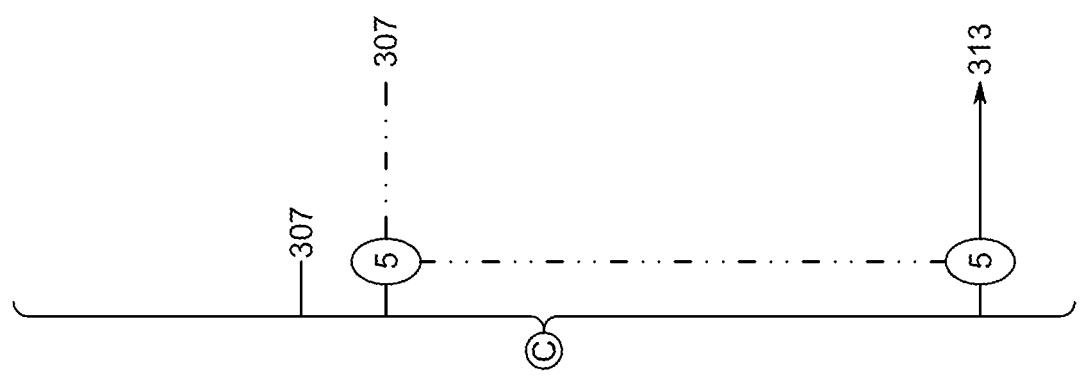
Figure 5B:
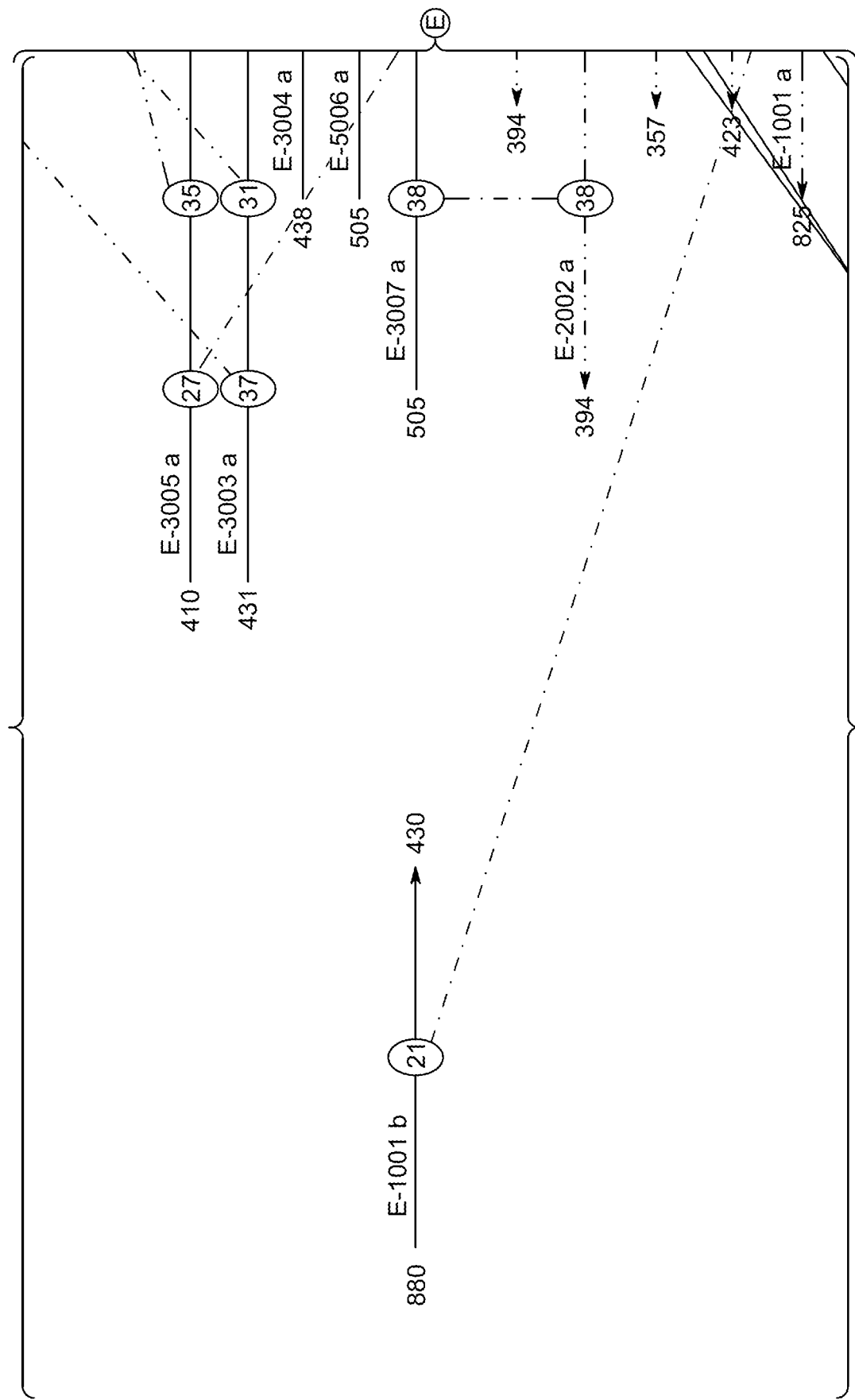
Figure 5B:
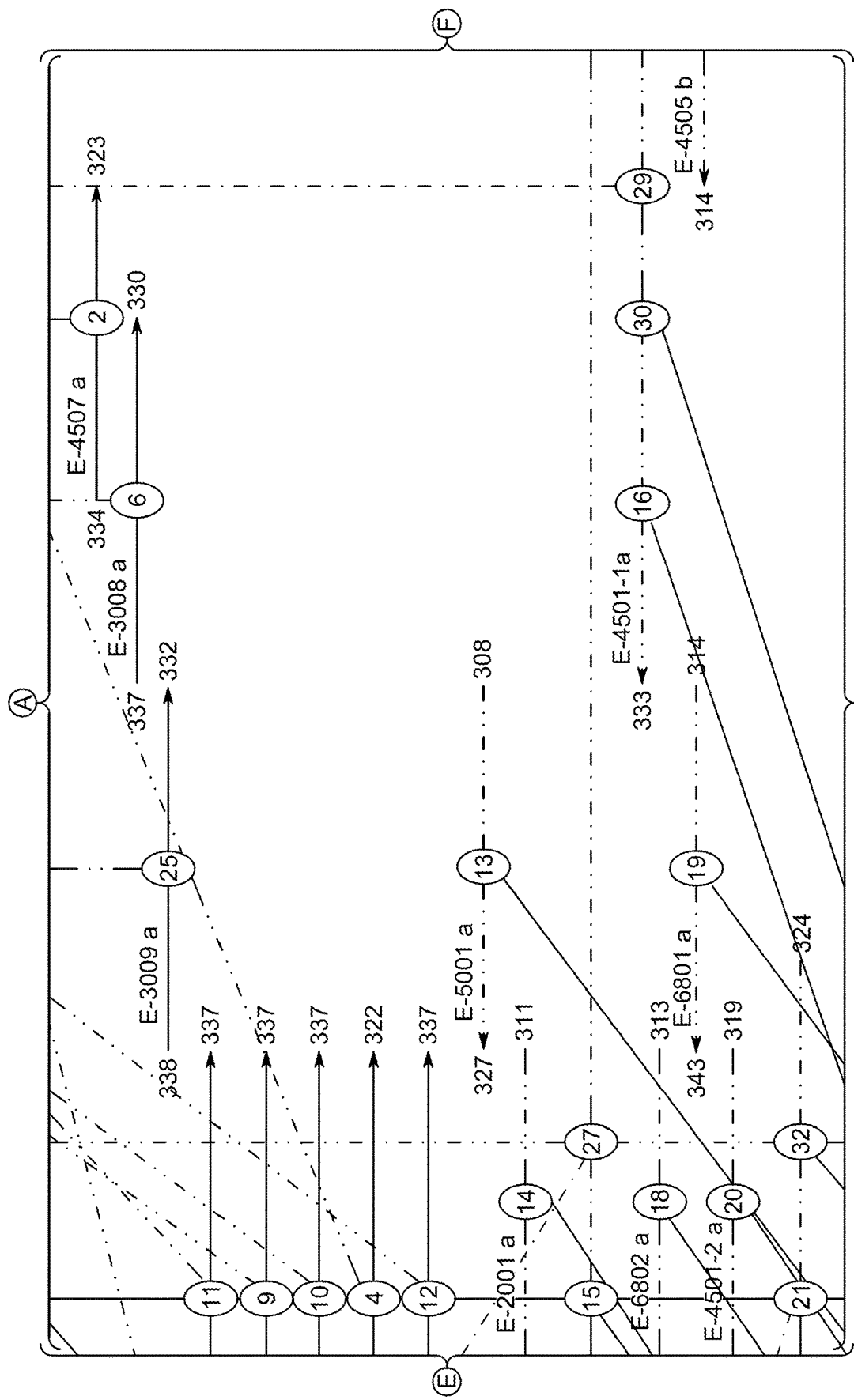
Figure 5B:
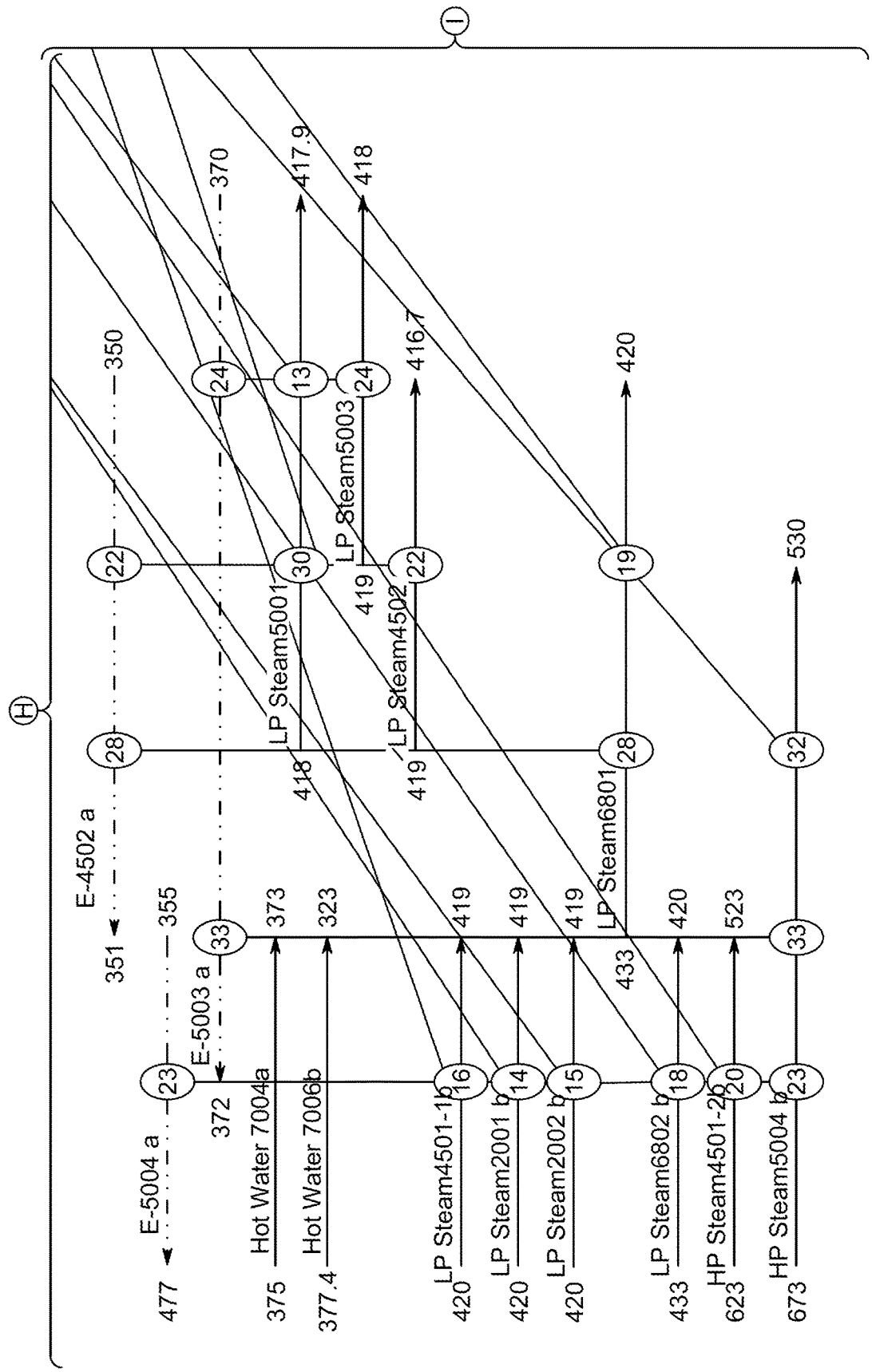
Figure 5B:
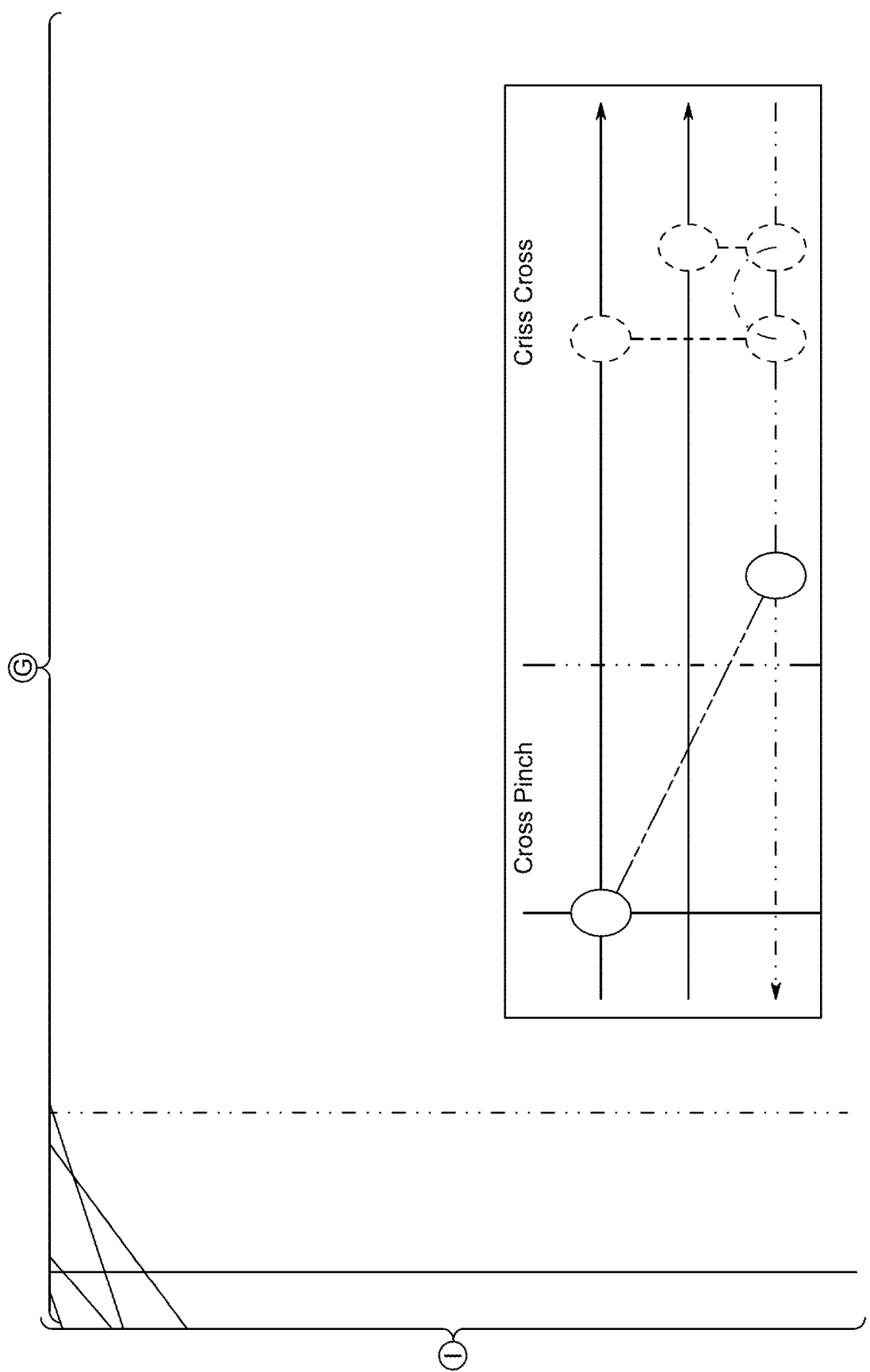

The Simulated Annealing method is able to reduce the duty on the HEs from 46.4 MW to 36.6 MW due to abandoning the HEs that are crossing the pinch in the existing network. The abandonment of the HEs crossing the pinch reduces the driving force as well as provides energy recovery in used areas. The HEs and their analysis are presented in FIG. 5B according to one embodiment and summarized in Table 7 below.

Figure 8B:
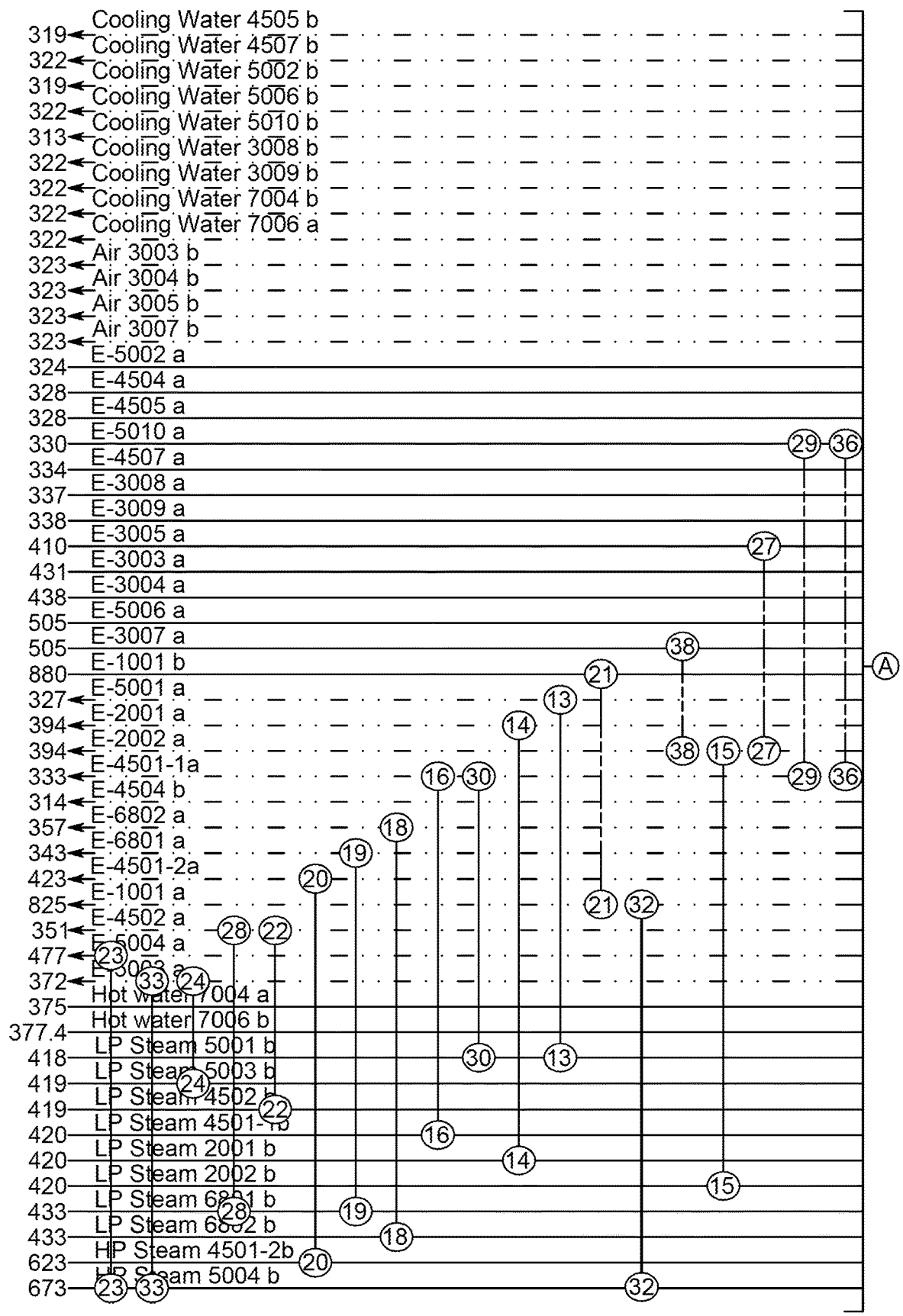
FIG. 8B shows a diagram of a final design the retrofitted HEN using a SA technique according to one embodiment.
Figure 8B:
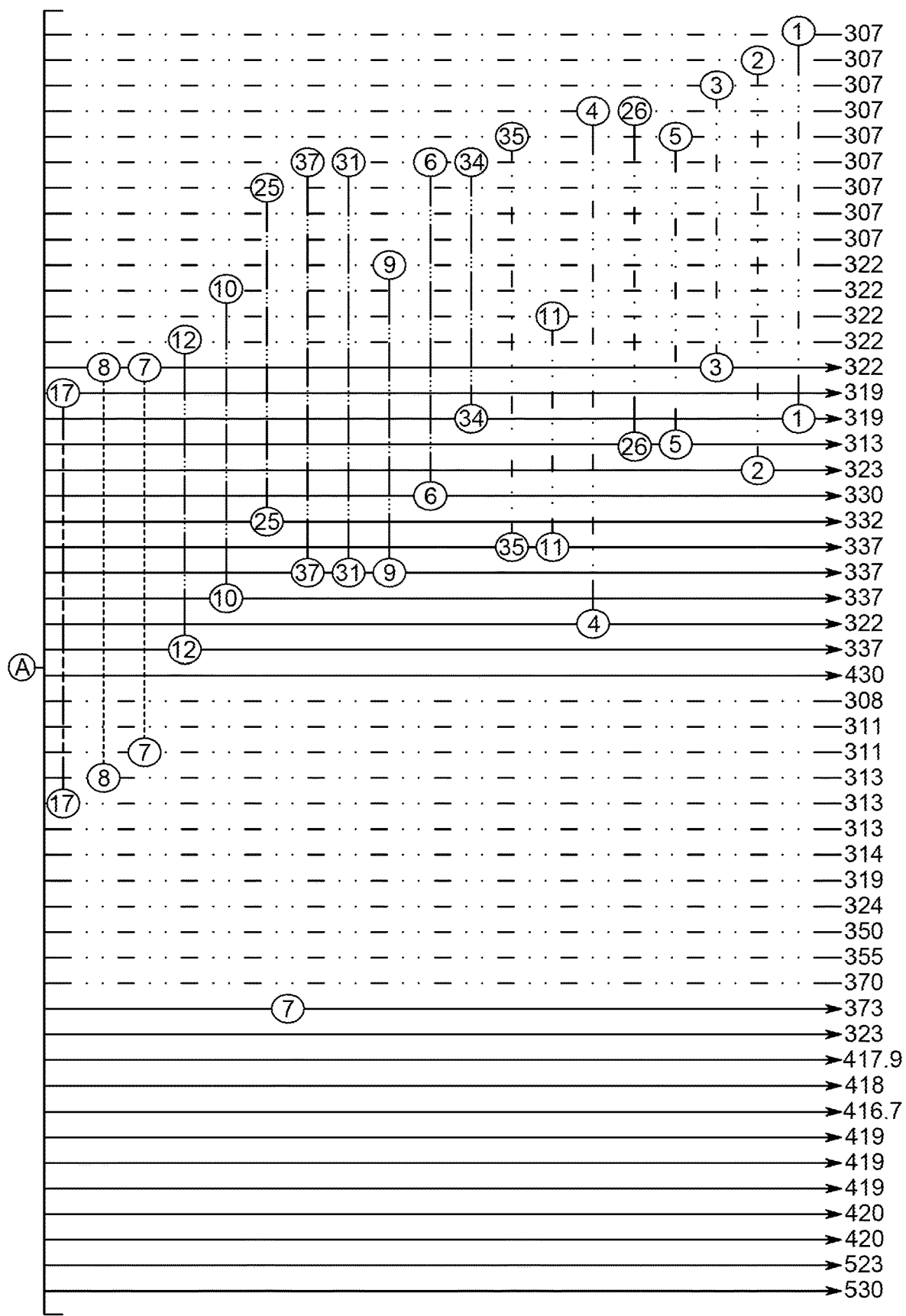

The results of the retrofit design by SA are summarized in Table 8 below and shown in FIG. 8B according to one embodiment. The total operating cost is of the network is reduced from 141.07 $MM/y to 120.42 $MM/y, which constitutes a saving of up to 14.64%.

TABLE 8

Summary of result of SA (comparison between existing HEN and retrofit HEN)

| Items | Units | Retrofitting network | Existing Network |
|---|---|---|---|
| ΔTmin | K | 6.00 | 6.00 |
| Hot utility duty | MW | 57.44 | 72.54 |
| Cold utility duty | MW | 99.82 | 128.53 |
| Number of heat exchangers | | 38.00 | 25.00 |
| Added area | m$^2$ | 29678.3 | 36236.3 |
| Used area | m$^2$ | 29678.3 | 36236.3 |
| Total annualized cost | $MM/y | 120.42 | 141.07 |
| Total capital cost | $MM/y | 7.22 | 9.18 |
| Total operating cost | $MM/y | 113.20 | 131.89 |
| Hot utility operating cost | $MM/y | 26.78 | 32.94 |
| Cold utility operating cost | $MM/y | 67.55 | 76.97 |
| Other operating cost | $MM/y | 18.87 | 21.98 |

Fixed Structure Technique

The second technique that is employed, to minimize the annual operating cost, is the Fixed Structure method. In this method, minimal modification of the HEN is considered by varying: (1) hot and cold stream rates, (2) heat exchangers duties and areas.

Figure 5C:
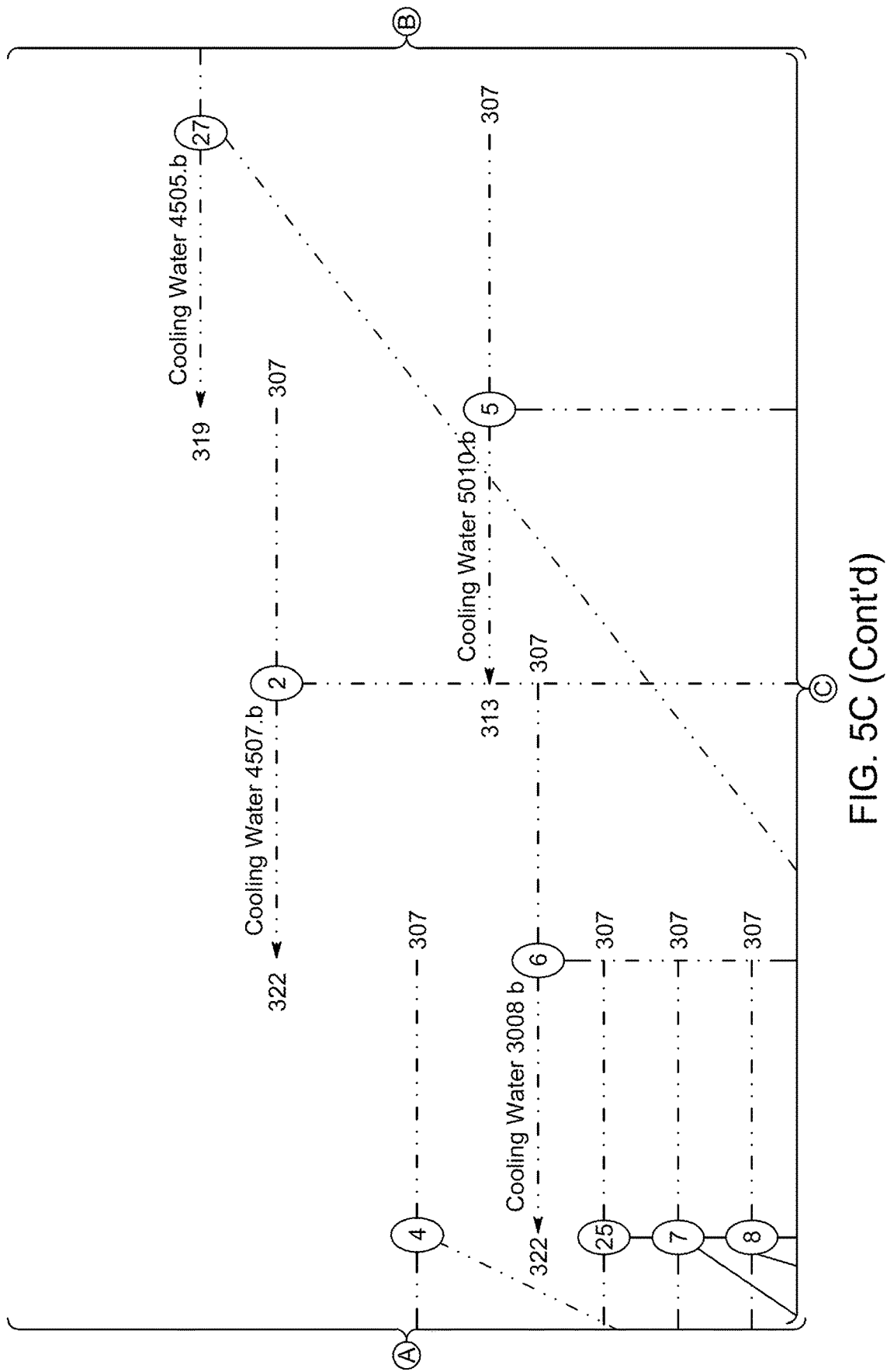
FIG. 5C shows a pinch configuration of the existing HEN after application of a Fixed Structure technique according to one embodiment.
Figure 5C:
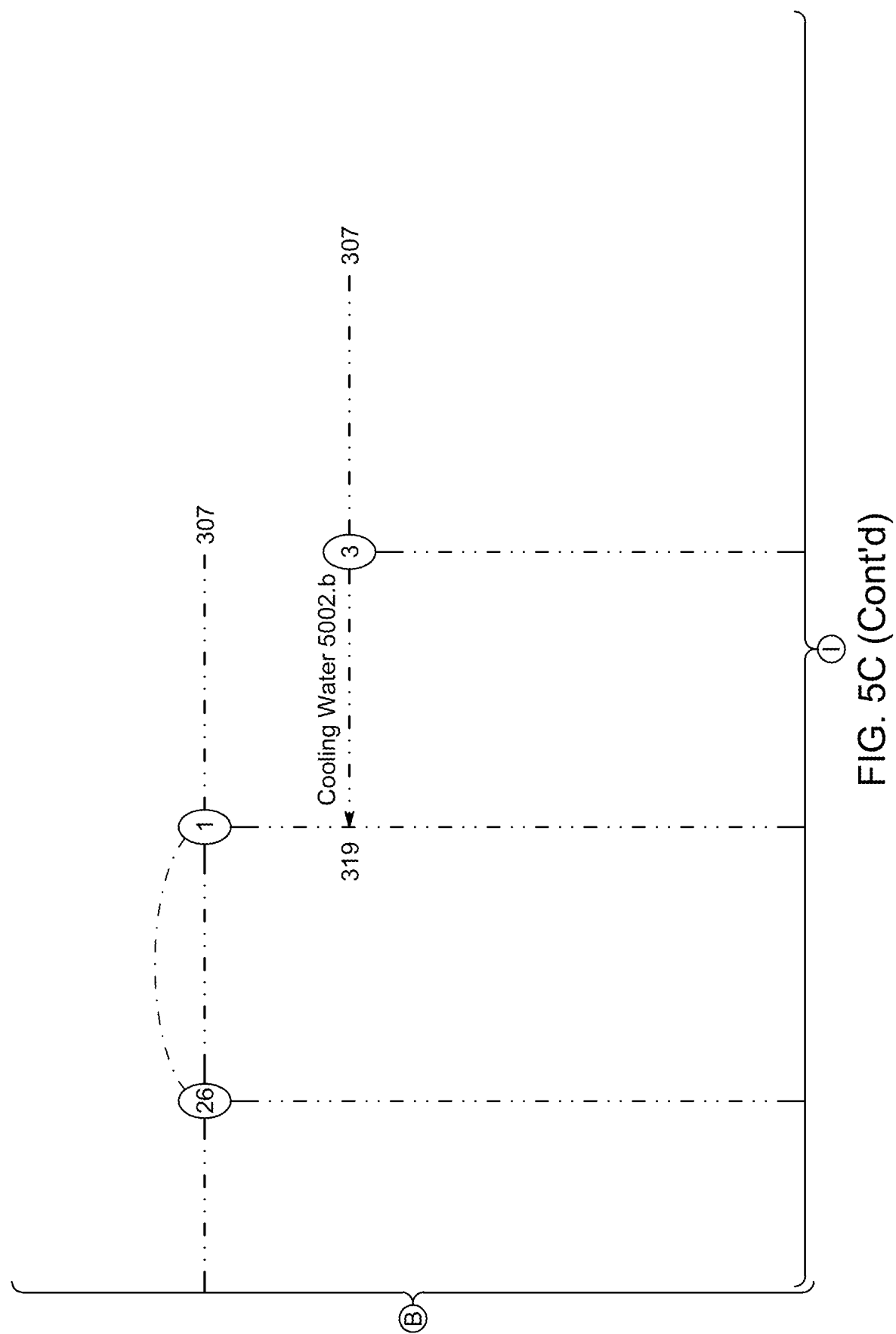
Figure 5C:
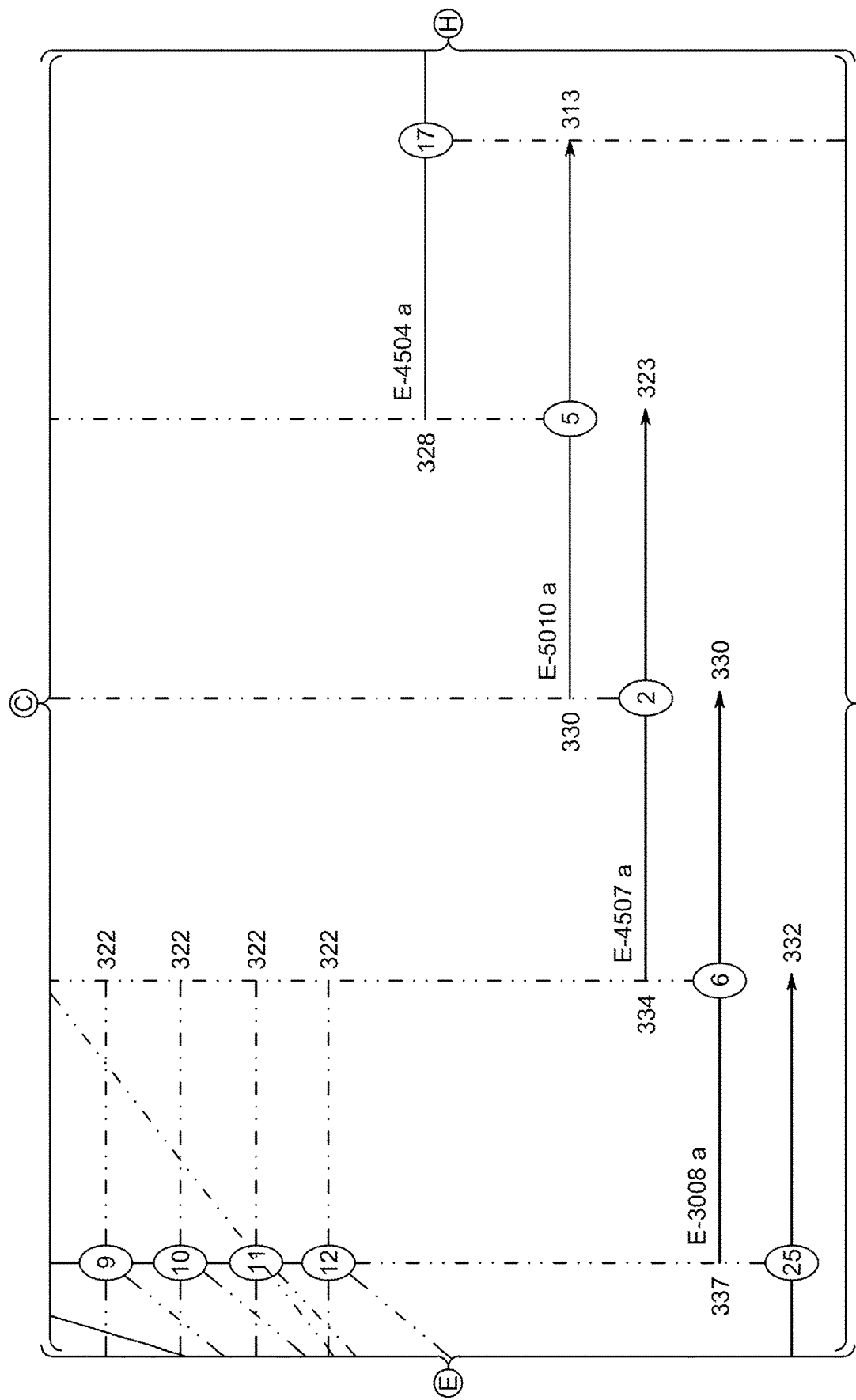
Figure 5C:
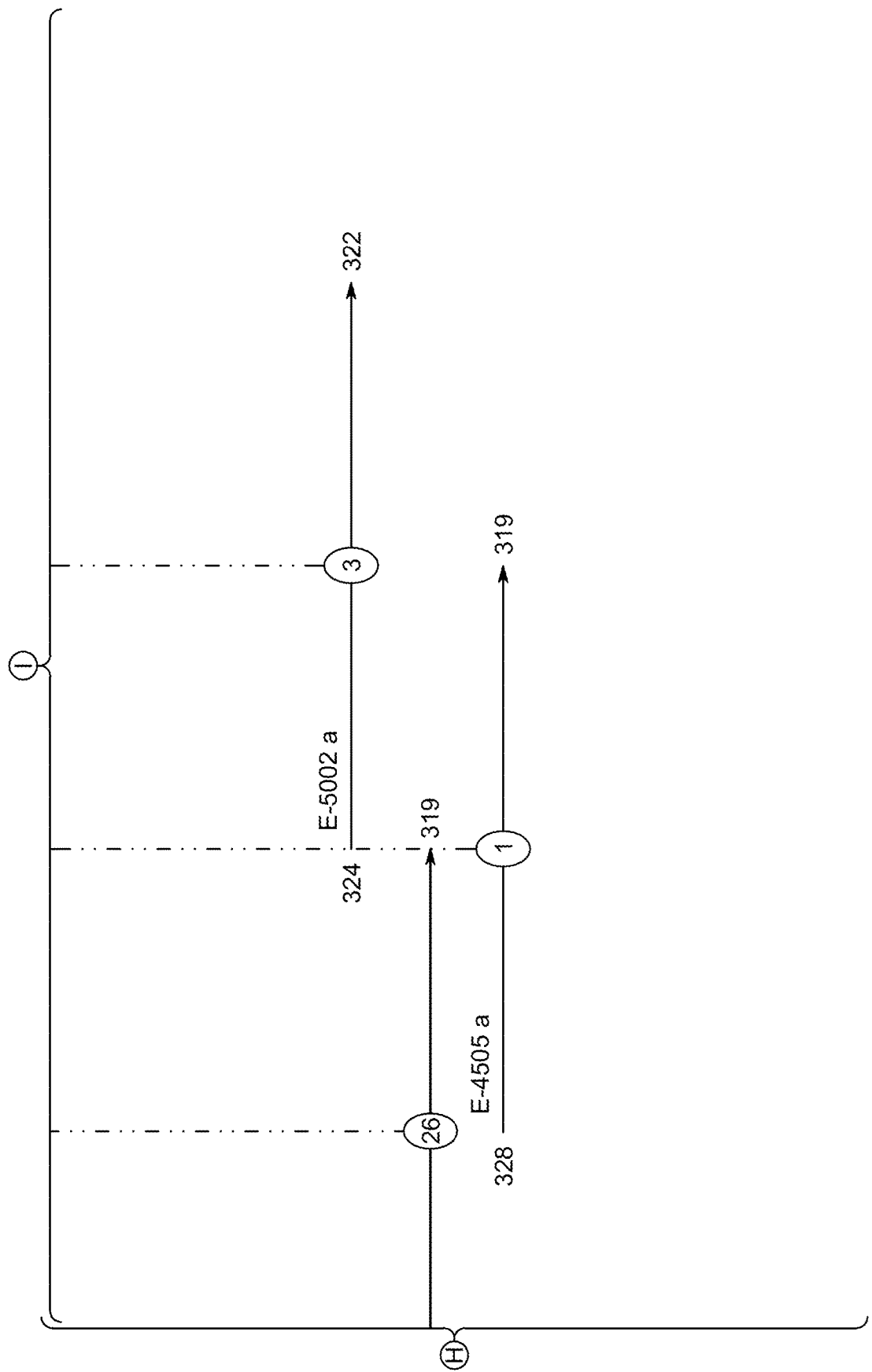
Figure 5C:
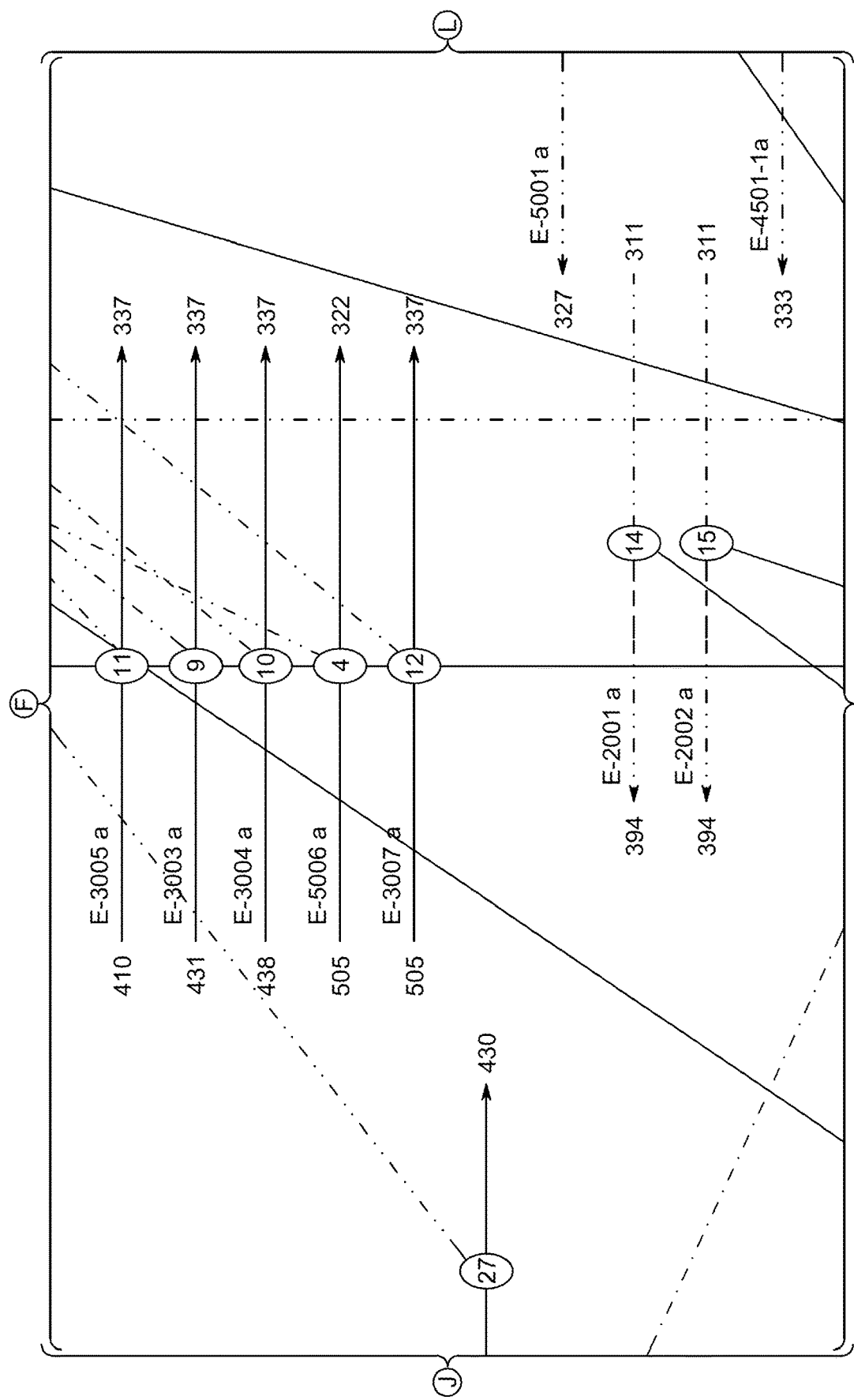
Figure 5C:
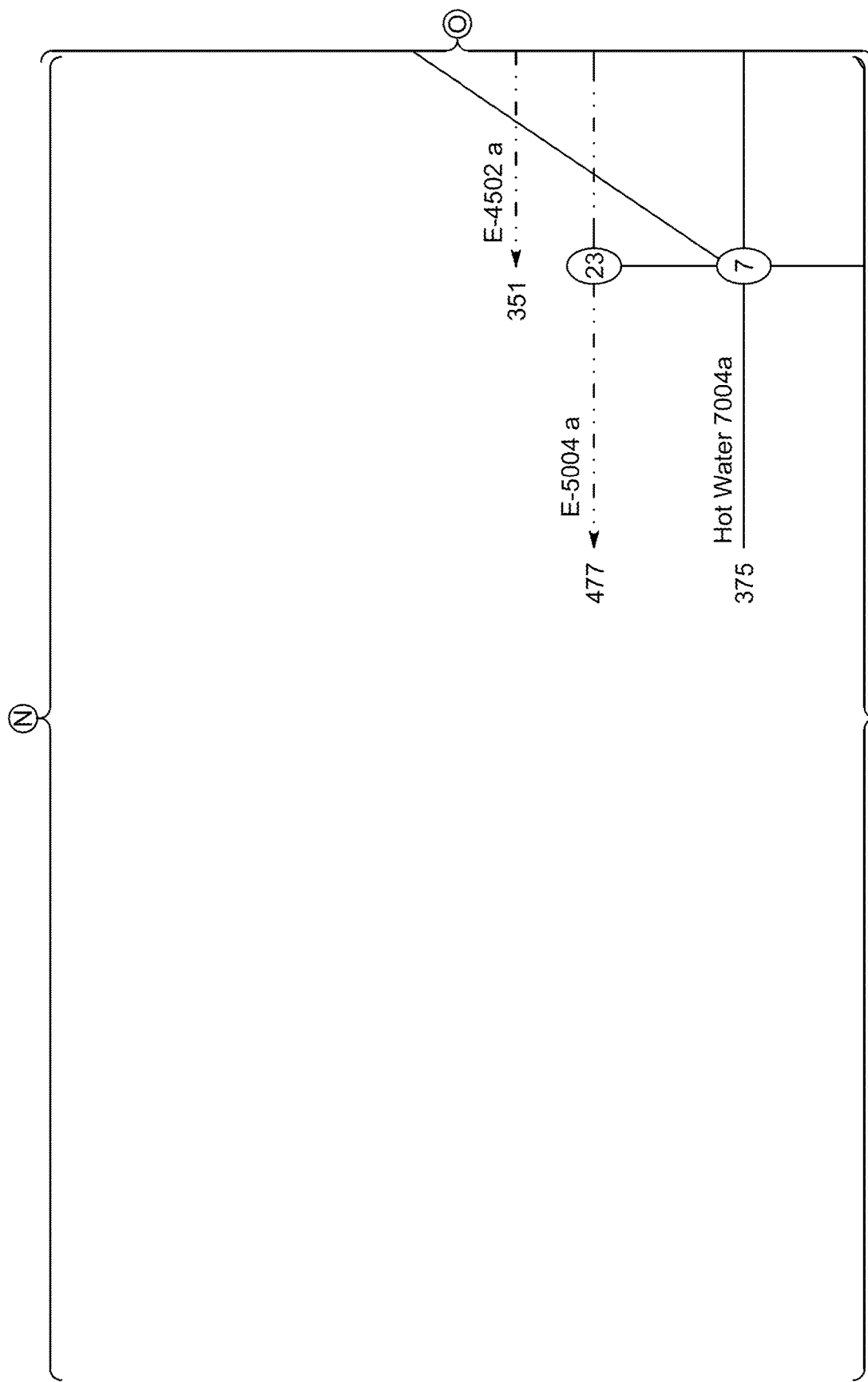
Figure 5C:
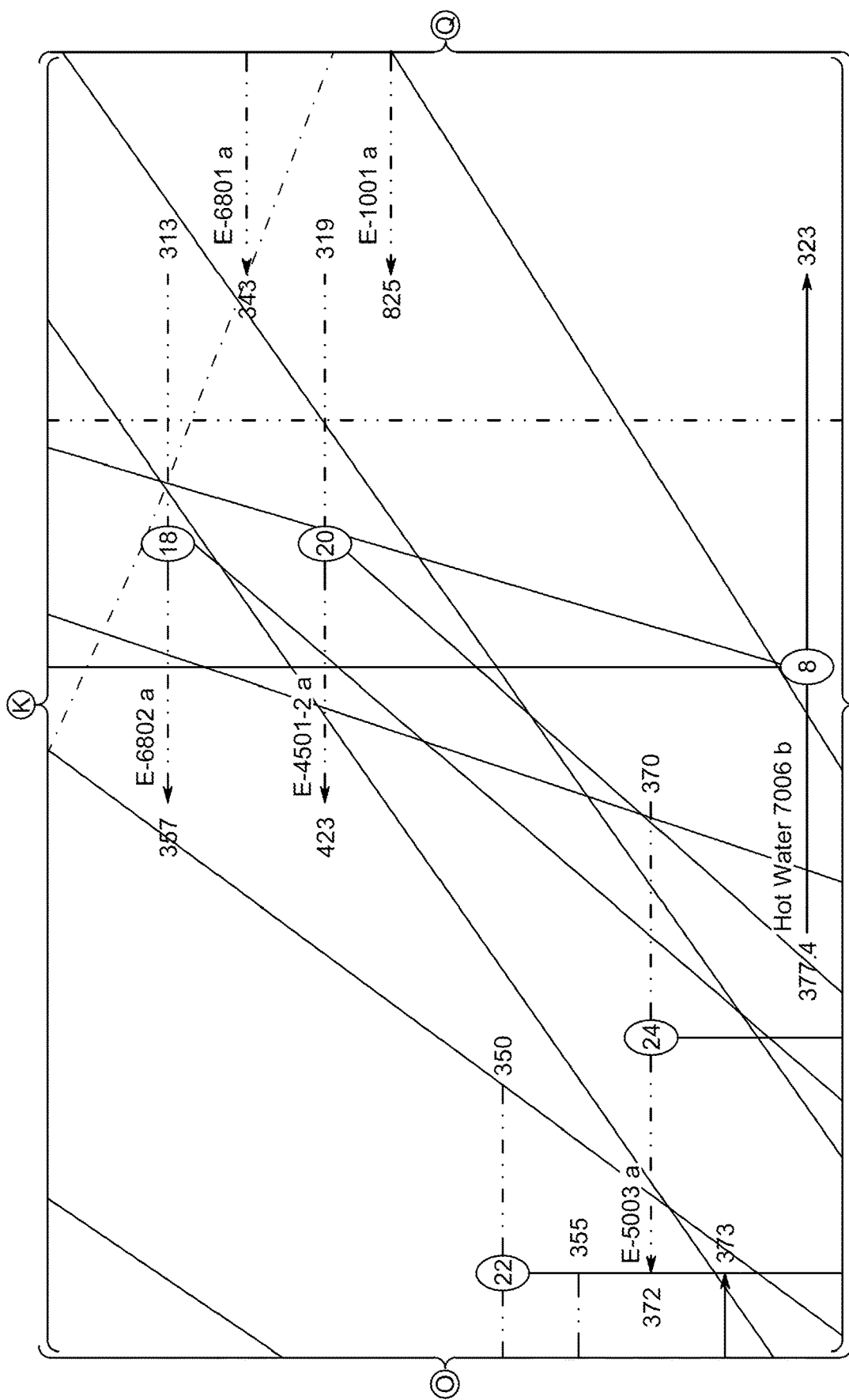
Figure 5C:
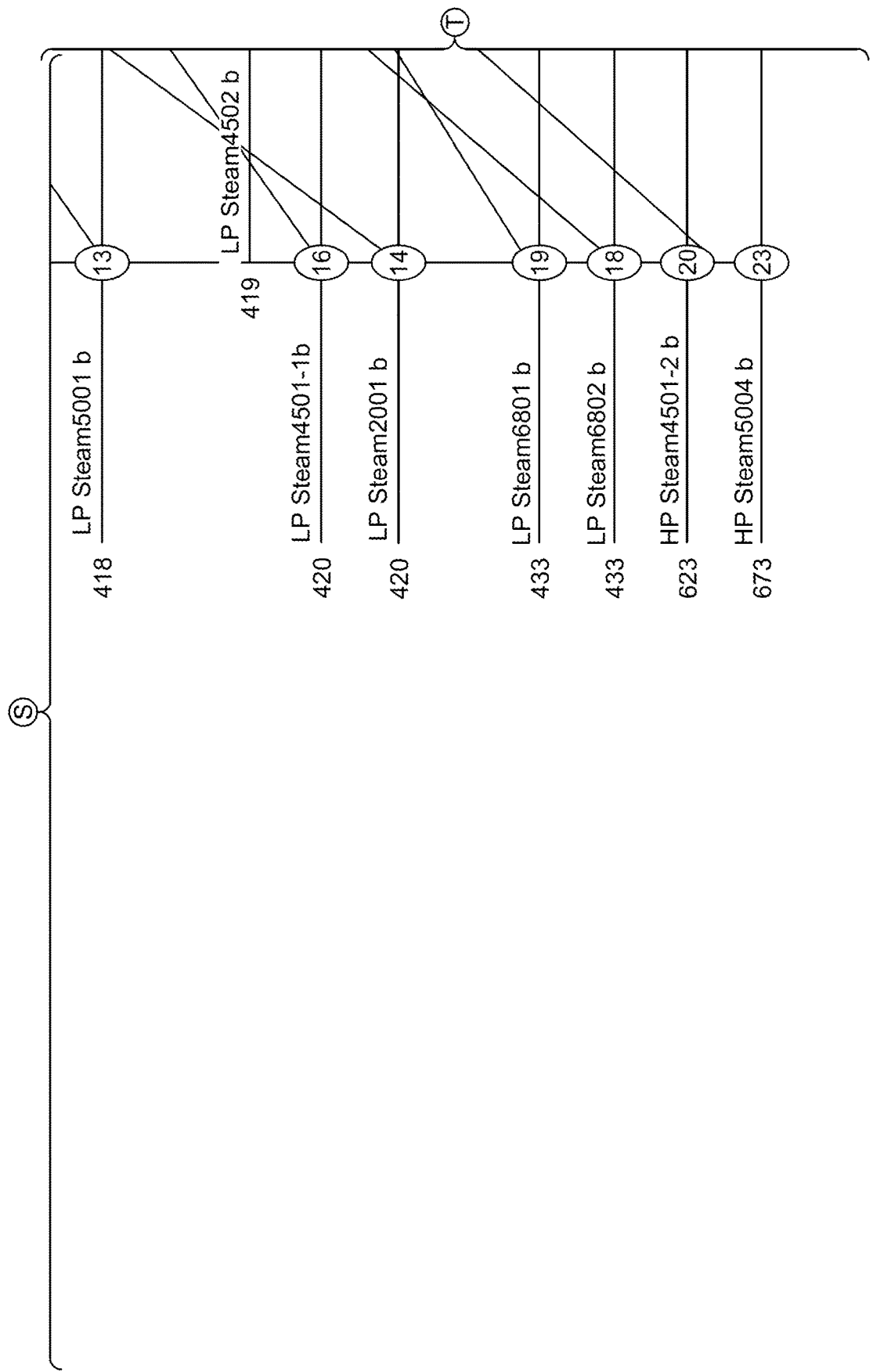
Figure 5C:
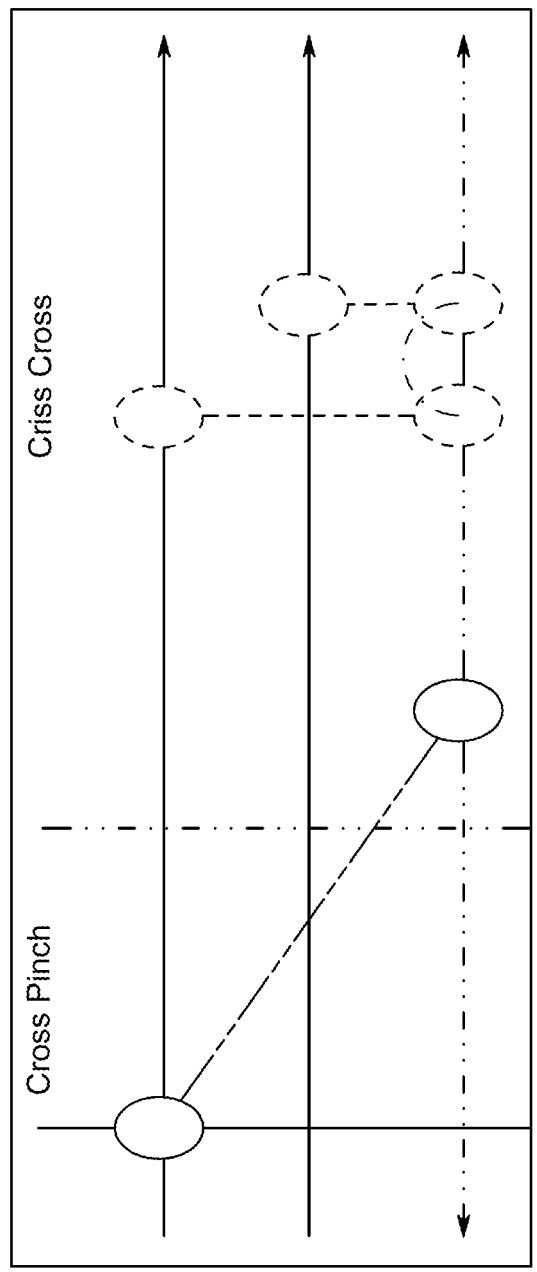

Sixteen heat exchangers crossed the pinch as shown in FIG. 5C according to one embodiment [New HX1080, EX1074, EX1073, EX1072, EX1071, EX1069, EX1068, EX1067, EX1066, EX1065, EX1064, EX1063, EX1062 and EX1061] and as summarized in Table 9 below.

TABLE 7

Heat exchangers pinch and cross pinch duty for Simulated Annealing

Hot side (Pinch Temperature:356)

| Name | Duty [kW] | Cross pinch duty [kW] | Stream Name | F · Cp [kW/K] | Inlet Temp [K] | Outlet Temp [K] |
|---|---|---|---|---|---|---|
| EX12073 | 172.8 | 172.8 | E-3003 a | 121.6 | 431.0 | 429.6 |
| EX21080 | 82.6 | 82.6 | E-3005 a | 123.8 | 409.6 | 409.0 |
| EX40014 | 0.4 | 0.4 | HP Steam 5004 b | 0.4 | 531.1 | 530.0 |
| EX16551 | 253.7 | 253.7 | E-3003 a | 121.6 | 429.6 | 427.5 |
| EX14587 | 425.6 | 425.6 | LP Steam 5001 b | 10256.2 | 418.0 | 418.0 |
| EX23740 | 45.8 | 45.8 | E-3005 a | 123.8 | 410.0 | 409.6 |
| EX1074 | 74729.6 | 3877.8 | E-1001 b | 166.1 | 880.0 | 430.0 |
| EX1073 | 110.0 | 32.8 | HP Steam 4501-2 b | 1.1 | 623.0 | 523.0 |
| EX1072 | 700.0 | 700.0 | LP Steam 6801 b | 54.7 | 432.8 | 420.0 |
| EX1071 | 271.3 | 228.1 | LP Steam 6802 b | 20.9 | 433.0 | 420.0 |
| EX1069 | 1586.4 | 1586.4 | LP Steam 4501-1b | 1586.4 | 420.0 | 419.0 |
| EX1068 | 142.5 | 43.5 | LP Steam 2002 b | 142.5 | 420.0 | 419.0 |
| EX1067 | 140.0 | 65.8 | LP Steam 2001 b | 140.0 | 420.0 | 419.0 |
| EX1066 | 600.0 | 600.0 | LP Steam 5001 b | 10256.2 | 418.0 | 417.9 |
| EX1065 | 2428.3 | 2153.5 | E-3007 a | 14.5 | 504.9 | 337.0 |
| EX1064 | 8911.7 | 6558.8 | E-3005 a | 123.8 | 409.0 | 337.0 |
| EX1063 | 12550.0 | 10189.1 | E-3004 a | 124.3 | 438.0 | 337.0 |
| EX1062 | 11003.5 | 8693.2 | E-3003 a | 121.6 | 427.5 | 337.0 |
| EX1057 | 1280.0 | 1042.2 | E-5006 a | 7.0 | 505.0 | 322.0 |

TABLE 9

The heat exchanger cross the pinch for Fixed Structure.

Hot side (Pinch Temperature:356)

| No. | Name | Duty [kW] | Cross pinch duty [kW] | Stream Name | F·Cp [kW/K] | Inlet Temp [K] | Outlet Temp [K] |
|---|---|---|---|---|---|---|---|
| 27 | NewHX1080 | 74729.7 | 74729.7 | E-1001 b | 166.067 | 879.998 | 430 |
| 21 | EX1074 | 0.28 | 0.28 | E-1001 b | 166.067 | 880 | 879.998 |
| 20 | EX1073 | 110 | 32.78 | HP Steam 4501-2 B | 1.1 | 623 | 523 |
| 19 | EX1072 | 700 | 700 | LP Steam 6801 B | 53.84 | 433 | 420 |
| 18 | EX1071 | 271.3 | 228.13 | LP Steam 6802 B | 20.86 | 433 | 420 |
| 16 | EX1069 | 2500 | 2500 | LP Steam 4501-1B | 2500 | 420 | 419 |
| 15 | EX1068 | 190 | 89.2771 | LP Steam 2002 B | 190 | 420 | 419 |
| 14 | EX1067 | 140 | 65.7831 | LP Steam 2001 B | 140 | 420 | 419 |
| 13 | EX1066 | 600 | 600 | LP Steam 5001 B | 6000 | 418 | 417.9 |
| 12 | EX1065 | 2430 | 2155.18 | E-3007 a | 14.46 | 505 | 337 |
| 11 | EX1064 | 9040 | 6687.12 | E-3005 a | 123.83 | 410 | 337 |
| 10 | EX1063 | 12550 | 10189.1 | E-3004 a | 124.25 | 438 | 337 |
| 9 | EX1062 | 11430 | 9119.68 | E-3003 a | 121.59 | 431 | 337 |
| 8 | EX1061 | 0.03 | 0.013 | Hot Water 7006 A | 0.00064 | 377.4 | 323 |
| 7 | EX1060 | 0.03 | 0.03 | Hot Water 7004 A | 0.015 | 375 | 373 |
| 4 | EX1057 | 1280 | 1042.19 | E-5006 a | 6.99454 | 505 | 322 |

Moreover, criss-cross heat transfer has been found for the hot stream E-4505 heat exchanger as shown in Table 10 below.

TABLE 10

The stream criss-cross heat transfer

| | | Previous Exchanger | | | Next Exchanger | | |
|---|---|---|---|---|---|---|---|
| Stream | Hot Stream | F·Cp [kW/K] | Exchanger | Inlet Temp [K] | Hot Stream | F·Cp [kW/K] | Exchanger | Inlet Temp [K] |
| Cooling Water 4505 B | E-4505 a | 1797.78 | EX1054 | 328 | E-4504 a | 6262.22 | NewHX1079 | 328 |

When the Fixed Structured technique is applied, to the current HEN, the duty of HEs, that crossed the pinch, is reduced.

Figure 9A:
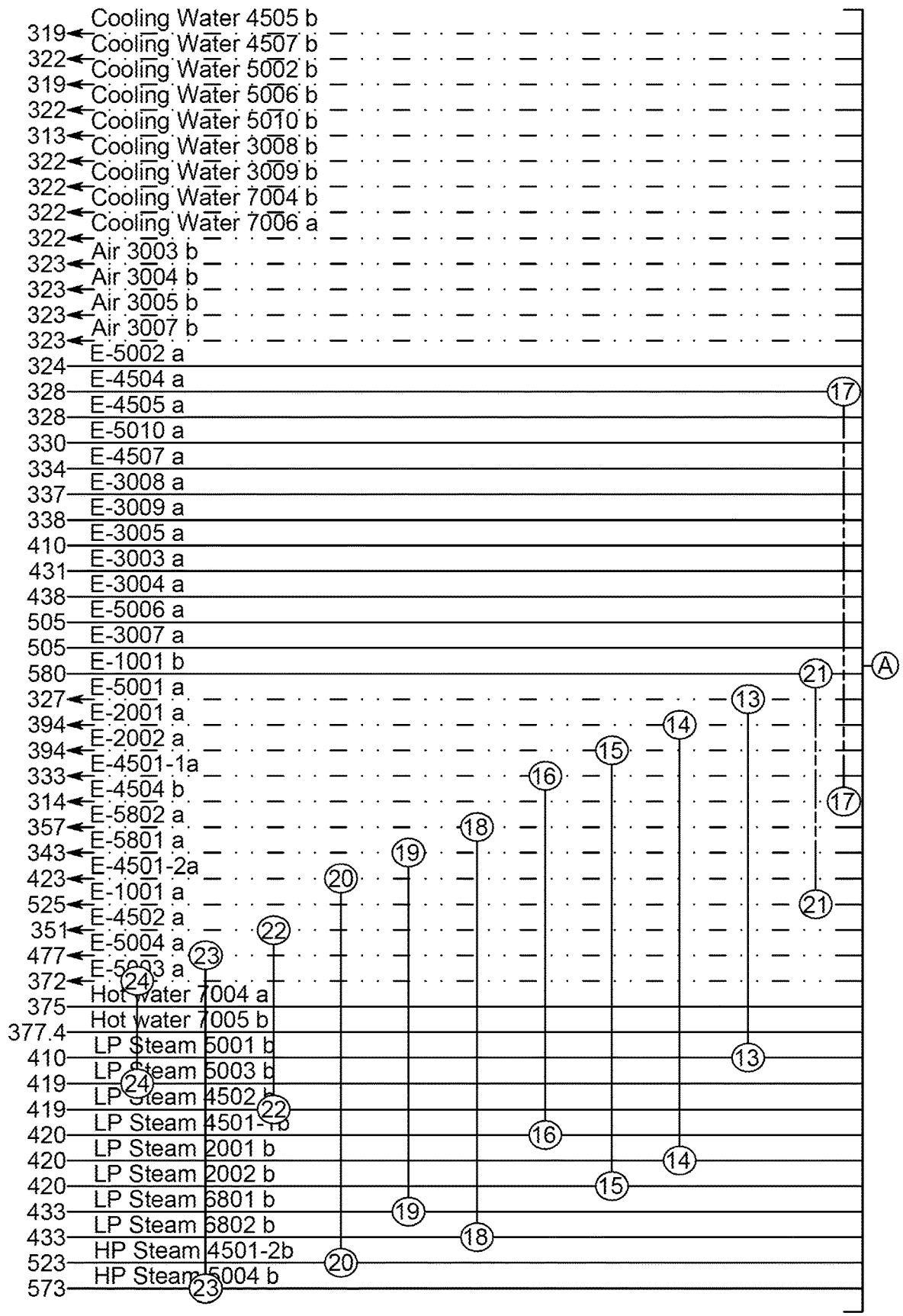
FIG. 9A shows a superstructure diagram comparing the existing HEN with a retrofitted version of the existing HEN using a Fixed Structure technique according to one embodiment.
Figure 9A:
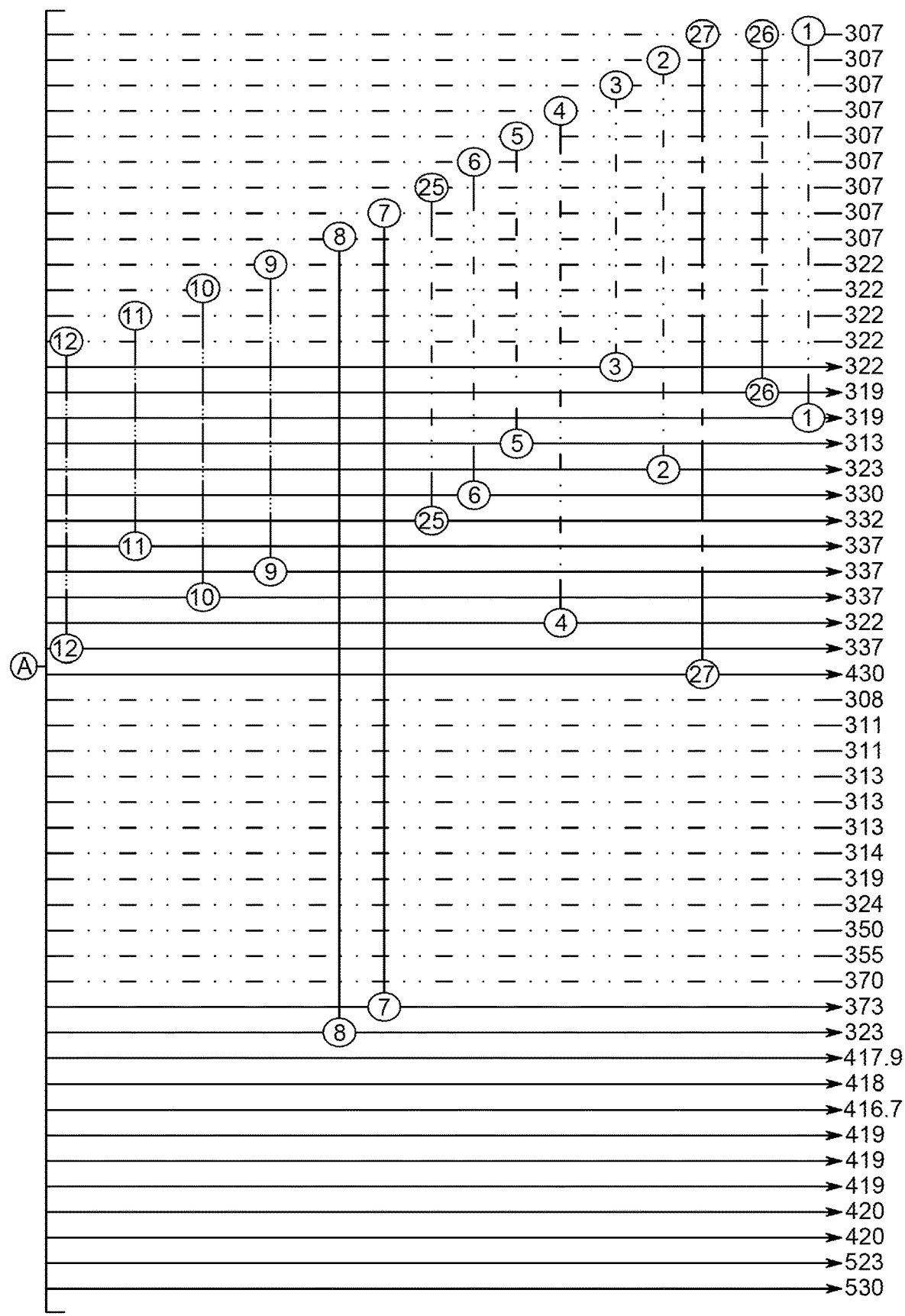
Figure 9B:
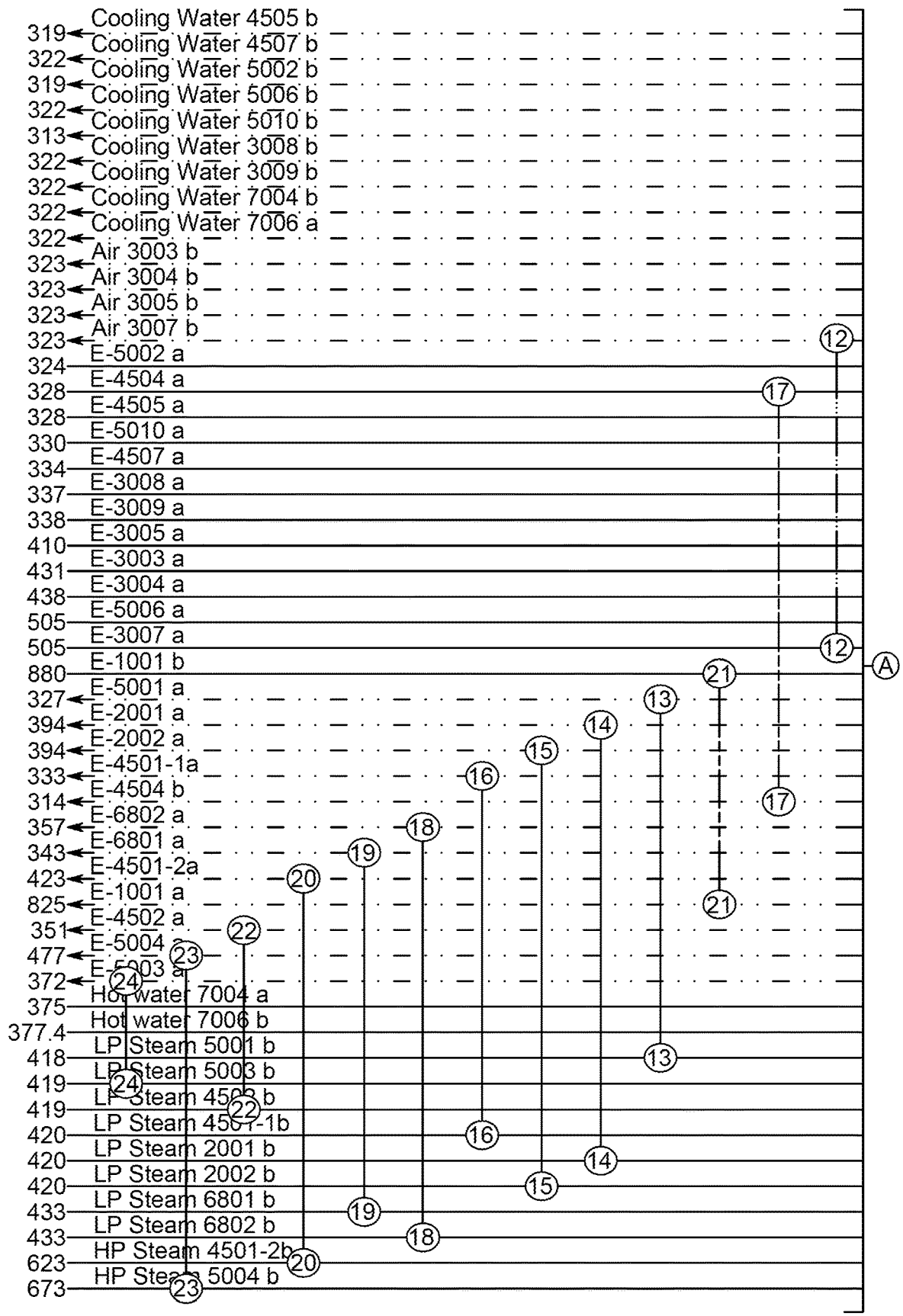
FIG. 9B shows a diagram of a final design the retrofitted HEN using a Fixed Structure technique according to one embodiment.
Figure 9B:
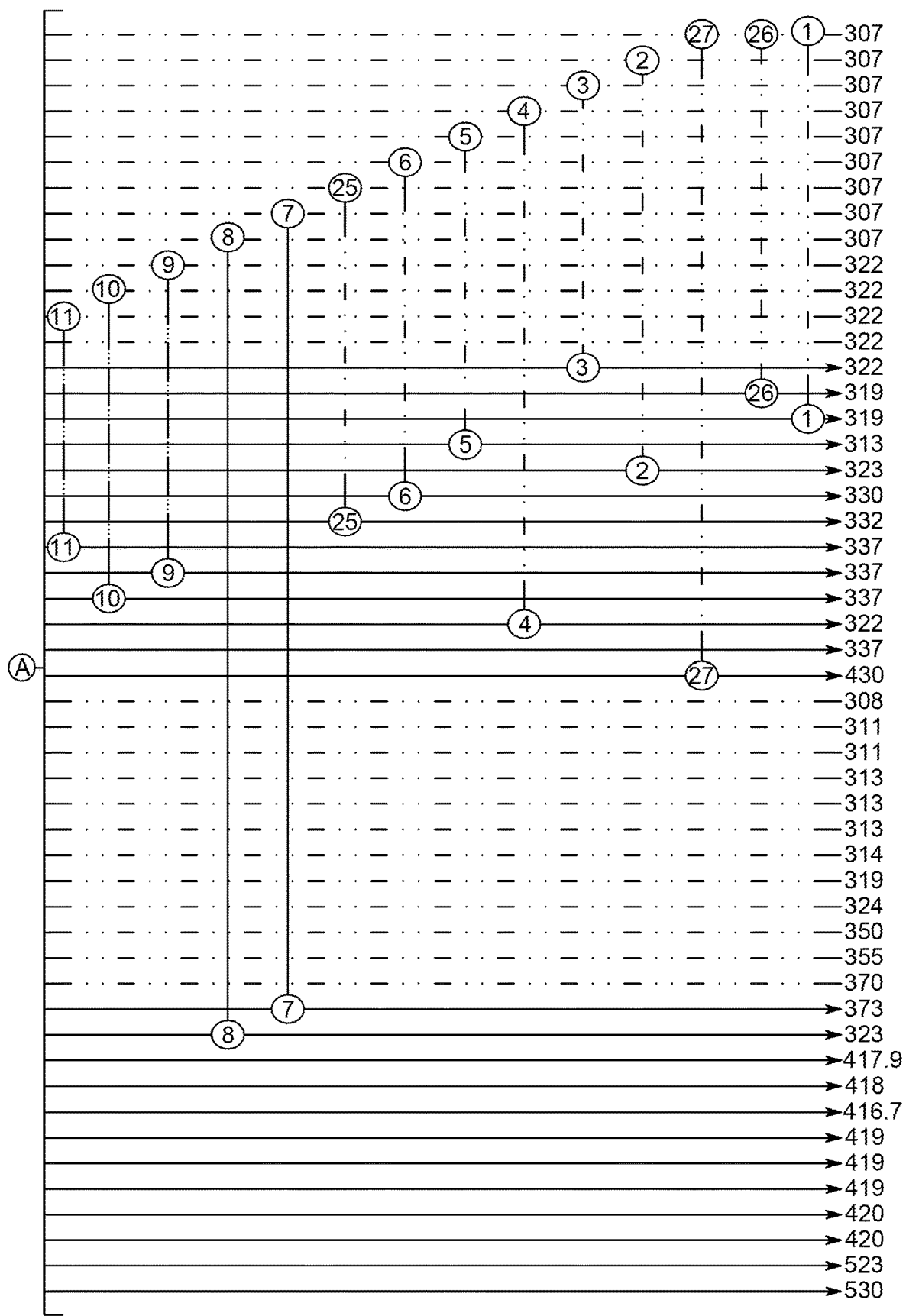
Figure 9B:
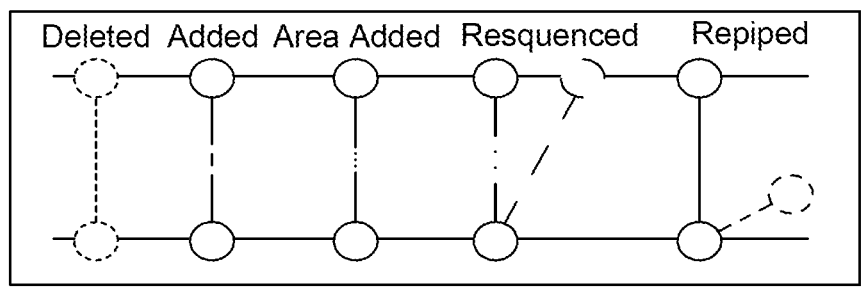

The modified superstructure is shown in FIG. 9A according to one embodiment. This superstructure, obtained with the Fixed Structure method, reduces the annual operating cost. Two HEs are added to the system: (1) HX1079 matching between E-4504a and cooling water 4505b, and (2) HX1080 matching between E-1001b and cooling water E-4505b with areas of 17670.5 m2, 1055.2 m2, respectively. The final design for the Fixed Structure method is shown in FIG. 9B according to one embodiment and Table 11 below summarizes the reduction of annual operating cost using this technique. In effect, the total operating cost is reduced from 141.07 $MM/y to 130.00 $MM/y (i.e., up to 7.85% saving is achieved).

TABLE 11

Summary of result for Fixed Structure (comparison between existing and retrofit HEN)

| Items | Units | Retrofitted HEN | Existing HEN |
|---|---|---|---|
| ΔTmin | K | 15.00 | 6.00 |
| Hot utility duty | MW | 33.761 | 72.538 |
| Cold utility duty | MW | 231.445 | 128.527 |
| Number of heat exchangers | | 27.00 | 25.00 |
| Used area | m² | 32611.91 | 36236.32 |
| Total annualized cost | $MM/y | 130.00 | 141.07 |
| Total capital cost | $MM/y | 9.34 | 9.18 |

TABLE 11-continued

Summary of result for Fixed Structure (comparison between existing and retrofit HEN)

| Items | Units | Retrofitted HEN | Existing HEN |
|---|---|---|---|
| Total operating cost | $MM/y | 120.66 | 131.89 |
| Hot utility operating cost | $MM/y | 15.75 | 32.94 |
| Cold utility operating cost | $MM/y | 84.81 | 76.97 |
| Other operating cost | $MM/y | 20.11 | 21.98 |

Figure 10:
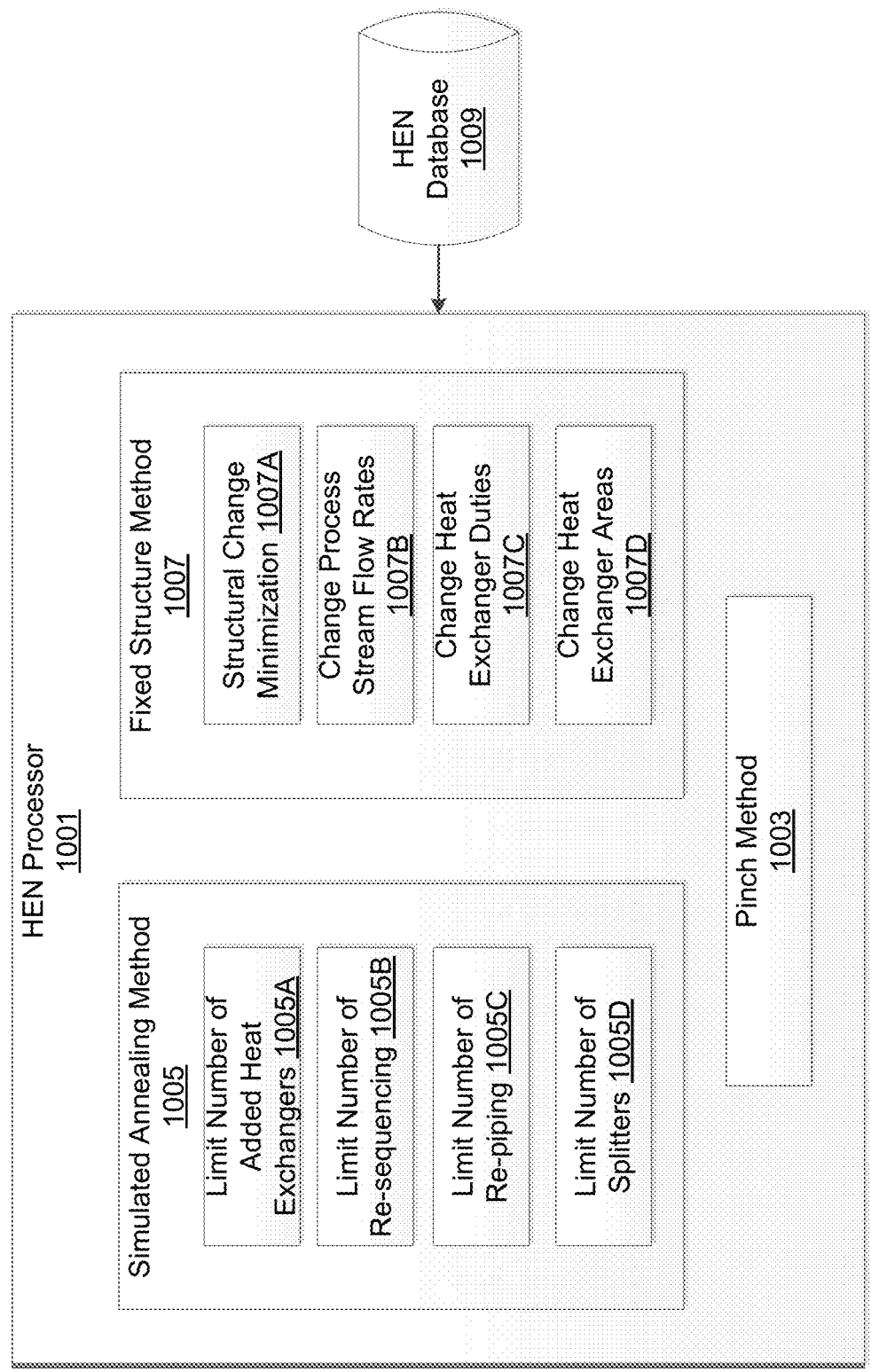
FIG. 10 shows a block diagram of an exemplary HEN processor for retrofitting a HEN according to one embodiment.

FIG. 10 shows a block diagram of an exemplary HEN processor 1001 of the techniques for retrofitting a HEN according to one embodiment. The HEN processor 1001 is described in relation to the HEN processing device 1201 of FIG. 11. The tasks of the HEN processor 1001 are distributed among several components or modules. Each of the modules described herein may be implemented in circuitry that is programmable (e.g., microprocessor-based circuits) or implemented in dedicated circuits (e.g., application specific integrated circuits (ASICs)) or configurable logic devices (e.g., simple programmable logic devices (SPLDs), complex programmable logic devices (CPLDs), and field programmable gate arrays (FPGAs)).

The HEN processor 1001 includes three modules. A pinch method 1003, SA method 1005, and fixed structure 1007 module. The HEN processor 1001 may be given access to a HEN database 1009 to receive data regarding the parts of the HEN, including, but not limited to flow rates, heat exchanger utility data, and cost data. The modules 1003-1007 may include additional sub-modules to aid in the processing of the data. For example, the SA method 1005 module may include a limit number of added heat exchangers 1005A, limit number of re-sequencing 1005B, limit number of re-piping 1005C, and limit number of splitters 1005D. The limit number of re-sequencing 1005B may limit the number of changes to the sequence of the PDH flow process among the HEs in the HEN. The limit number of re-piping 1005C may limit the number of changes made to the HE connections. The limit number of splitters 1005D may limit the number of splits made to reduce the duty of an HE by splitting the duty among a plurality of HEs. The fixed structure method 1007 module may include a structural change minimization 1007A, change process stream flow rates 1007B, change heat exchanger duties 1007C, and change heat exchanger areas 1007D.

Figure 11:
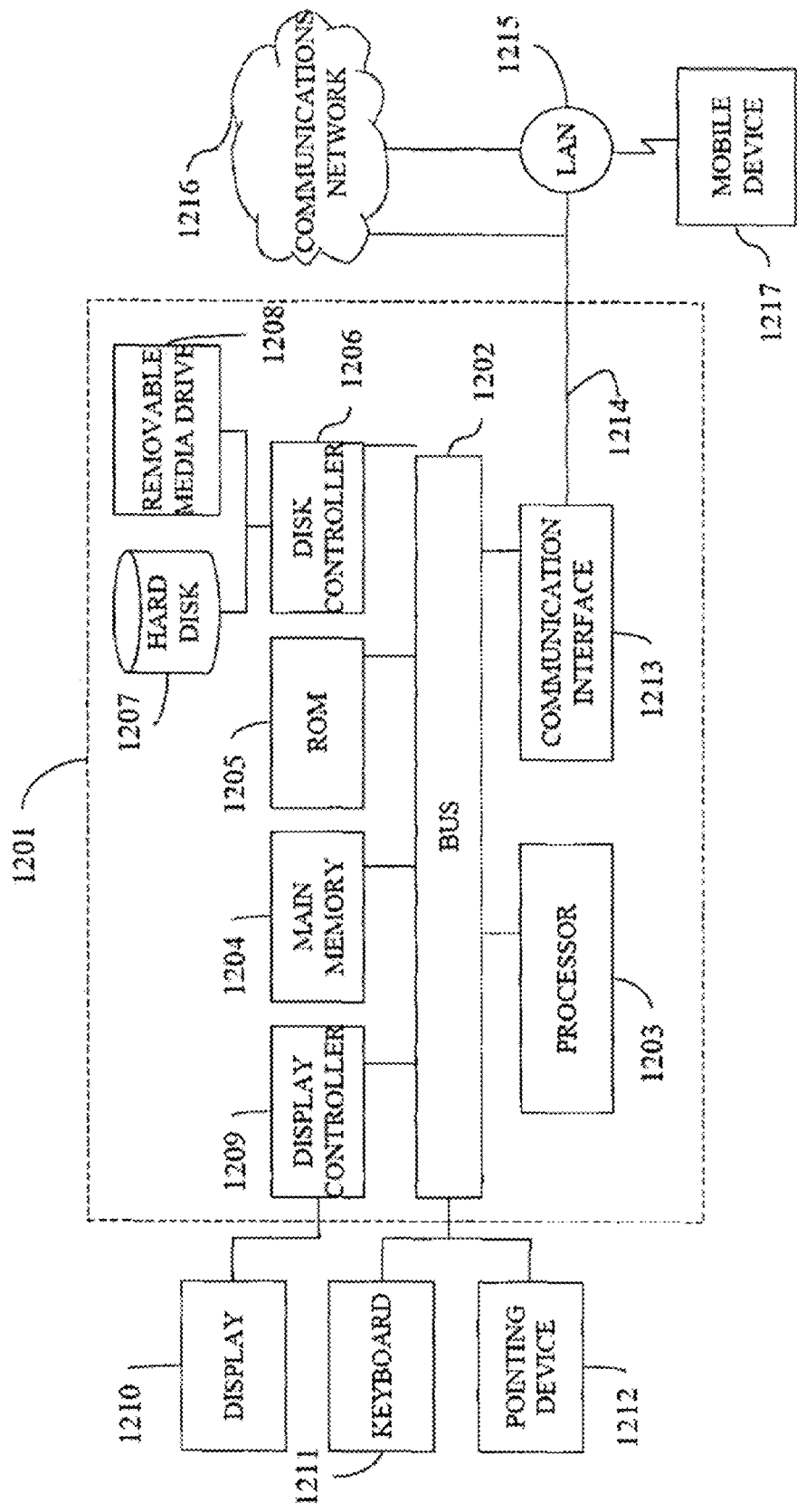
FIG. 11 shows an exemplary block diagram of a hardware implementation according to one embodiment.

FIG. 11 illustrates a HEN processing device 1201 upon which an embodiment of the present invention may be implemented. The HEN processing device 1201 includes a bus 1202 or other communication mechanism for communicating information, and a processor 1203, such as the HEN processor 1001, coupled with the bus 1202 for processing the information. The HEN processing device 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The HEN processing device 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The HEN processing device 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the HEN processing device 1201 using an appropriate device interface (e.g., small computer system interface (SCSI), integrated device electronics (IDE), enhanced-IDE (E-IDE), direct memory access (DMA), or ultra-DMA).

The HEN processing device 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The HEN processing device 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the HEN processing device 1201.

The HEN processing device 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the HEN processing device 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the HEN processing device 1201, for driving a device or devices for implementing the invention, and for enabling the HEN processing device 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the HEN processing device 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The HEN processing device 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the HEN processing device 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The HEN processing device 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The disclosed method is energy efficient and can be used to find the optimum HEN. A reduction of the annual operating cost is obtained by retrofitting the HEN for a PDH using the pinch analysis technique. A revamped design is suggested based on the SA and the Fixed Structure techniques. The results of SA retrofitting and analysis are better than the Fixed Structure. The new design has a saving of $20.65 million US/year (save up to 14.64%).

The invention claimed is:

1. A method of retrofitting a heat exchanger network (HEN), the method comprising:

inputting flow rate data, utility data, and cost data, conducting, via a processor, a pinch analysis to the HEN;

setting parameters for one or more objectives, one or more variables, and one or more constraints;

conducting, via the processor, a simulated annealing (SA) retrofit to the HEN and determining a first minimum total annual cost (TAC) based on the SA based on the parameters including a heat exchanger number, a re-sequencing number, a re-piping number, and a splitter number;

conducting, via the processor, a fixed structure retrofit to the HEN and determining a second minimum total annual cost (TAC) based on the fixed structure retrofit by varying the parameters including a structure of the HEN, hot and cold stream rates, and heat exchangers duties and areas; and selecting, via the processor, the retrofitting of the HEN based on results of the SA retrofit and the fixed structure retrofit based on which of the results has a lower TAC, wherein the HEN is provided for a propane dehydrogenation (PDH) plant, and wherein the first minimum total annual cost (TAC) is an objective function containing hot utility cost, cold utility cost, exchanger fixed duty, and area cost which is defined as $$\text{Min}TAC = C_{CU}\sum_{i=1}^{N_{hot}}\sum_{k=1}^{N_{HX}} U_{i,CU,k}A_k LMTD_{i,CU,k}\psi_{i,CU,k} +$$

$$C_{HU}\sum_{j=1}^{N_{cold}}\sum_{k=1}^{N_{HX}} U_{HU,j,k}A_k LMTD_{HU,j,k}\psi_{HU,j,k} +$$

$$AF\left[\sum_{i=1}^{N_{hot}}\sum_{j=1}^{N_{cold}}\sum_{k=1}^{N_{Hx}} a_{ijk} + b_{ijk}(A_{ijk})^{C_k}\psi_{ijk} + \sum_{i=1}^{N_{hot}}\sum_{k=1}^{N_{Hx}} a_{i,CU,k} + \right.$$

$$\left. b_{i,CU,k}(A_{i,CU,k})^{C_k}\psi_{i,CU,k} + \sum_{j=1}^{N_{cold}}\sum_{k=1}^{N_{HX}} a_{HU,j,k} + b_{HU,j,k}(A_{HU,j,k})^{C_k}\psi_{HU,j,k}\right],$$

$$Q_{CU} = \sum_{i=1}^{N_{hot}}\sum_{k=1}^{N_{Hx}} U_{i,CU,k}A_k LMTD_{i,CU,k}\psi_{i,CU,k},$$

$$Q_{HU} = \sum_{j=1}^{N_{cold}}\sum_{k=1}^{N_{HX}} U_{HU,j,k}A_k LMTD_{HU,j,k}\psi_{HU,j,k}$$

The Energy balance:

$$(T_i^S - T_i^T)MCp_i = Q_{Process} + \sum_{i=1}^{N_{hot}} \sum_{k=1}^{N_{HX}} U_{i,CU,k} A_k LMTD_{i,CU,k} \psi_{i,CU,k} \quad i \in H$$

$$(T_j^S - T_j^T)MCp_j = Q_{Process} + \sum_{j=1}^{N_{cold}} \sum_{k=1}^{N_{HX}} U_{HU,j,k} A_k LMTD_{HU,j,k} \psi_{HU,j,k} \quad j \in C$$

$$Q_{Process} = \sum_{i=1}^{N_{hot}} \sum_{j=1}^{N_{cold}} \sum_{k=1}^{N_{HX}} U_{ijk} A_k \Delta T_{LMTD_{ijk}} \psi_{ijk}$$

$$\sum_{i=1}^{N_{hot}} \sum_{j=1}^{N_{cold}} \psi_{ijk} = 1 \quad \psi_{ijk} = \begin{cases} 1 & iUj \text{ in } k_{H_x} \\ 0 & \text{otherwise} \end{cases}$$

$$\Delta T_{LMTD_{ijk}} = \frac{\Delta T_1 - \Delta T_2}{\text{Ln}\left(\frac{\Delta T_1}{\Delta T_2}\right)} \quad ; m_i Cp_i \Delta T_i = m_j Cp_j \Delta T_j$$

$$\sum_{\substack{x=0 \\ x \neq k}}^{N_{Hx}} P_{xk} = 1 \quad ; \sum_{\substack{m=0 \\ m \neq k}}^{N_{Hx}} L_{mk} = 1$$

$$P_{xy} = \begin{cases} 0, & \text{No piping from } x \to k \\ 1, & \text{Have piping from } x \to k \end{cases} ; L_{mk} = \begin{cases} 0, & \text{No piping from } m \to k \\ 1, & \text{Have piping from } m \to k \end{cases}$$

Where P≡Piping for hot stream; i≡hot stream
L≡Piping for cold stream; j≡cold stream
$N_{HX}$≡Number of heat exchangers; $k_{Hx}$≡heat exchanger
A≡Area of heat exchanger; a & b≡process stream and utility stream in HENs
$T^T$≡Outlet temperature of stream (K); $T^S$≡Inlet temperature of stream (K)
CP≡Heat capacity flow rate (MW/K); Cp≡Specific heat capacity (Kj/(Kg·K))
Ccu≡Cost per unit of cold utility; $C_{HU}$≡Cost per unit of hot utility
$C_k$≡Exponent for area cost; Q≡Duty; U≡Heat transfer coefficient (MW/(m²·K))

$\Psi_{ijk}$≡indicates the existence of a match ij at heat exchanger, k, in an optimal HEN;
$\Psi_{i,CU}$≡indicates the existence of a match between hot stream i and cold utility;
MCp=stream heat capacity*stream mass flow;
If $P_{xk}$=1; $L_{mk}$=1; x≡m≡k≡heat exchanger index.

2. The method of claim 1, wherein the heat exchanger number includes at least one of an addition number and removal number of heat exchangers (HEs) to the HEN.

3. The method of claim 1, wherein the parameters are based on the pinch analysis.

4. The method of claim 3, wherein the parameters set by the pinch analysis include an area of the HEN and a space of the HEN.

5. The method of claim 1, wherein the utility data includes at least one of inlet temperature, outlet temperature, specific heat capacity, and heat exchanger duty.

6. The method of claim 1, wherein the parameters include at least one of process stream flow rate changes, heat exchanger duty changes, and heat exchanger area changes.

7. The method of claim 1, wherein the inputting includes inputting flow data from at least one process stream of the PDH, and
the method further comprises retrofitting the PDH by changing a flow of the at least one process stream of the PDH based on the results of the SA retrofit and the fixed structure retrofit.

8. The method of claim 1, wherein the SA is conducted using stochastic analysis.

9. The method of claim 1, wherein the re-sequencing number is a number of changes to a sequence of a PDH flow process among the heat exchangers in the HEN.

10. The method of claim 1, wherein the re-piping number is number changes made to connections of the heat exchangers.

11. The method of claim 1, wherein the splitter number is a number of splits made to reduce a duty of a heat exchanger by splitting the duty among a plurality of heat exchangers.

* * * * *